Oct. 19, 1937.    W. REYNOLDS    2,096,063
WRAPPING MACHINE
Original Filed Nov. 30, 1931    29 Sheets-Sheet 5

INVENTOR.
WILLIAM REYNOLDS.
BY
*Leonard L. Kalish*
ATTORNEY.

Oct. 19, 1937.   W. REYNOLDS   2,096,063
WRAPPING MACHINE
Original Filed Nov. 30, 1931   29 Sheets-Sheet 6
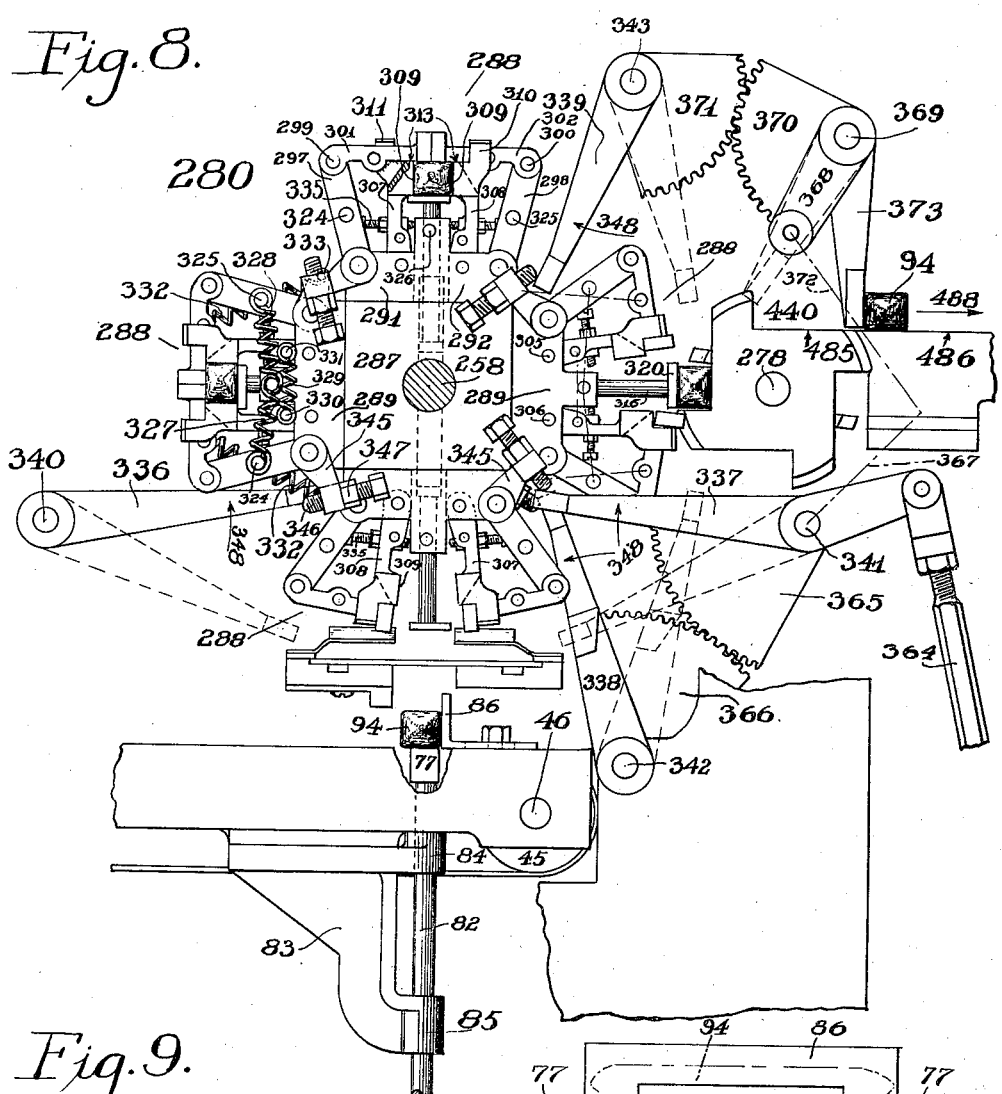
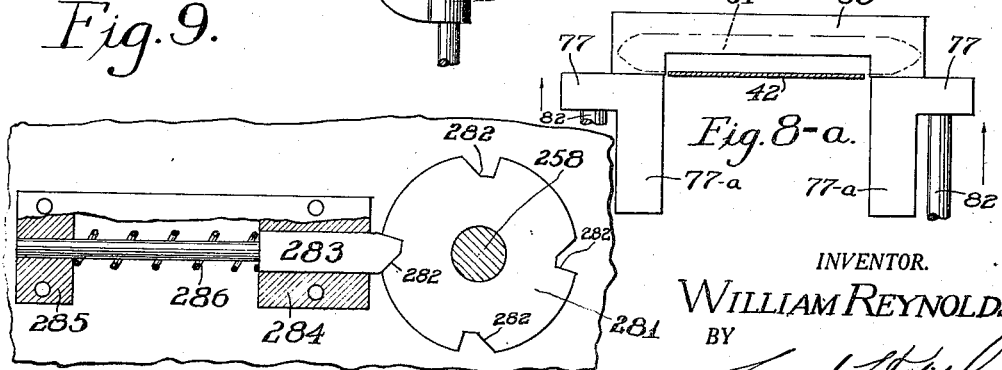
INVENTOR.
WILLIAM REYNOLDS
BY
ATTORNEY.

Oct. 19, 1937.  W. REYNOLDS  2,096,063
WRAPPING MACHINE
Original Filed Nov. 30, 1931  29 Sheets-Sheet 7
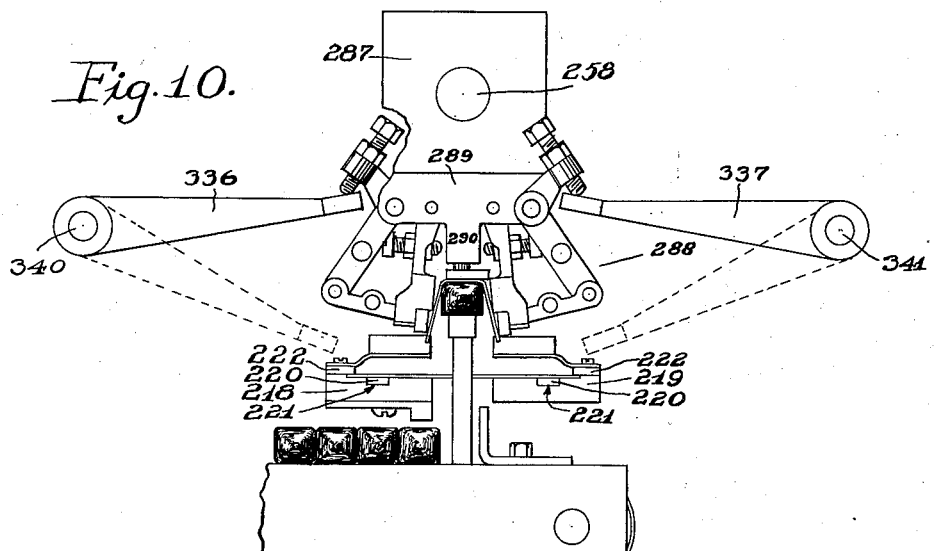
Fig.10.
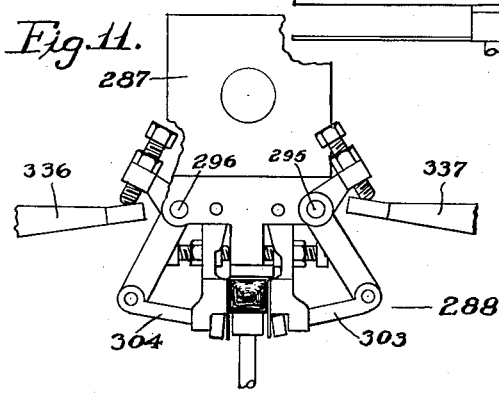
Fig.11.
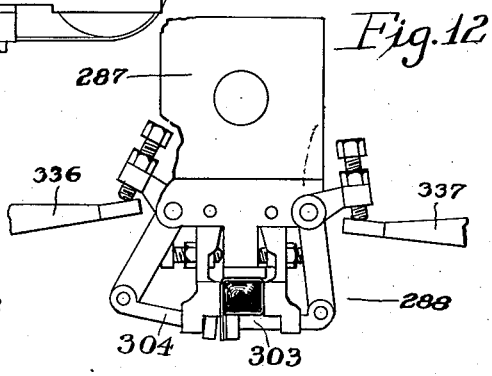
Fig.12.
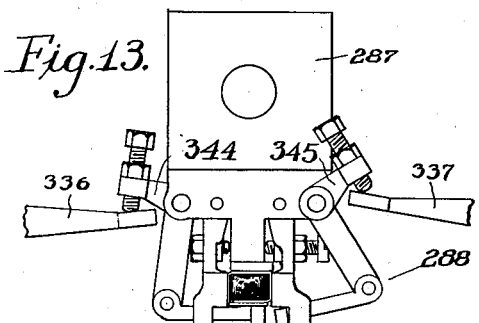
Fig.13.
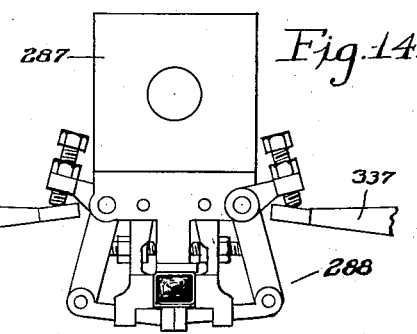
Fig.14.
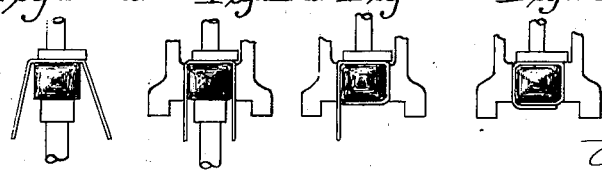
Fig.10-a.  Fig.11-a.  Fig.12-a.  Fig.13-a.
INVENTOR.
WILLIAM REYNOLDS
BY
Leonard L. Kalish
ATTORNEY.

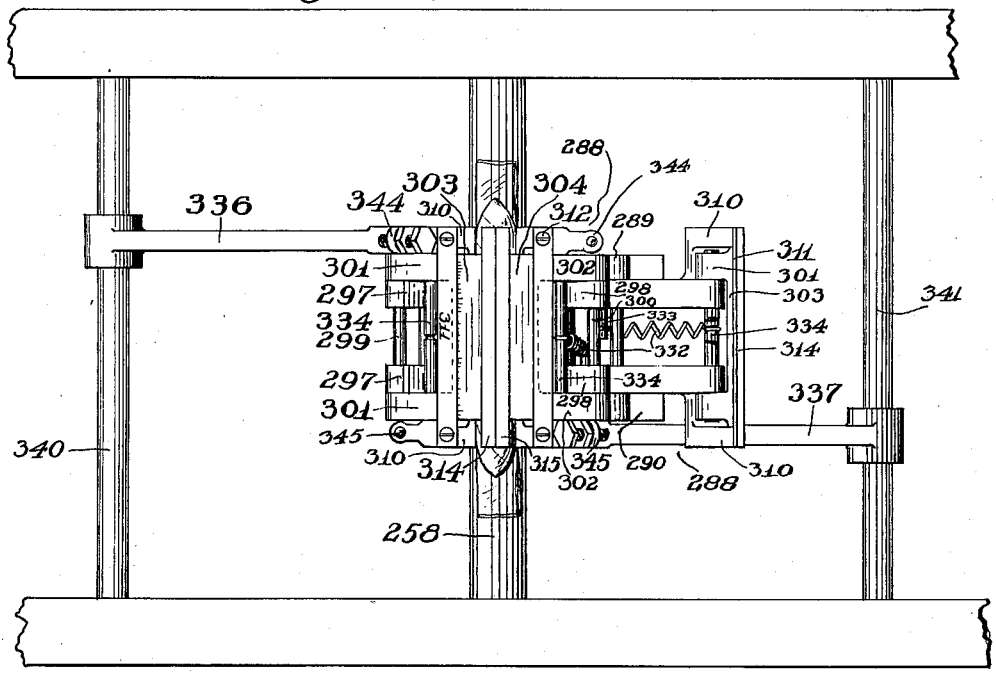
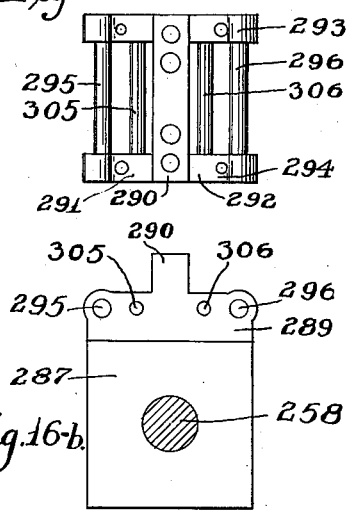

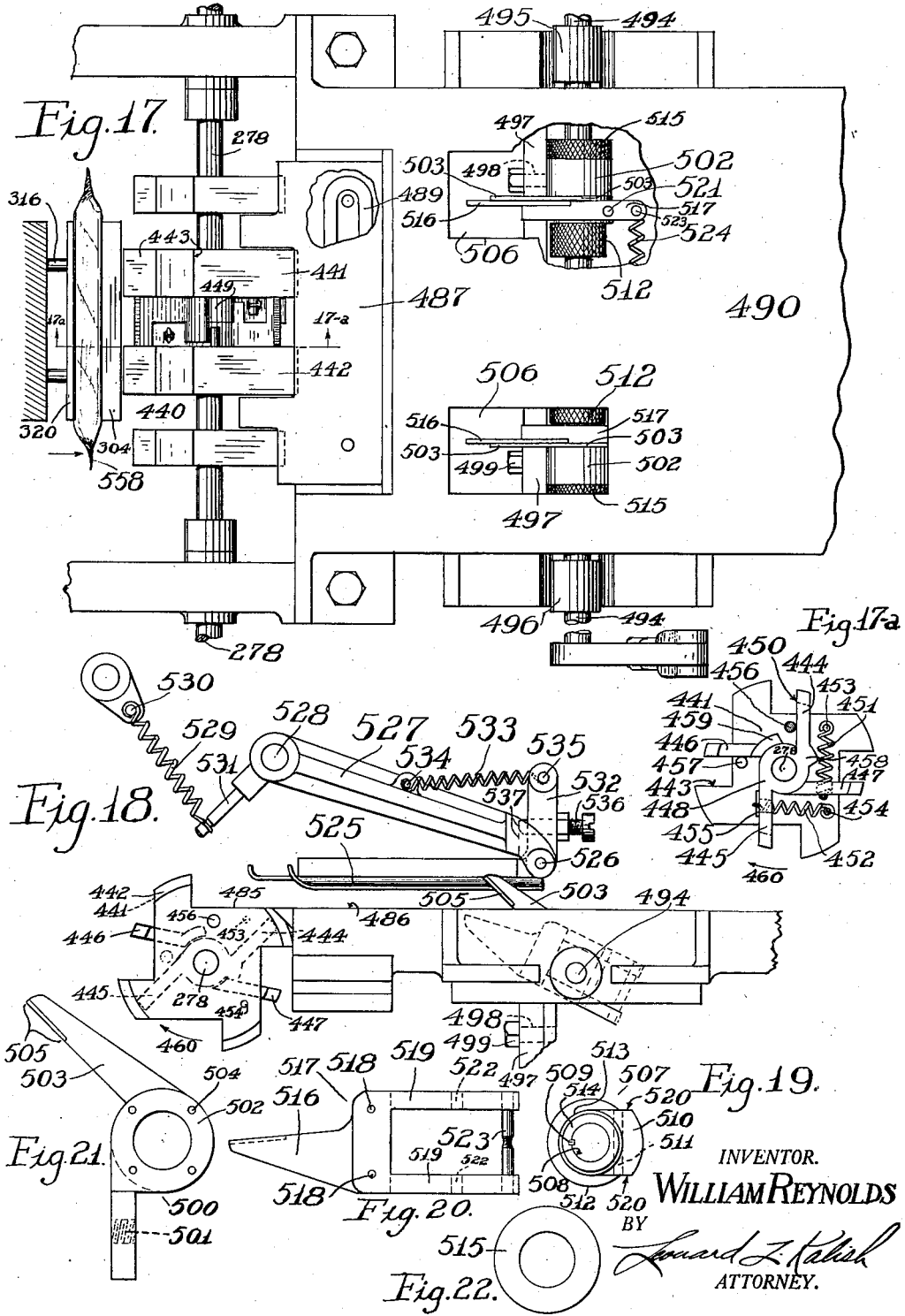

INVENTOR.
WILLIAM REYNOLDS
BY
ATTORNEY.

Oct. 19, 1937.   W. REYNOLDS   2,096,063
WRAPPING MACHINE
Original Filed Nov. 30, 1931   29 Sheets-Sheet 11
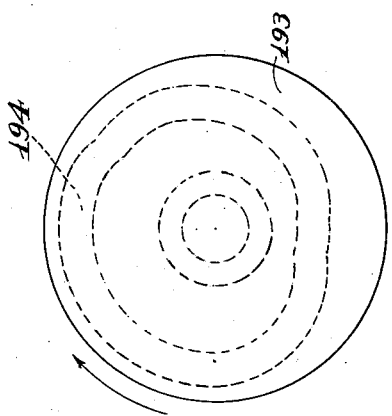
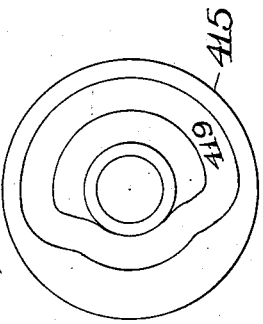
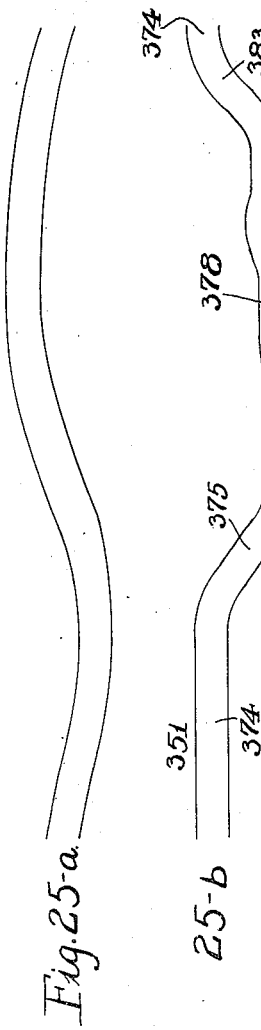
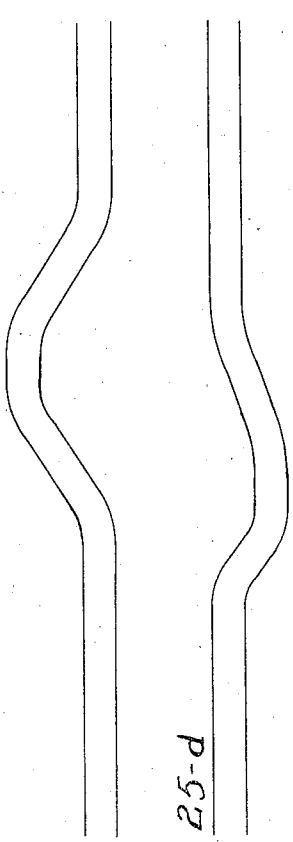
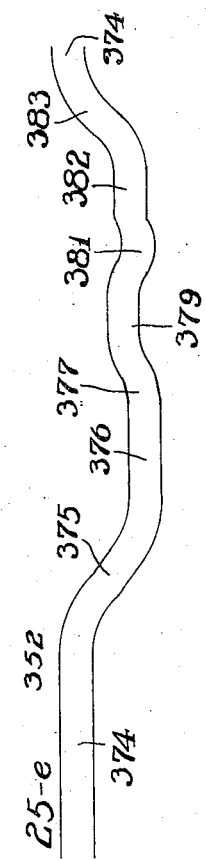
INVENTOR.
WILLIAM REYNOLDS
BY
ATTORNEY.

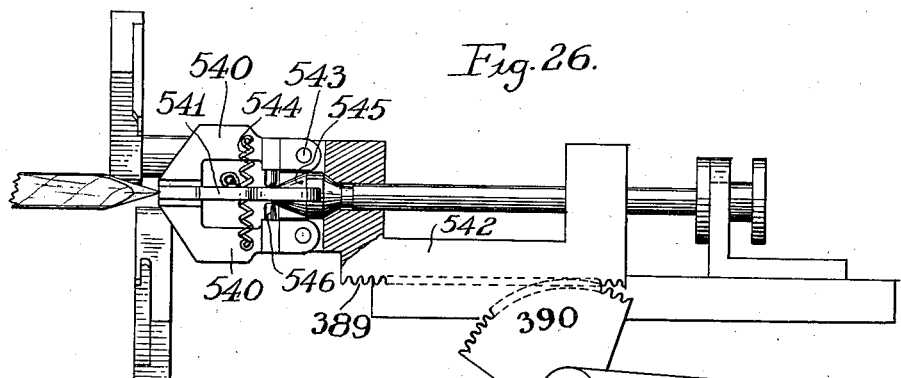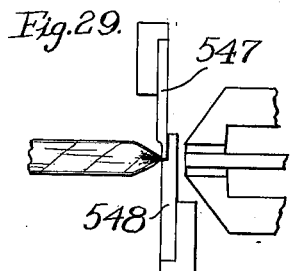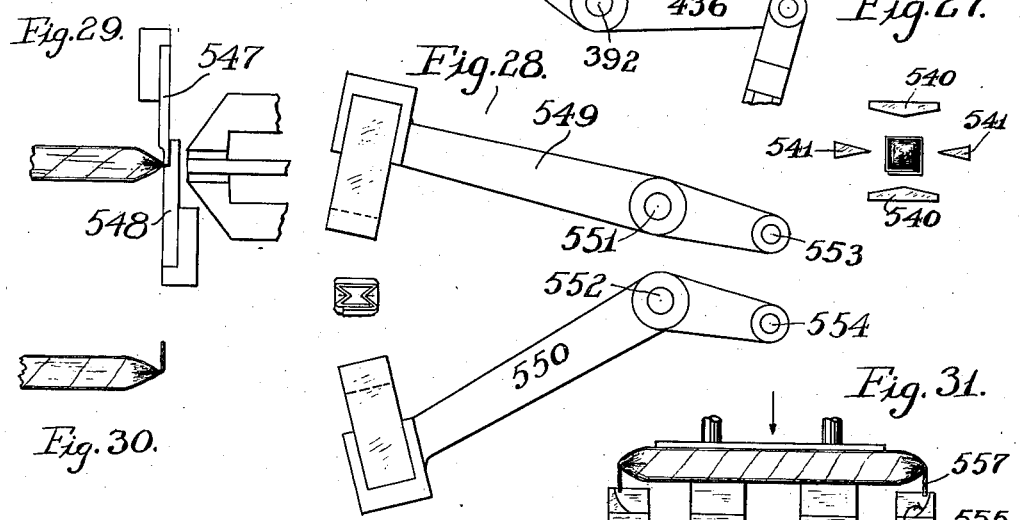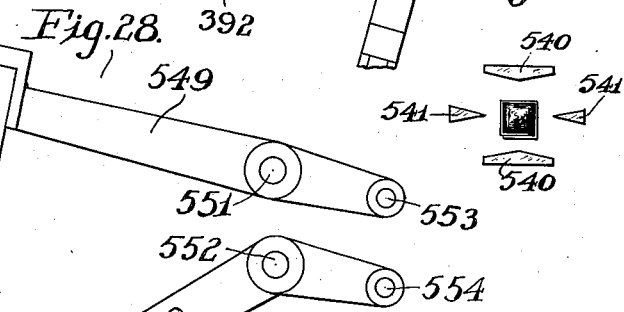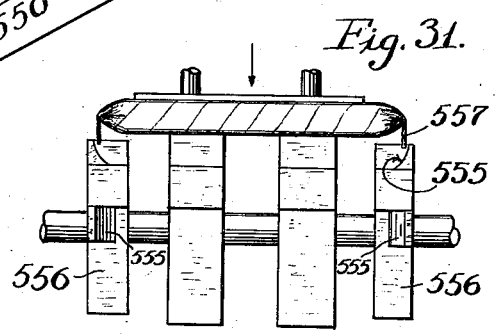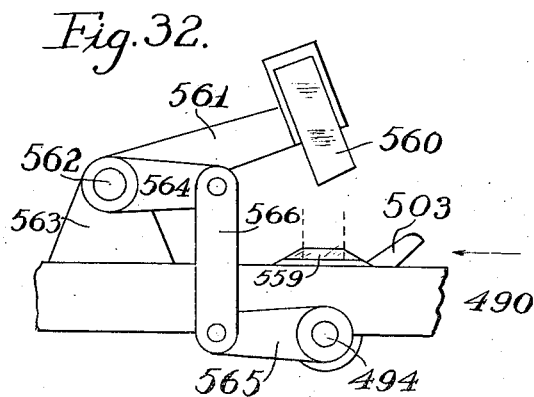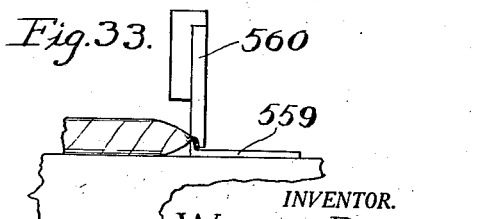

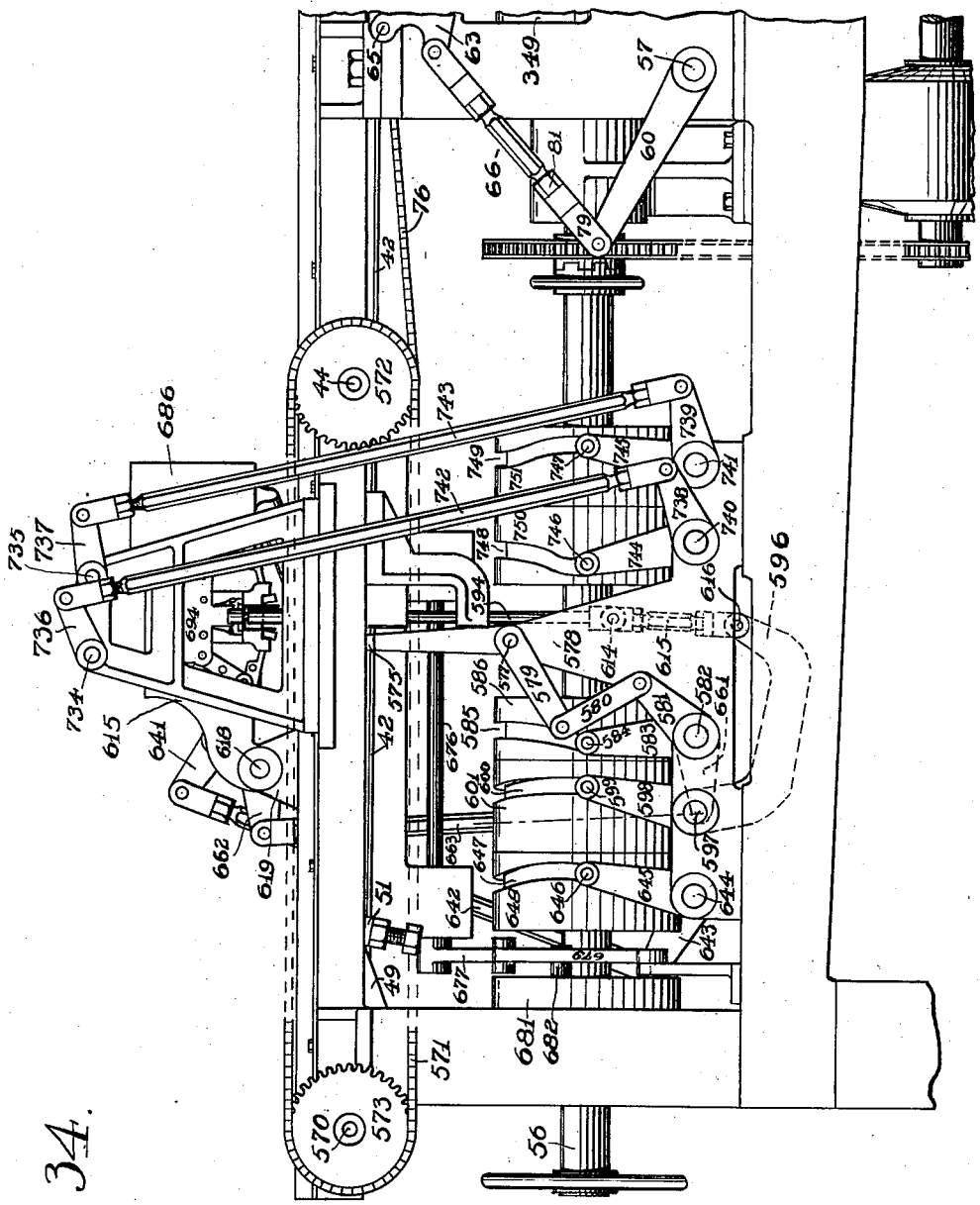

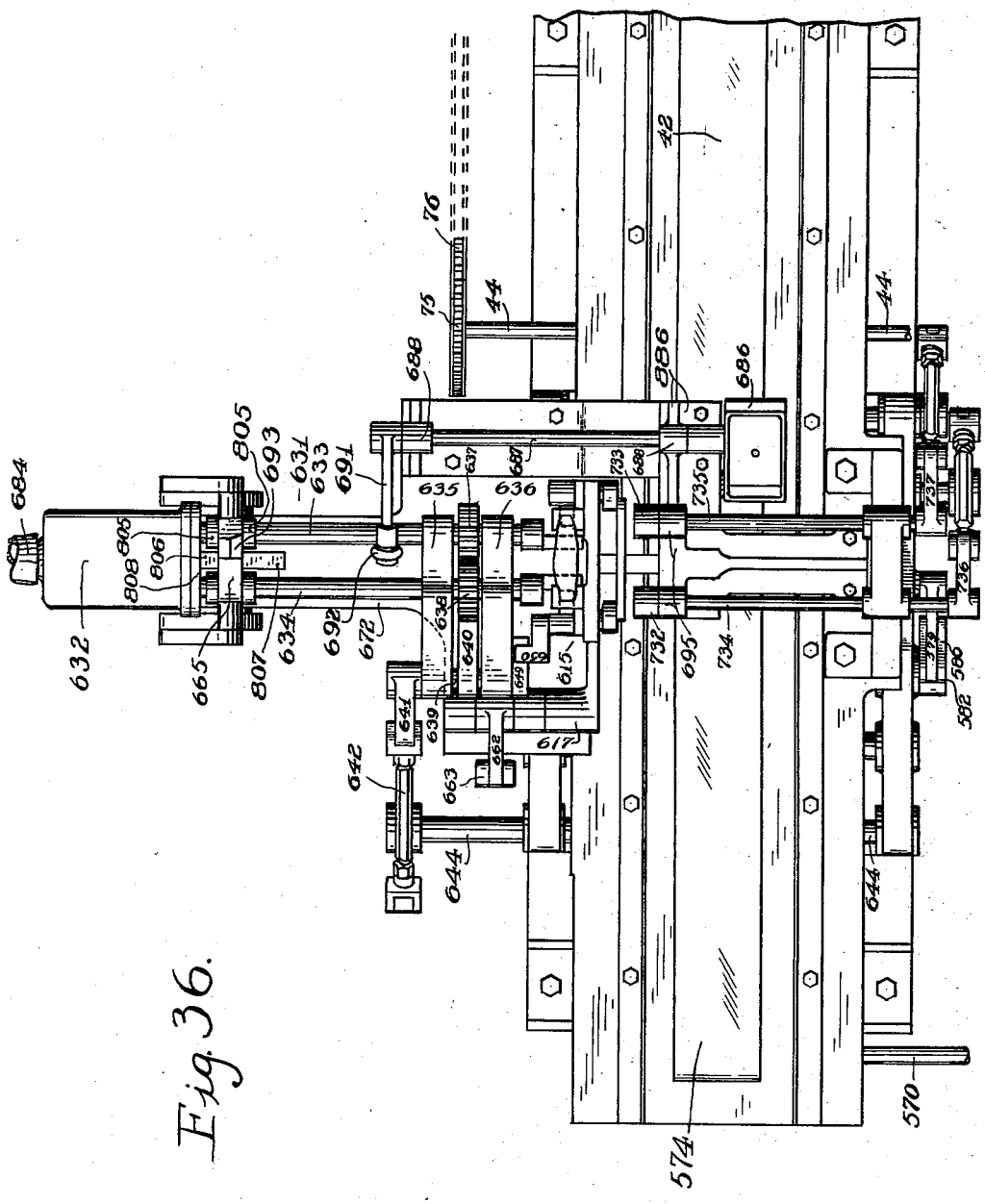

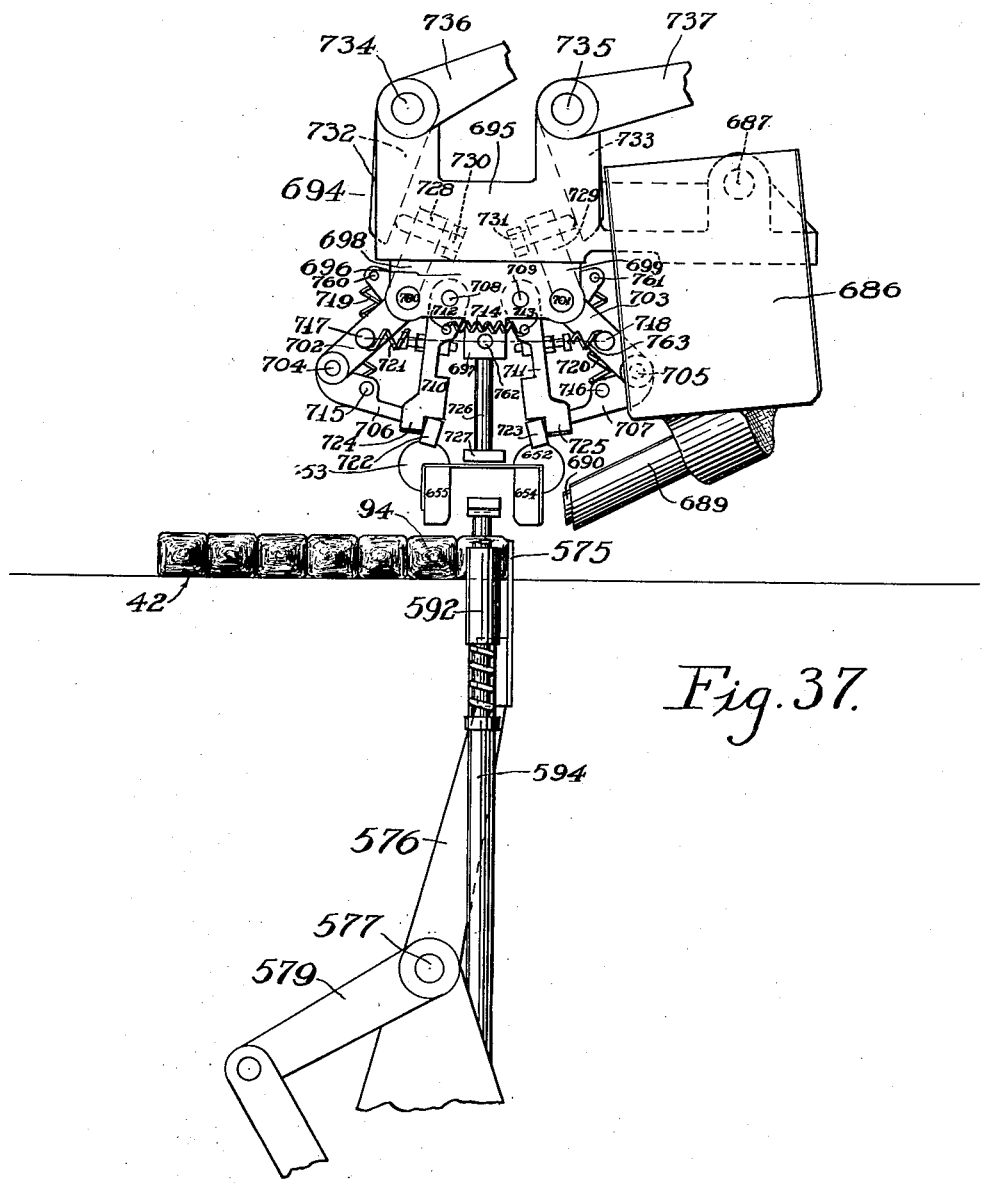

Oct. 19, 1937.     W. REYNOLDS     2,096,063
WRAPPING MACHINE
Original Filed Nov. 30, 1931     29 Sheets-Sheet 17
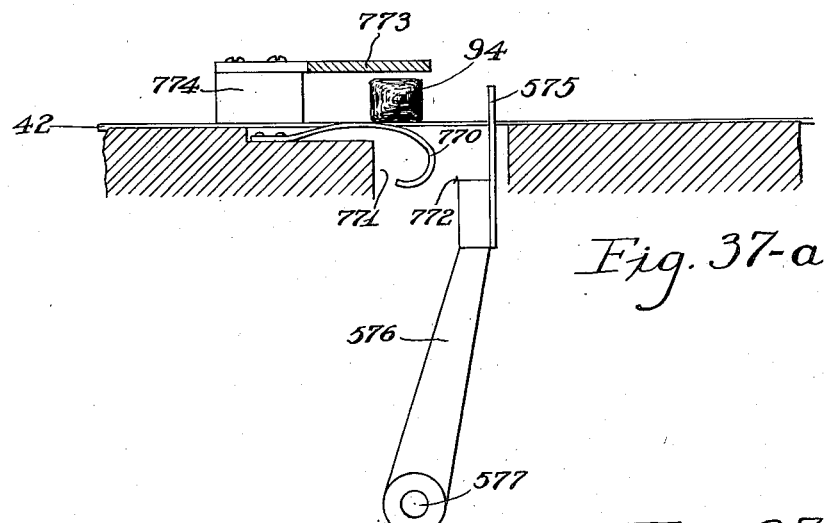
Fig. 37-a.
Fig. 37-b.
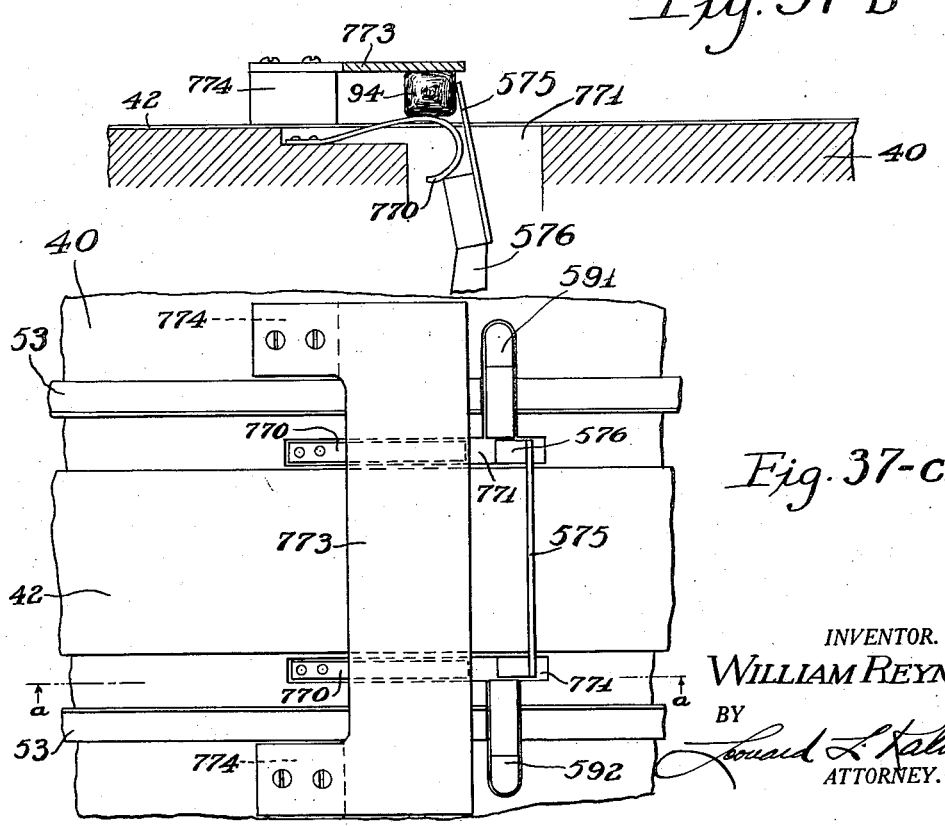
Fig. 37-c.
INVENTOR.
WILLIAM REYNOLDS
BY
Leonard L. Kalish
ATTORNEY.

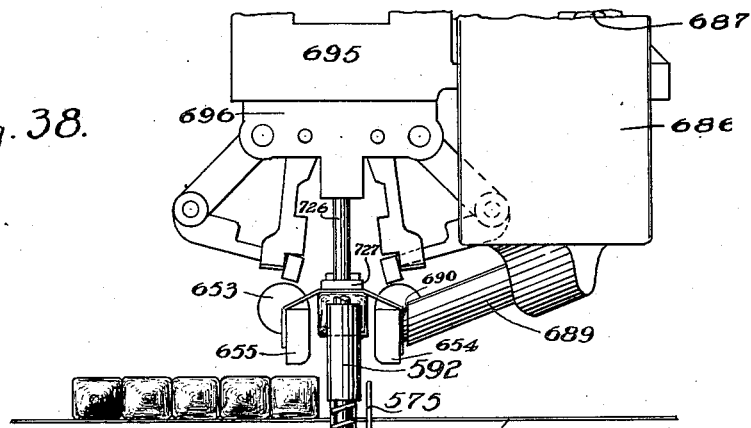
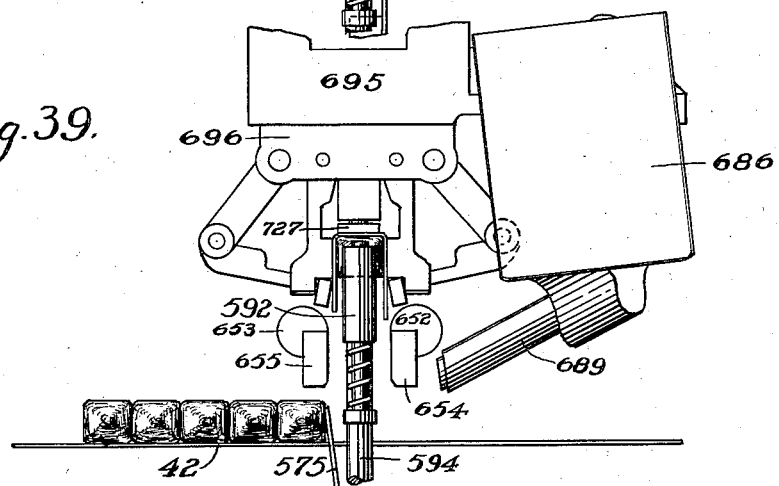
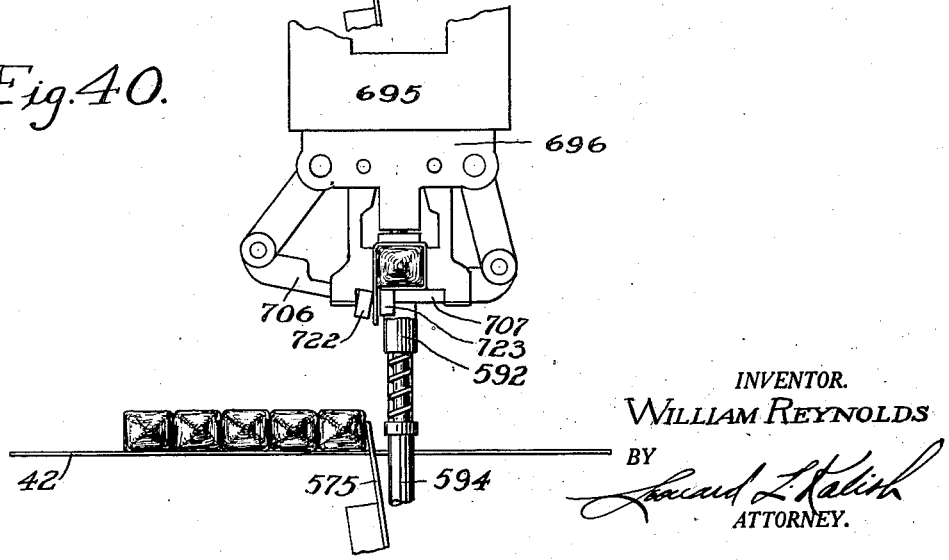

Oct. 19, 1937.    W. REYNOLDS    2,096,063
WRAPPING MACHINE
Original Filed Nov. 30, 1931    29 Sheets-Sheet 19
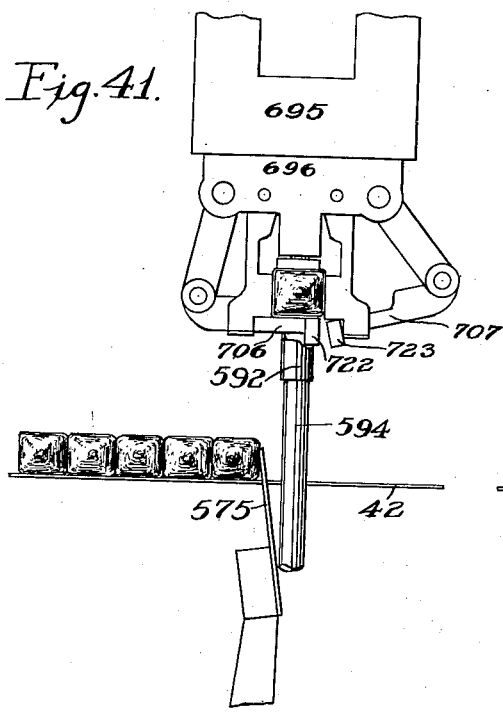
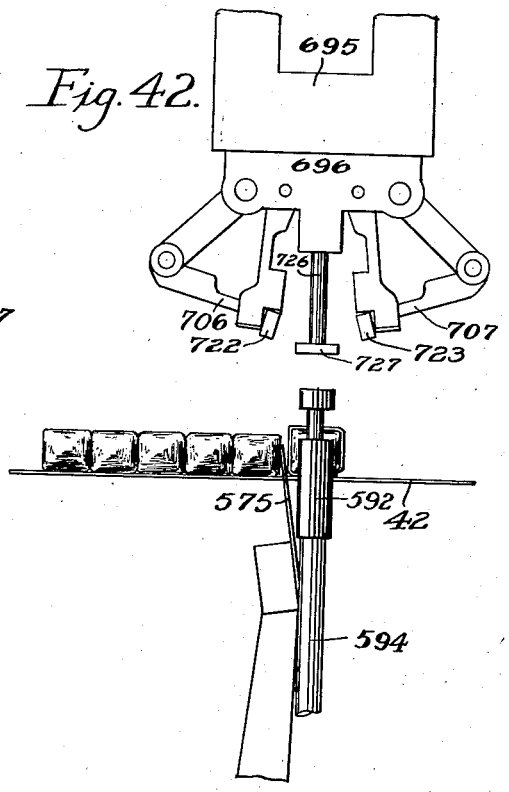
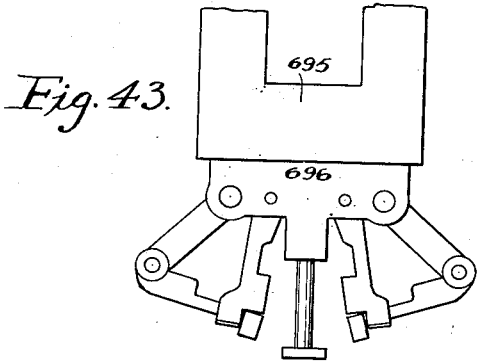
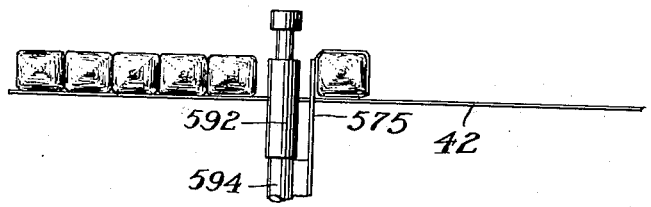
INVENTOR.
WILLIAM REYNOLDS
BY
ATTORNEY.

Oct. 19, 1937. W. REYNOLDS 2,096,063
WRAPPING MACHINE
Original Filed Nov. 30, 1931 29 Sheets-Sheet 20

INVENTOR.
WILLIAM REYNOLDS
BY
Leonard L. Kalish
ATTORNEY.

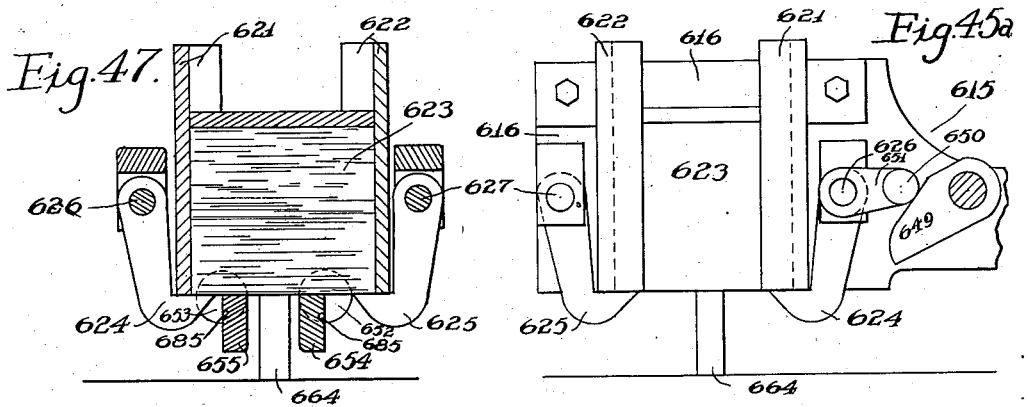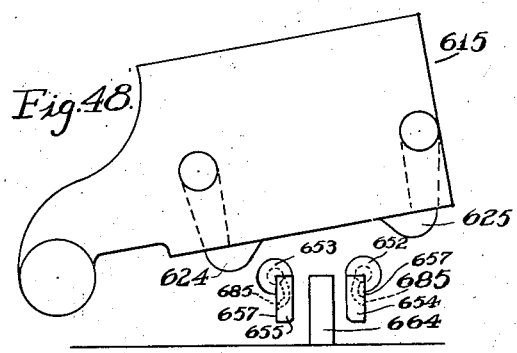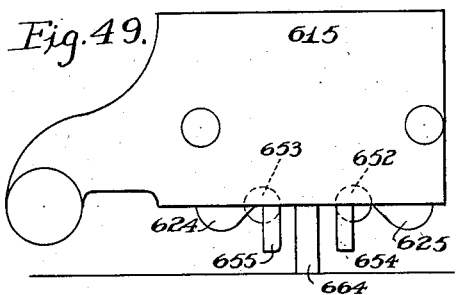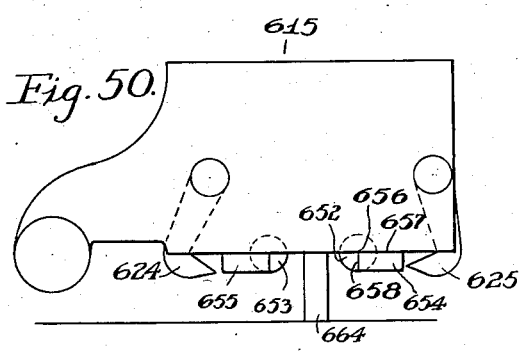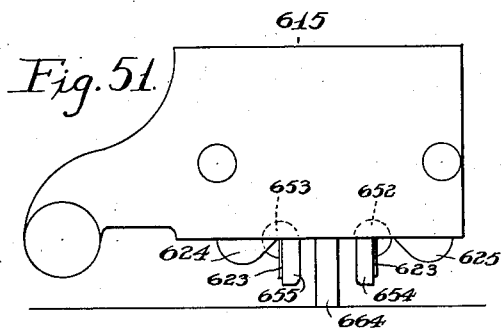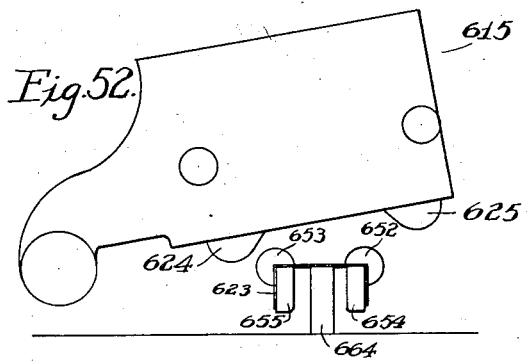

Oct. 19, 1937.   W. REYNOLDS   2,096,063
WRAPPING MACHINE
Original Filed Nov. 30, 1931   29 Sheets—Sheet 24

Inventor
WILLIAM REYNOLDS
By Leonard L. Kalish
Attorney

Oct. 19, 1937.    W. REYNOLDS    2,096,063
WRAPPING MACHINE
Original Filed Nov. 30, 1931    29 Sheets-Sheet 25
Fig. 62.
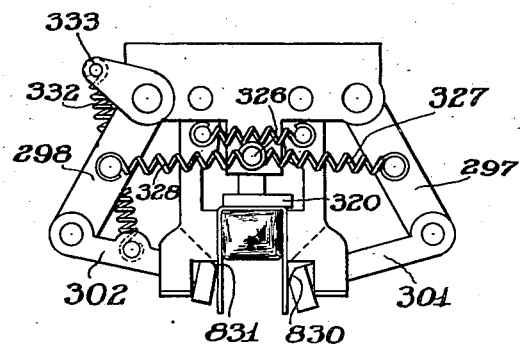
Fig. 63.
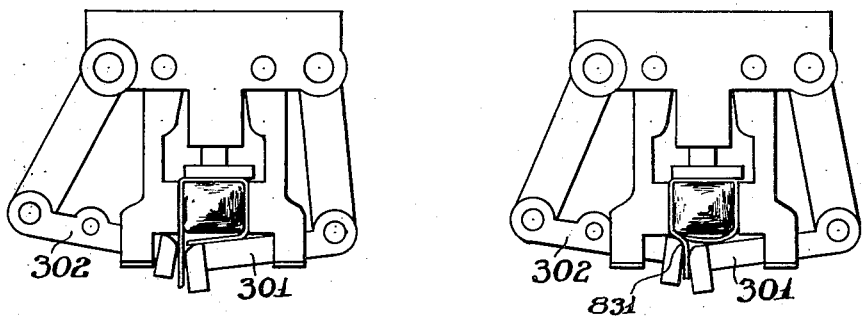
Fig. 64.
Fig. 65.
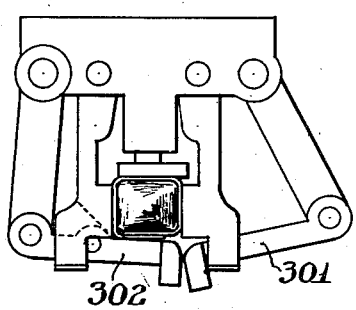
Inventor
WILLIAM REYNOLDS.
By Leonard L. Kalish
Attorney

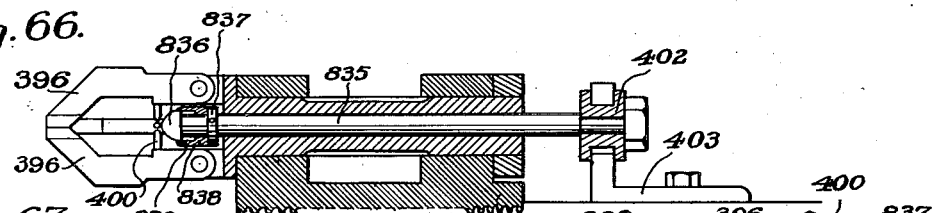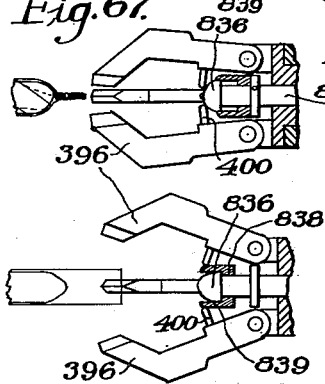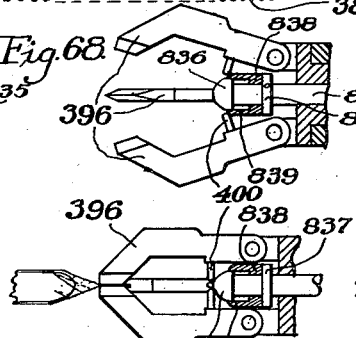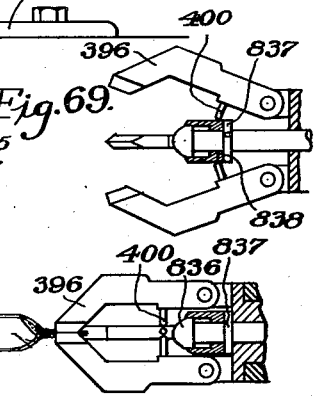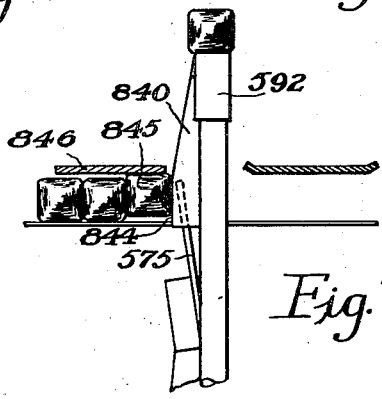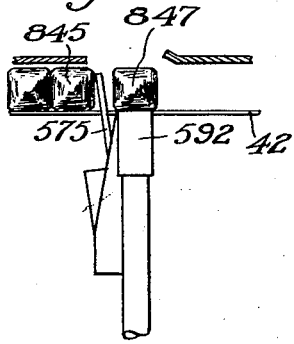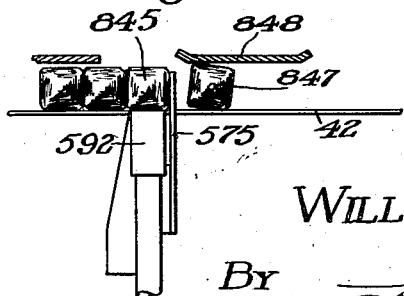

Oct. 19, 1937.  W. REYNOLDS  2,096,063
WRAPPING MACHINE
Original Filed Nov. 30, 1931  29 Sheets-Sheet 27
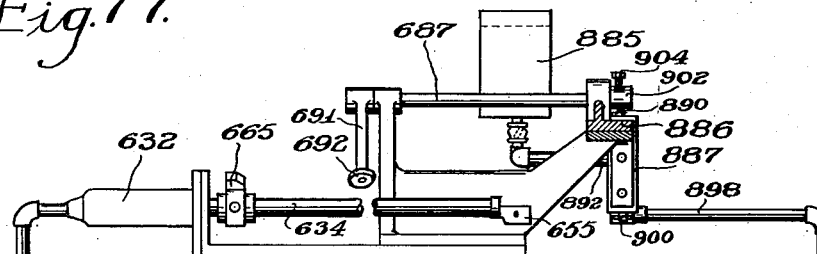
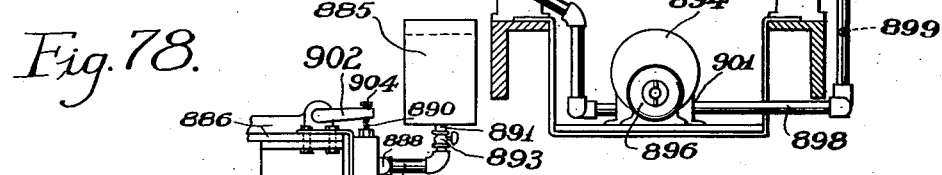
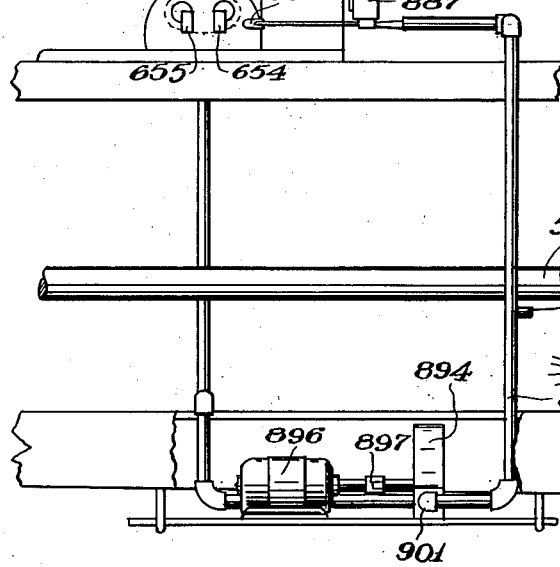
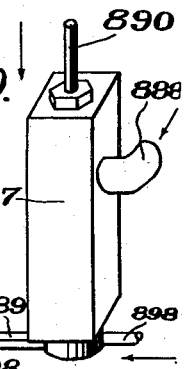

Oct. 19, 1937.  W. REYNOLDS  2,096,063
WRAPPING MACHINE
Original Filed Nov. 30, 1931    29 Sheets-Sheet 28

Inventor
WILLIAM REYNOLDS.
By Leonard L. Kalish
Attorney

Oct. 19, 1937.   W. REYNOLDS   2,096,063
WRAPPING MACHINE
Original Filed Nov. 30, 1931   29 Sheets-Sheet 29

Inventor
WILLIAM REYNOLDS.
By Leonard L. Kalish
Attorney

Patented Oct. 19, 1937

2,096,063

UNITED STATES PATENT OFFICE 2,096,063

WRAPPING MACHINE

William Reynolds, Bloomfield, N. J.

Application November 30, 1931, Serial No. 578,135
Renewed July 18, 1936

10 Claims. (Cl. 93—7)

My invention relates to wrapping machines particularly adapted for wrapping cigars and the like, in a covering or sheathing of any suitable thin web, and it relates more particularly to a wrapping machine for wrapping cigars and the like, in a thin sheathing of glycerinated regenerated cellulose or what is sometimes known in the trade as "Cellophane".

My invention further relates to a machine adapted to apply a cigar band or the like to cigars in an automatic manner, preliminary to the wrapping of the cigars.

The object of my invention is to provide a fully automatic machine whereby cigars or the like may be quickly and uniformly encased in a thin sheathing and wrapped therein tightly, with the overlapping edges of the sheathing sealed.

It is a further object of my invention to so handle the thin sheathing material from a roll, that the same may always be under positive control prior to and while being applied to a cigar or the like, so that any tendency of the sheathing material to curl, slip or get into misalignment otherwise, is entirely overcome and the resultant wrapping may become entirely uniform.

A further object of my invention is to provide a wrapping machine of this type which will automatically cut predetermined lengths of the sheathing material from a supply roll, will apply adhesive, cement or solvent to one of the longitudinal edges, will then apply the sheathing to a cigar or the like and wrap the same thereabout, with one of the longitudinal edges bearing the adhesive or cementing material overlapping the other longitudinal edge, which will then close the two ends of the package by twisting, spinning or folding, which will then heat-seal the longitudinal edges and trim the ends of the package, if necessary, by shearing or cutting.

A further object of my invention is to provide a machine which will automatically remove individual cigar bands from a stack contained in a suitable magazine, one at a time, and which will automatically apply said cigar bands to successive cigars which are automatically removed from a conveyer or belt-line, one at a time, and then replaced into the line, likewise automatically, after the cigar band has been applied thereto.

With the above and other objects in view which will appear more fully from the following detailed description, my invention consists broadly of an intermittently operated conveyer adapted to carry a series of cigars or the like into the machine, a turret head disposed above and in operative relation to the delivery end of the conveyer, said turret head carrying a plurality of similar folding mechanisms or folding "cages", means for intermittently rotating said turret head a suitable fraction of a complete rotation, so as to bring each of the cages successively into a lowermost receiving position above or in operative relation to the delivery end of the conveyer, a lifter also operated intermittently and in timed relation to the intermittent motion of the conveyer and the turret head, for lifting the last cigar in the row fed by the conveyer, into the lowermost folding "cage" carried by the turret head in the receiving position.

My invention further consists of a folding "cage" including an opposed pair of clamping jaws and an opposed pair of folding jaws, said jaws being carried by pivoted arms and being urged towards each other by spring pressure and being moved in a direction away from each other or outwardly by positive acting actuating levers not carried by the turret head or by the cages but carried on fixed pivots on the stationary frame of the machine;—said clamping jaws of each cage being actuated outwardly or borrowing motion in an outward direction from said folding jaws, and the folding jaws alone being directly acted upon by said cage actuating levers.

My invention further consists of a web cutting and handling means, also operated intermittently and in timed relation to the cigar feeding and lifting means, and turreting and cage actuating means, whereby a web of "Cellophane" is fed positively for a suitable distance or length between the open opposed cutters of a suitable shear, with the leading edge of the web being gripped firmly and hence being under positive control by a jaw or jaws which move at substantially the same rate and at the same time as the web is fed and which release said leading edge of the web only when said web is firmly grasped or clamped between the cigar to be raised and a suitable spring tensioned "pusher" in the folding cage. The web feeding and handling means also includes means for clamping the free or leading edge of the web both prior to cutting as well as after cutting, so that not only is the leading edge of the cut piece of web clamped firmly and positively prior to the instant the cut piece of web material is clamped against the cigar, but the leading edge of the web on the roll is also clamped prior to cutting so that immediately after cutting, the leading edge of the material still on the roll may not curl and get out of control.

My invention further consists of means, hereinafter sometimes referred to as a "turntable", disposed in operative relation to the turret head at the stage or position immediately preceding the lowermost or "receiving" position of the turret, whereby the cigars discharged from the cage may be positively grasped and turned and delivered onto a delivery table, in predetermined relation to the longitudinal seam of the wrapper and the face of the band. Thus, by this phase of my invention the cigars are each turned through a suitable angle so that they are presented to the receiving table and a heating unit contained therein, in predetermined relation to the seam and the face of the band.

My invention further consists of a pair of end spinning or folding means disposed in operative relation to the turret head at a stage following the lowermost or receiving stage and in advance of the turntable or the "delivery" stage of the turret, whereby the end portions of the "Cellophane" sheathing may be suitably twisted, spun, or folded in, thereby to close the two ends of the package.

My invention further consists of novel means for sealing the longitudinal overlapping edges of the sheathing and for trimming, as by cutting, if necessary, the ends of the package, so that a neat package of uniform dimensions may be produced.

My invention further consists of positive and timed actuating means, controlled by cams and intermediate followers and intermediate actuating means, whereby the cigar feeding and lifting means, the web or "Cellophane" feeding, controlling and cutting means, and the turntable and the trimming means may be operated intermittently and in timed relation to one another, and whereby the turret may be rotated intermittently and in timed relation to the cigar lifter and the turntable and whereby the cages carried by said turret may be actuated for a closing and folding operation in the lowermost or receiving position, and whereby they may be actuated for the ejection of the wrapped cigar, in the final or "discharge" position in juxtaposition to the "turntable".

My invention further consists of means preferably positioned in advance of the cigar wrapping means, and arranged in timed relation thereto, whereby cigars are lifted from the conveyer belt or conveyer line, one at a time, in succession, and then replaced in the line in their original position, so that they may then be conveyed further to the cigar wrapping means.

My invention further consists of a folding cage disposed above the cigar being lifted out of line, a cigar band magazine containing a stack of cigar bands off to one side or out of alignment with the folding cage, and a suctional cigar band transfer device adapted to co-act with said cigar band magazine and said folding cage, and operating in timed relation thereto, to remove a cigar band from said magazine during each cycle of the machine and to transfer the same into operative alignment with the cigar as it is being raised out of line, so that as the cigar is lifted into the cage, the cigar band may be carried along with the cigar into the cage, where it may then be wrapped around the cigar and secured in position adhesively.

My invention further consists of a moistener adapted to co-act with the suctional cigar band transfer device and to operate in timed relation thereto, to moisten the gummed end surface of the cigar band, preliminary to its passage into the folding cage, so that when said moistened end surface is folded down over, and in overlapping relation to the other gummed end surface of the cigar band, the two overlapping ends will be secured to each other adhesively.

My invention further consists of other novel features which will appear more fully from the following detailed description.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts:

Figure 2:
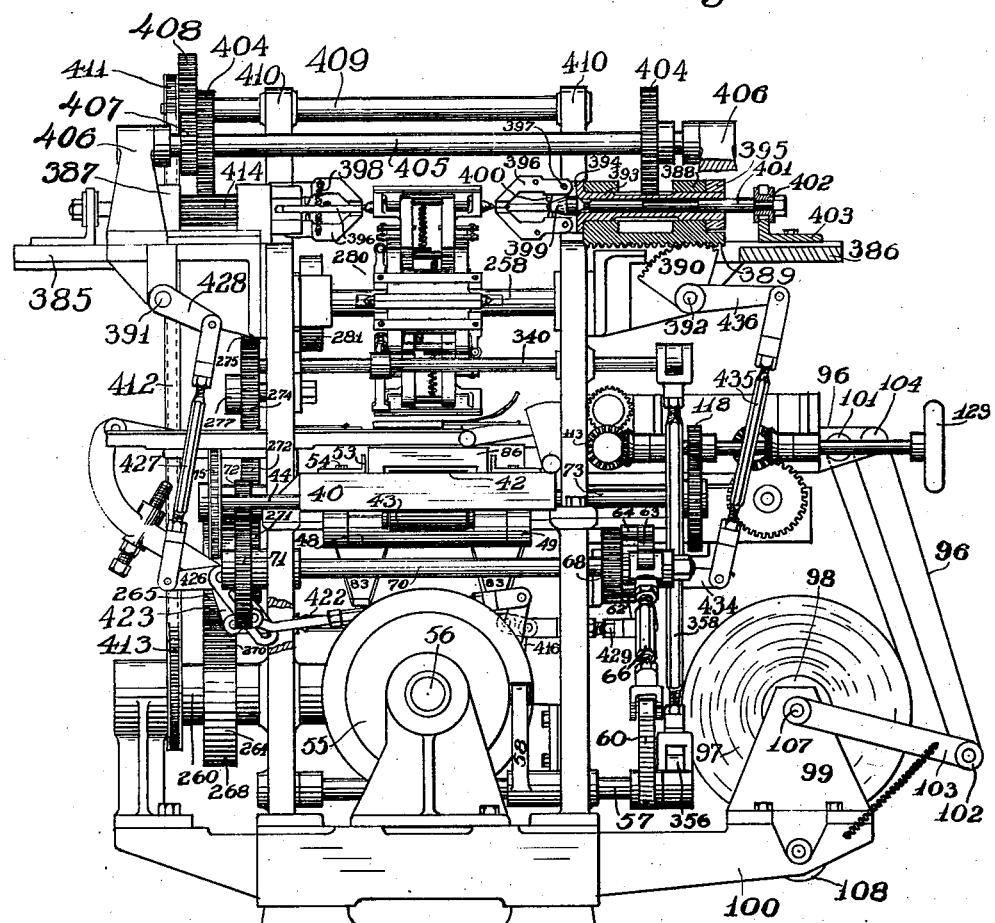
Figure 2 represents an elevational view of the front or receiving end of the "wrapping" portion of a machine embodying my invention.

Figure 2—a represents a detached elevational view of the end spinner actuating cam and cam lever.

Figure 2—b represents a top plan view of the "Cellophane" feed roll.

Figure 1:
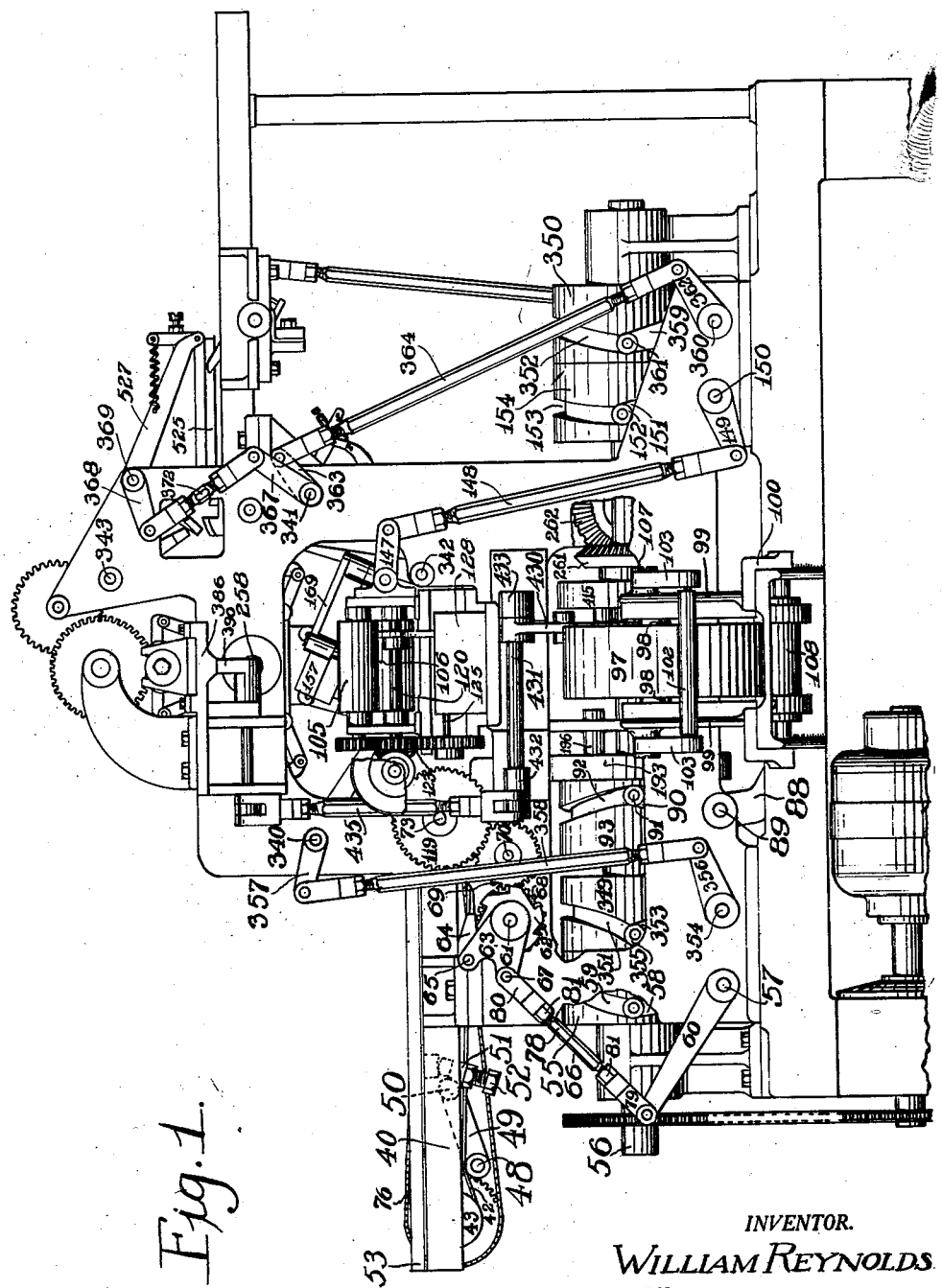
Figure 1 represents a right side elevation of the "wrapping" portion of a machine embodying my invention.
Figure 3:
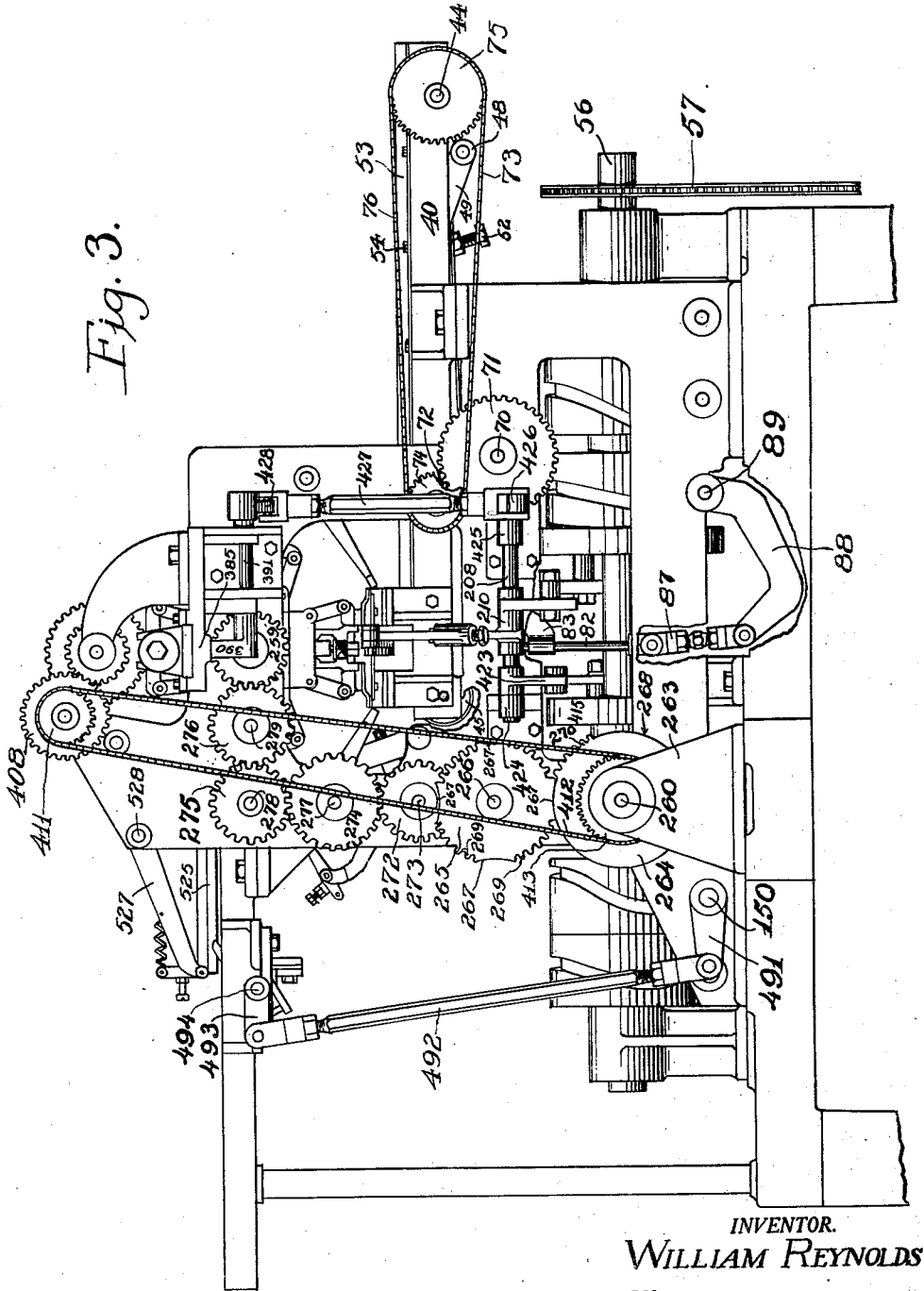

Figure 3 represents a left side elevation of the "wrapping" portion of the machine shown in Figures 1 and 2.

Figure 4:
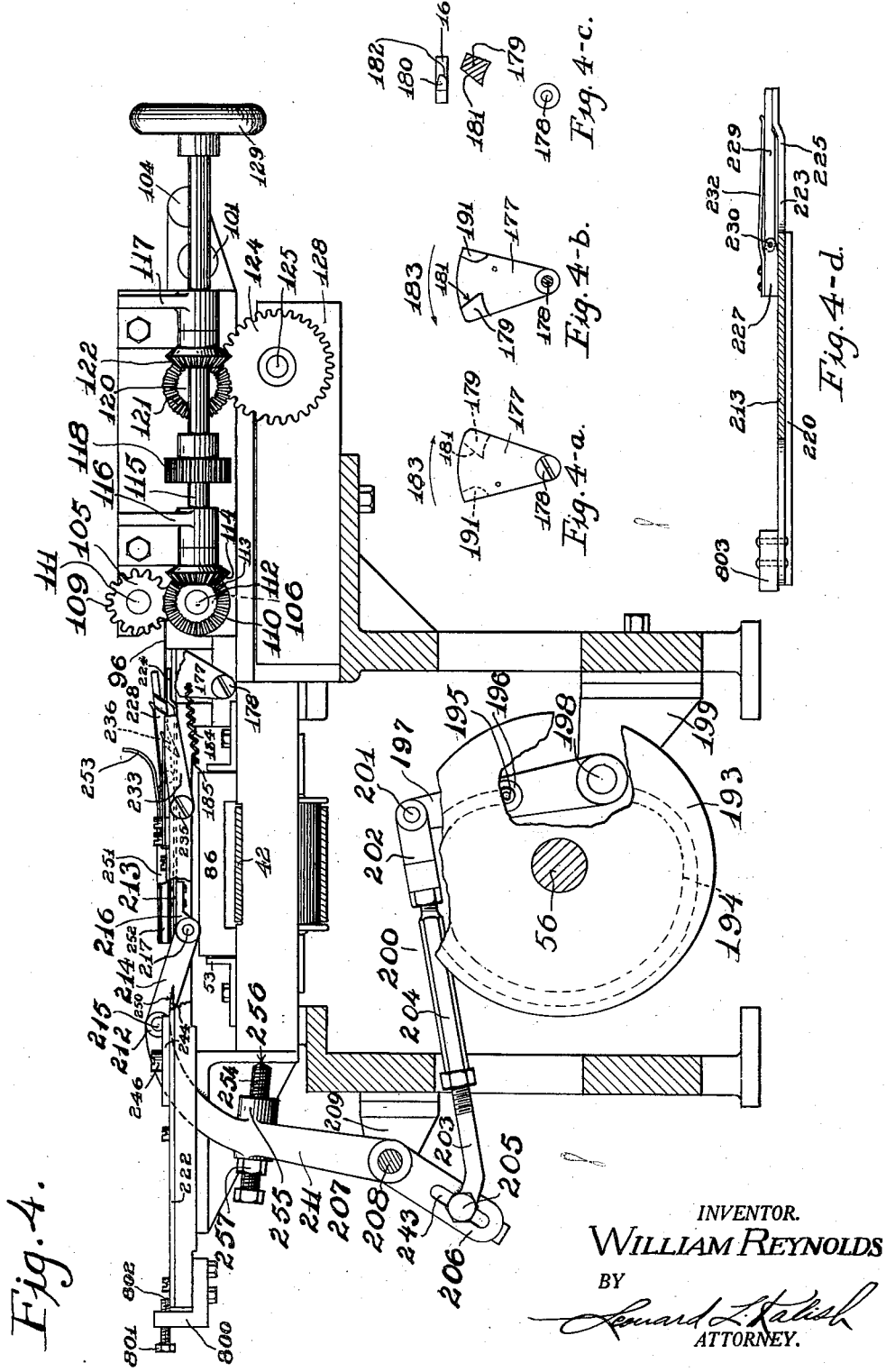

Figure 4 represents a fragmentary elevational view of a portion of the "wrapping" mechanism, illustrating more particularly a side elevation of the web feeding, controlling and cutting means.

Figure 4—a represents a right side view of the clamp latch.

Figure 4—b represents a left side elevational view of the same.

Figure 4—c represents a right side diagrammatic elevational view of the keeper lug of the clamp latch and of the locking tongue carried by the clamp, illustrating the manner in which said two elements cooperate.

Figure 4—d represents an enlarged side elevational view of one pair of web clamping or gripping jaws forming part of the web control slide shown in Figure 4.

Figure 5 represents a top plan view of the web feeding, controlling and cutting means.

Figure 6 represents a front elevation of the web clamping means, which extend generally transversely of the web feeding means, and which cooperate with the shearing means.

Figure 7 represents a fragmentary side elevational view of the web feeding means, showing the web cutting and clamping means in end view.

Figure 8 represents an end view of the turret head and the series of folding cages carried thereby, and showing the pairs of cage actuating levers for the two cage operating stages of the turret.

Figure 8—a represents a front elevational view of the cigar lifter, in relation to the conveyer belt or feeding belt and in relation to the cigar stop.

Figure 9 represents a side elevational view, partly in section, of the final turret aligning or indexing means.

Figure 10 represents an end elevational view of one of the "wrapping" folding cages in the receiving position, and showing also the cigar lifter which coacts therewith.

Figure 11 represents a similar end elevational view of said folding cage, with the folding jaws shown sufficiently closed, so as to permit the clamping jaws to clamp the sheathing against the two opposed sides of the cigar.

Figure 12 represents a similar end elevational view showing one of the folding jaws moved across the lower face of the cigar, thereby to fold one edge of the sheathing against said lower face of the cigar.

Figure 13 represents a similar end elevational view, showing both folding jaws moved across the lower face of the cigar in the opposite direction so as to fold over the other longitudinal edge of the sheathing, in overlapping relation to the first folded edge of the sheathing.

Figure 14 represents a similar end elevational view showing the two folding jaws disposed centrally, with the two jaw actuating levers ready to swing out of action and entirely clear of the cage so that the cage may then be revolved to the next position by the turret.

Figures 10—a; 11—a; 12—a; and 13—a are somewhat diagrammatic fragmentary end views of the cigar in the successive stages of wrapping represented by Figures 10, 11, 12 and 13 respectively.

Figure 15 represents a top plan view of the turret, in its relation to the actuating levers.

Figure 16 represents a median sectional view of one of the cigar "pushers" forming part of each folding cage.

Figure 16—a represents a top plan view of one of the pivot blocks forming part of each folding cage.

Figure 16—b represents a side elevational view of one of the pivot blocks in relation to the turret head.

Figure 16—c represents a side elevation of one of the web folding arms of a cage as shown in Figure 8.

Figure 17 represents a top plan view of the cigar turntable, and the heat-sealing means, and the end-trimming means.

Figure 17—a represents a section of line 17a—17a of Figure 17.

Figure 18 represents a fragmentary side elevation of the parts shown in Figure 17.

Figure 19 represents an end elevation of one of a pair of opposite shear sleeves of the opposed end-trimming shears.

Figure 20 represents a side elevation of one of the pair of opposite movable shear blades.

Figure 21 represents a side elevation of one of the pair of opposite stationary shear blades.

Figure 22 represents a side elevation of one of the pair of threaded retaining collars which holds the movable and stationary shear blades in operative relation to each other upon the sleeve shown in Figure 19.

Figure 23:
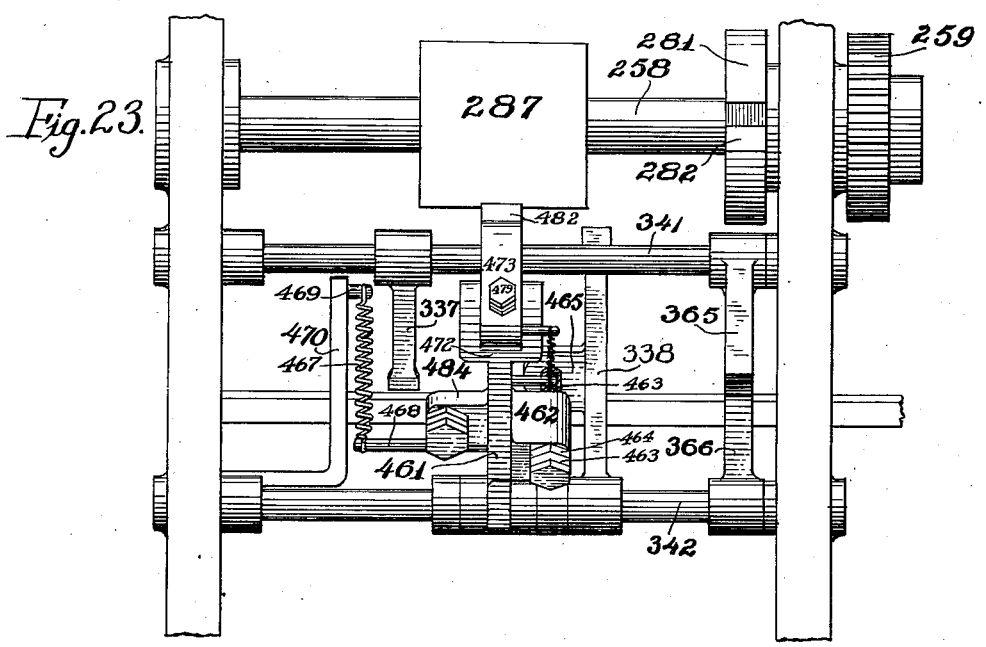

Figure 23 represents a fragmentary rear end elevation of the machine, showing the turntable actuating lever and the folding cage actuating lever, from which said turntable lever borrows its motion.

Figure 24:
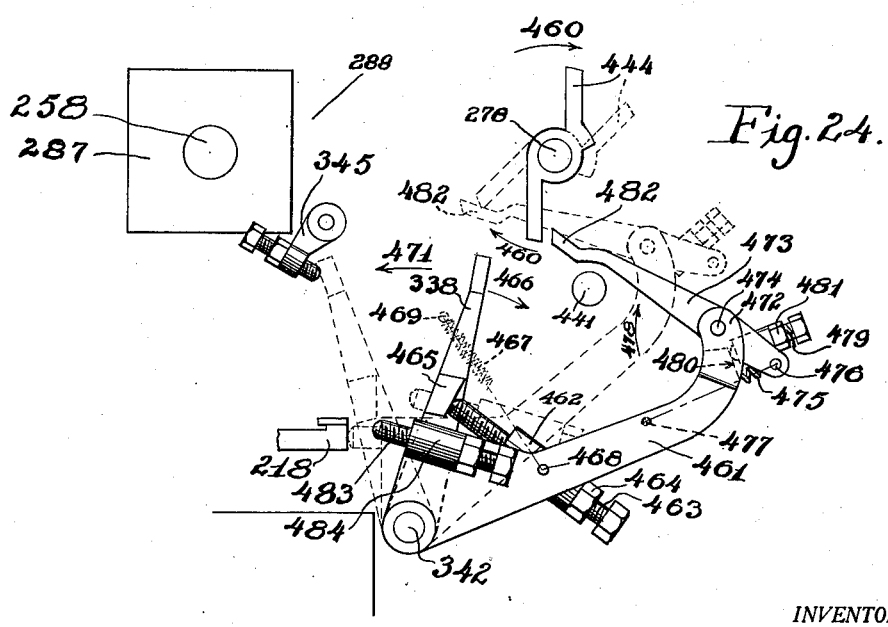

Figure 24 represents a side elevation of said levers.

Figures 25—a, —b, —c, —d, and —e represent development views of a series of cylindrical cams or drum cams, while Figures 25—f and —g represent views of the face cams, by means of which the various elements of the cigar feeding and wrapping mechanism of the machine are actuated.

Figure 25—a shows the cigar-feeding or conveyer cam.

Figure 25—b shows one of the two folding cage operating cams, to wit, the cam which actuates the front cage operating lever in the receiving and folding position of the cage.

Figure 25—c represents the cigar-lifting cam.

Figure 25—d represents the cam which actuates the web shear and also the end trimming shears.

Figure 25—e represents the other of the cams which actuate the rear cage operating lever in the receiving and folding position of the cages and which actuates the cage operating levers on both sides of the cage in the discharge position of the cages, and which also actuates the cigar ejector lever.

Figure 25—f represents the face cam which operates the web feeding and controlling slide.

Figure 25—g represents the face cam which moves the end spinners or end closers in and out.

Figure 26 represents a side elevational view, partly in section, of an alternative form of end folding device, which may take the place of the end spinning devices, as seen in Figure 2.

Figure 27 represents an end view of the four jaws of the end folder shown in Figure 26 in relation to the cigar.

Figure 28 represents a side elevation of a pair of crimping levers, seen in end elevation in Figure 26, which are adapted to complete the end folding operation and to crimp the fold.

Figure 29 represents an end elevational view of the end crimping levers, in relation to the cigar and in relation to the end folders, when closed.

Figure 30 represents a side elevation of one end of a cigar after the end of the wrapping has been folded and crimped by the means shown in Figures 26, 27, 28 and 29.

Figure 31 represents a top plan view of camming surfaces provided upon turntable members, which are adapted to fold in the crimped ends of the wrapping, so that the same may lie flush against the curved ends of the cigar.

Figure 32 represents a side elevational view of a crimping lever and coacting stationary anvil, which are adapted to crimp the spun ends of the wrapping, after the same has been trimmed.

Figure 33 represents an end elevation of the same.

Figure 34 represents a right side elevational view, of the band applying portion of a machine embodying my invention.

Figure 35:
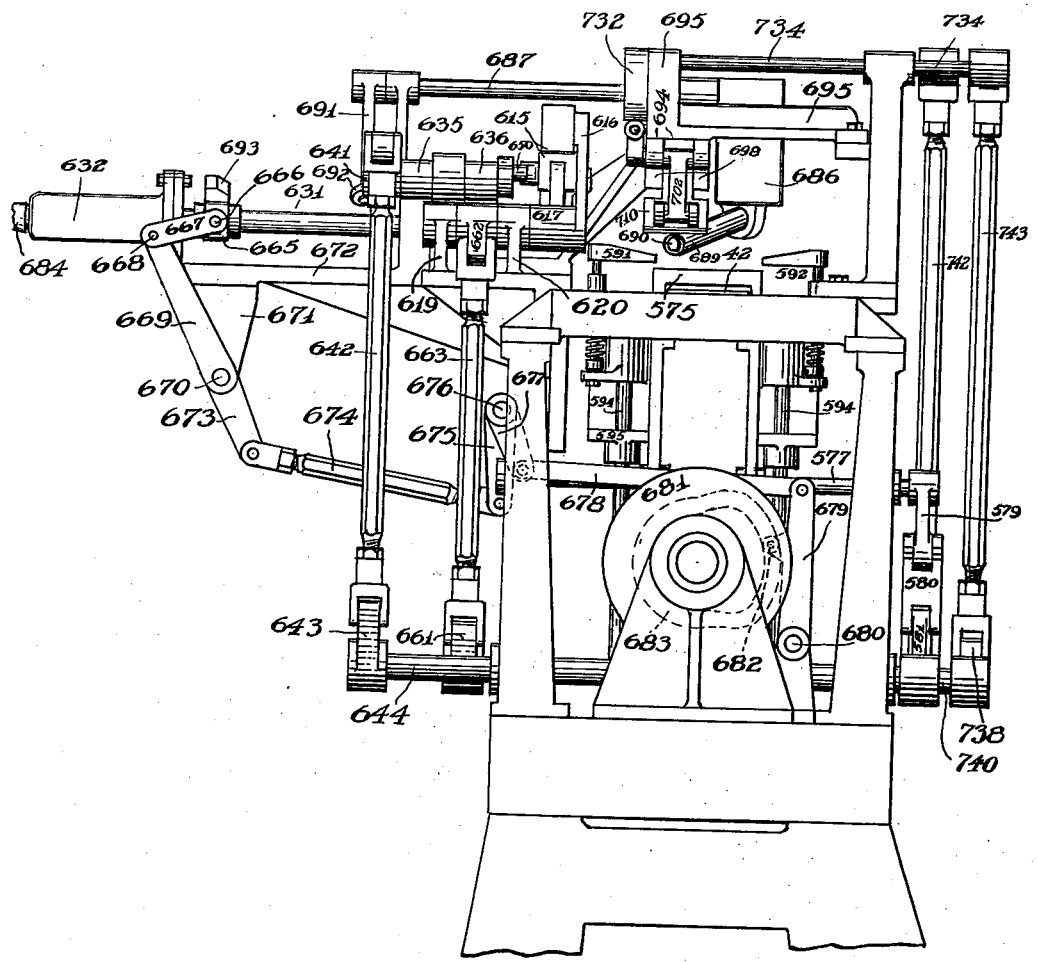

Figure 35 represents an elevational view of the front or receiving end of the band applying portion of a machine embodying my invention.

Figure 36 represents a top plan view of the band applying portion of my machine.

Figure 37 represents a right side elevational view, on a somewhat enlarged scale, of the cigar lifting mechanism and the intermittent cigar stopping mechanism, in their relation to the folding cage and the band transfer and moistener means;—shown at a stage when the cigar is just ready to be raised upwardly for a banding operation.

Figure 37—a represents a longitudinal sectional view, taken generally on line a—a of Figure 37—c, illustrating somewhat more in detail an action of the intermittent cigar stopping mechanism, in one stage thereof.

Figure 37—b represents a view similar to that shown in Figure 37—a, illustrating another stage of the action of the intermittent cigar stopping mechanism.

Figure 37—c represents a plan view of the intermittent cigar stopping mechanism.

Figure 38 represents a view similar to that shown in Figure 37, showing the same elements at a slightly subsequent stage, as the cigar has been brought into contact with the cigar band, and is about to enter the cage with the cigar band clamped between the cigar and the spring pressed plate within the folding cage, and with the moistener in operative engagement with one end portion of the cigar-band.

Figure 39 represents a view similar to that shown in Figures 37 and 38, showing the parts at the next subsequent stage, as the cigar has been raised to the upper limit of its motion into the cage, and as the cage is about to perform the folding operation, and after the moistener has been withdrawn.

Figure 40 represents a view similar to that shown in Figures 37, 38 and 39, showing the elements in the next subsequent stage in the cycle, to wit, after one end of the band has been folded around the cigar and after the band transfer means has been withdrawn and returned into operative alignment with the band magazine (not shown in this figure).

Figure 41 represents a view similar to that shown in Figures 37, 38, 39 and 40, illustrating the next stage of the elements shown, to wit, the completion of the band folding operation.

Figure 42 represents a view similar to that shown in Figures 37 to 41, inclusive, showing the next stage of the elements, to wit, the stage at which the banded cigar has been returned to the conveyer, into its original position in the line, in front of the intermittent cigar transfer stop.

Figure 43 represents a view similar to that shown in Figures 37 to 42 inclusive, illustrating the next of the mechanism, to wit, the stage at which the intermittent cigar stop has been deflected in a forward direction in order to permit the next cigar to be brought into alignment with the cigar lifters.

Figure 44:
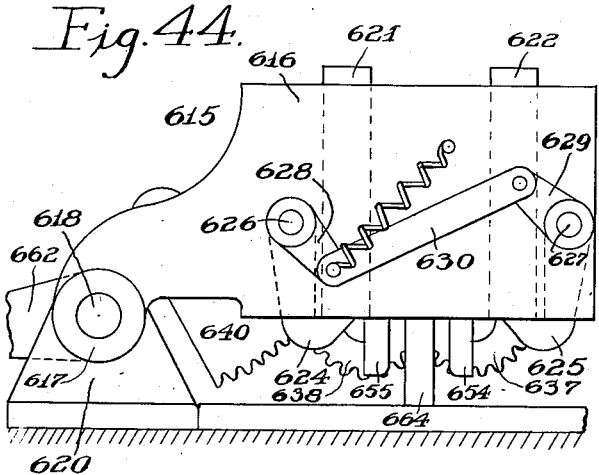

Figure 44 represents a side elevation of the cigar band magazine and transfer mechanism.

Figure 45:
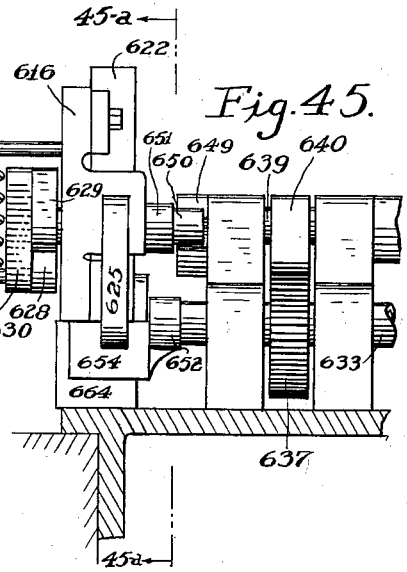

Figure 45 represents an end elevation of the same.

Figure 45—a represents a side elevational view of the cigar band magazine showing its side opposite to its side shown in Figure 44.

Figure 46:
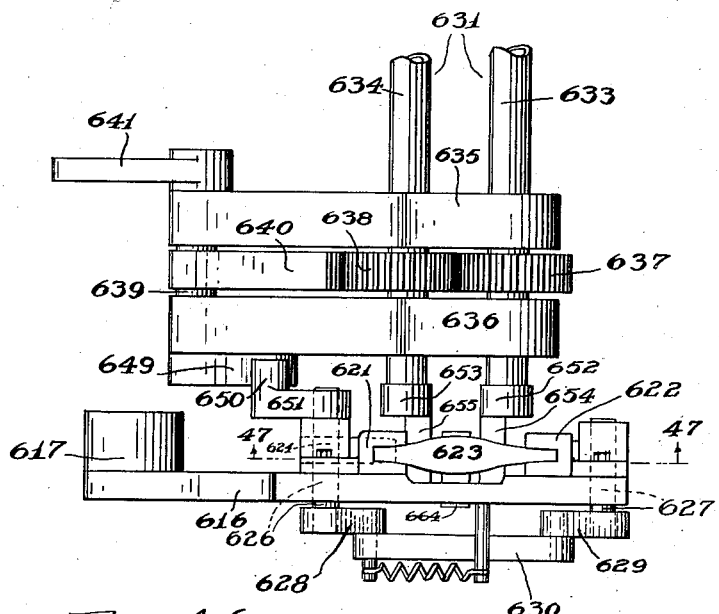

Figure 46 represents a top plan view of the same.

Figure 47 represents a section on line 47—47 of Figure 46.

Figure 48 represents a front elevation of the cigar band magazine in its inoperative position with respect to the band transfer mechanism.

Figure 49 represents a similar view in the next position of the magazine, just as it has been deflected to its lowermost position, into operative relation to the transfer mechanism.

Figure 50 represents a similar view showing the two bottom stops of the magazine deflected outwardly so as to release a band from the bottom of the magazine.

Figure 51 represents a similar view of the magazine after the bottom-most band has been engaged by the successive jaws of the transfer mechanism and bent downwardly, and after the bottom stops of the magazine have been brought back into their closing position again.

Figure 52 represents a similar view after the magazine has been again moved upwardly into an inoperative position so as to permit the single band held by the vacuum jaws of the transfer mechanism, to be moved away into operative relation to the cigar.

Figure 53:
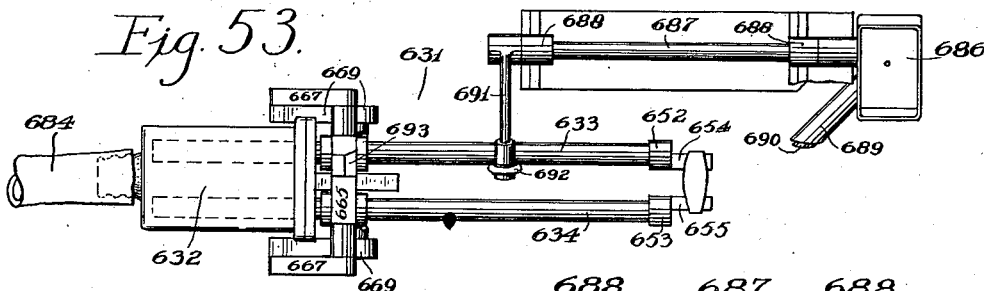

Figure 53 represents a top plan view of the band transfer mechanism (the magazine is omitted) as it is moved towards the cigar.

Figure 54:
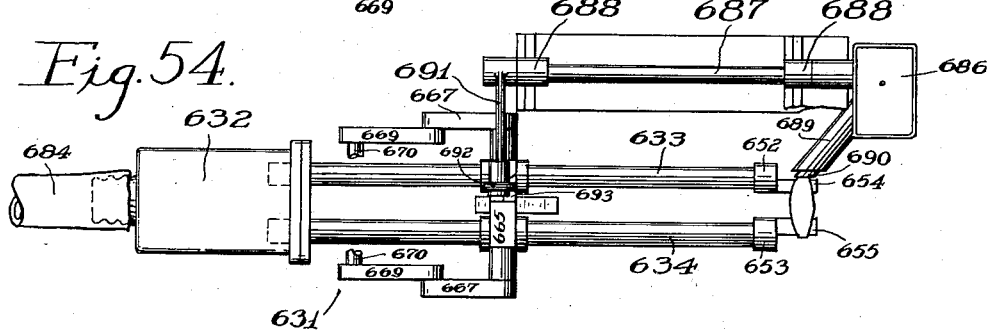

Figure 54 represents a similar top plan view of the cigar transfer mechanism as it reaches the position in juxtaposition to the cigar, and as the moistener is applied to the band.

Figures 55, 56:
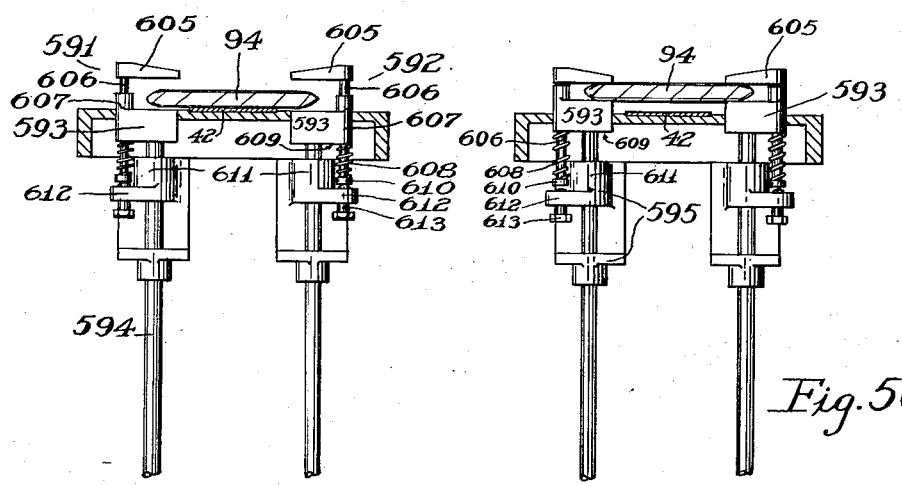

Figure 55 represents a front elevational view of the cigar-lifting mechanism, similar to that shown in Figure 35, with the other parts of the machine omitted for clarity, showing the cigar-lifting mechanism in its lowermost or receiving position.

Figure 56 represents a similar front elevation showing the cigar-lifting mechanism as it starts upwardly.

Figure 57:
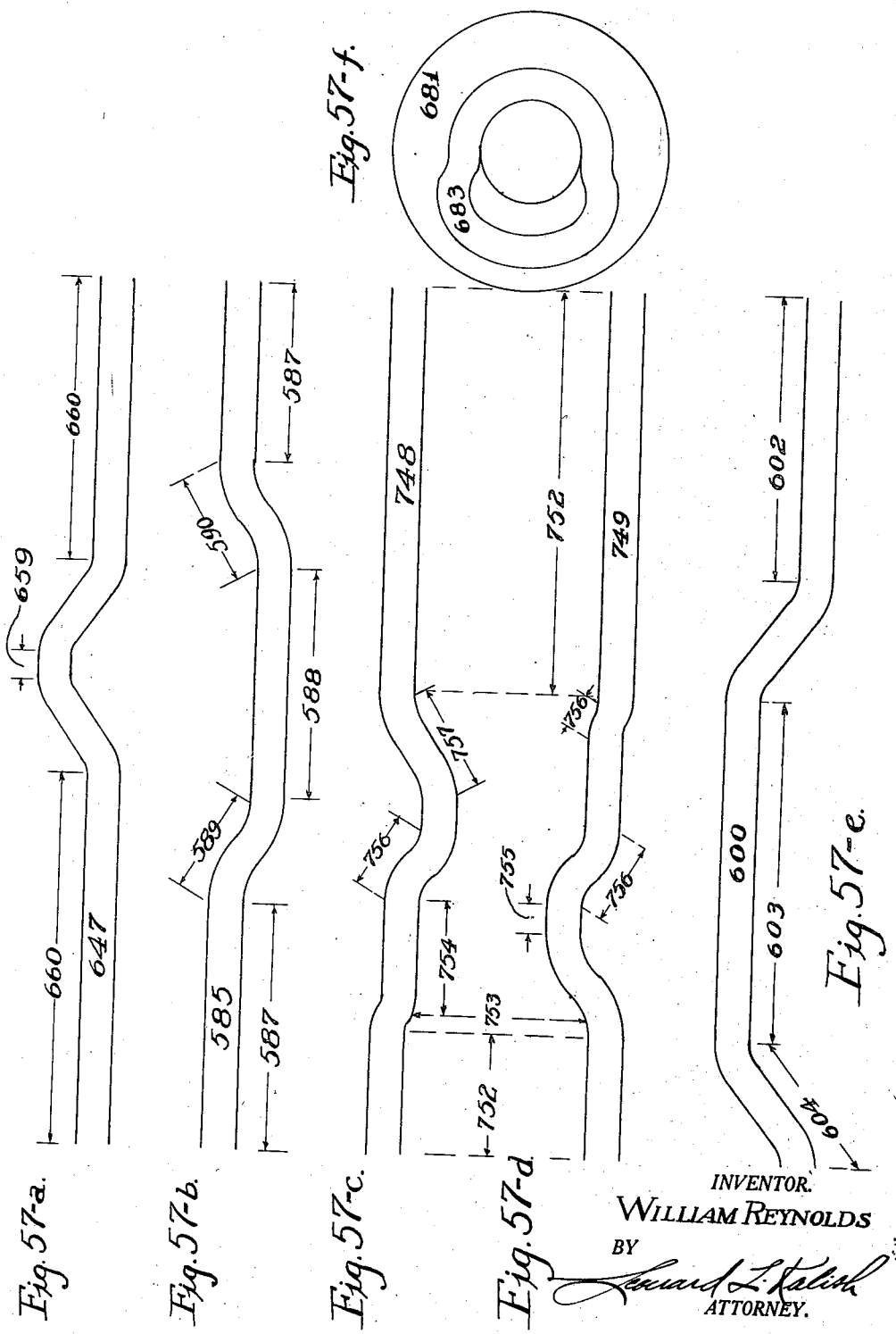

Figures 57—a, —b, —c, —d, —e, and —f, are development views of the various cams forming part of the banding mechanism, to wit:

a is the development view of the drum or cylinder cam which operates the stops or "dogs" at the bottom of the band magazine, and which rotates the successive jaws of the band transfer mechanism in timed relation thereto.

b is the development view of the cylinder or drum cam which raises and lowers the band magazine and which operates the cigar transfer stop in timed relation to the cigar lifter.

c represents the development view of one of the folding cage operating cams.

d represents the development view of the other of the folding cage operating cams.

e represents the development view of the cylinder or drum cam which operates the cigar lifter.

f represents an elevational view which is also a development view of the face cam which gives the transfer slide movement.

Figure 58:
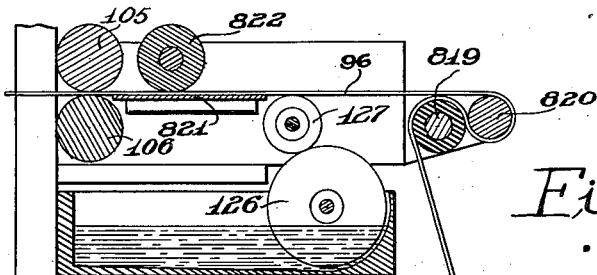

Figure 58 represents a vertical sectional view of an alternative form of "Cellophane" roll-feed assembly, which may take the place of that shown in Figure 2.

Figure 59:
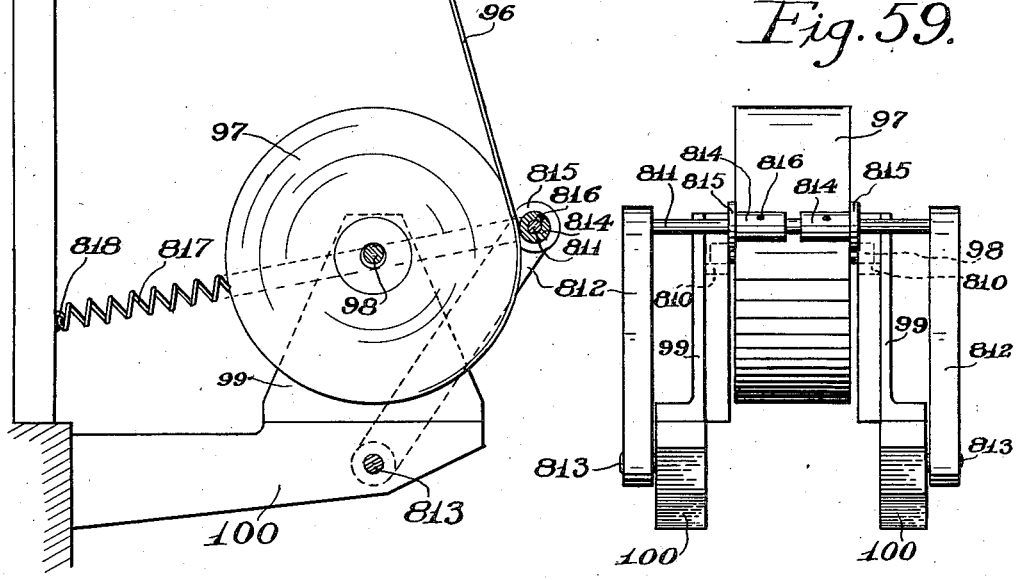

Figure 59 represents a front elevational view of the "Cellophane" feed roll illustrated in Figure 2—c.

Figure 60:
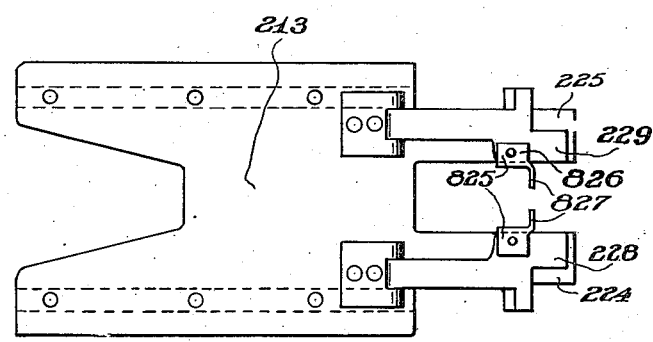

Figure 60 represents a plan view of a web-control slide, illustrating the use of limiting stops on the upper jaws thereof, to define the forward limit of travel of the "Cellophane" strip as it is fed into the machine.

Figure 61:
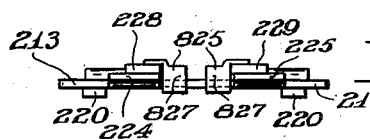

Figure 61 represents a front elevational view of the web-control slide shown in Figure 60.

Figure 62 represents an end elevational view of an alternative form of a "wrapping" folding cage, illustrating the same with the folding jaws shown sufficiently closed, so as to permit the clamping jaws to clamp a sheathing against the two opposed sides of a cigar.

Figure 63 represents a similar end elevational view showing one of the folding jaws moved across the lower face of the cigar, thereby to fold one edge of the sheathing.

Figure 64 represents a similar end elevational view showing the coaction between the two folding jaws and the opposed edge of the sheathing, to stretch said opposed edge across the lower face of the cigar, and to cam the first edge of the sheathing on the upper surface of the opposed edge.

Figure 65 represents a similar end elevational view showing both folding jaws moved across the lower face of the cigar in the opposite direction, so as to complete the folding of the opposed edges of the sheathing, said folding jaws being in their final or "resting" position.

Figure 66 represents a side elevational view, partly in section, of a modified form of end spinning device, shown in the stage just prior to the opening of the jaws.

Figure 67 represents a fragmentary side elevational view of the end spinning device shown in Figure 66, showing the position of the jaws as the jaw-controlling fingers ride over the spreader head.

Figure 68 represents a fragmentary side elevational view of the end spinning device shown in Figure 67, illustrating the position of the jaws when the fingers begin to ride over the slidable spreader sleeve.

Figure 69 represents a fragmentary side elevational view similar to that shown in Figures 67 and 68, showing the relative positions of the jaws and slidable spreader sleeve, when the fingers have completed their stroke over said sleeve.

Figure 70 represents a fragmentary side elevational view similar to that shown in Figures 66, 67 and 68, illustrating the relative position of the slidable spreader sleeve and spreader head when the jaws are urged forward towards the cigar.

Figure 71 represents a fragmentary side elevational view similar to that shown in Figures 66, 67, 68 and 69, illustrating the initial clamping position of the jaws, and the relative positions of the slidable spreader sleeve and spreader head when the jaws are urged still further towards the cigar and illustrating also the initial folding of the end portion of the "Cellophane," affected by the spinning jaws.

Figure 72 represents a fragmentary side elevational view similar to that shown in Figures 66, 67, 68, 69 and 70, illustrating the ultimate clamping and spinning position of the jaws, when the latter are urged to their fullest extent towards the cigar, and showing also the folded and spun end of the "Cellophane" affected by the action of the jaws of the modified form of end-spinning device embodying my invention.

Figure 73 represents a right side elevational view of a modified form of cigar-lifting mechanism and intermittent cigar stopping mechanism, shown at a stage when the cigar is just ready to be raised upwardly for a banding operation.

Figure 74 represents a view similar to that shown in Figure 73, showing the same elements at a slightly subsequent stage, in which a cigar is lifted towards the banding mechanism, (not shown) and the next succeeding cigars are urged away from the lifting means and from the intermittent stop.

Figure 75 represents a view similar to that shown in Figures 73 and 74 showing the same elements in the next subsequent stage, in which the banded cigar is returned to the conveyer belt, and the intermittent stop is in position to limit the forward movement of the next successive cigars.

Figure 76 represents a view similar to that shown in Figures 73, 74 and 75, showing the elements in the next subsequent stage in the cycle, to wit, the transferring of the banded cigar to a point beyond the lifting mechanism, by the intermittent cigar-stopping mechanism, and the positioning of the next successive cigar above the lifting mechanism.

Figure 77 represents a partly fragmentary front elevational view of a modified form of moistener, and moistener assembly, for the cigar banding operation.

Figure 78 represents a partly fragmentary right side elevational view of the mechanism shown in Figure 77.

Figure 79 represents a perspective view, greatly enlarged, of the moistener valve and spraying mechanism shown in Figure 78.

Figure 80:
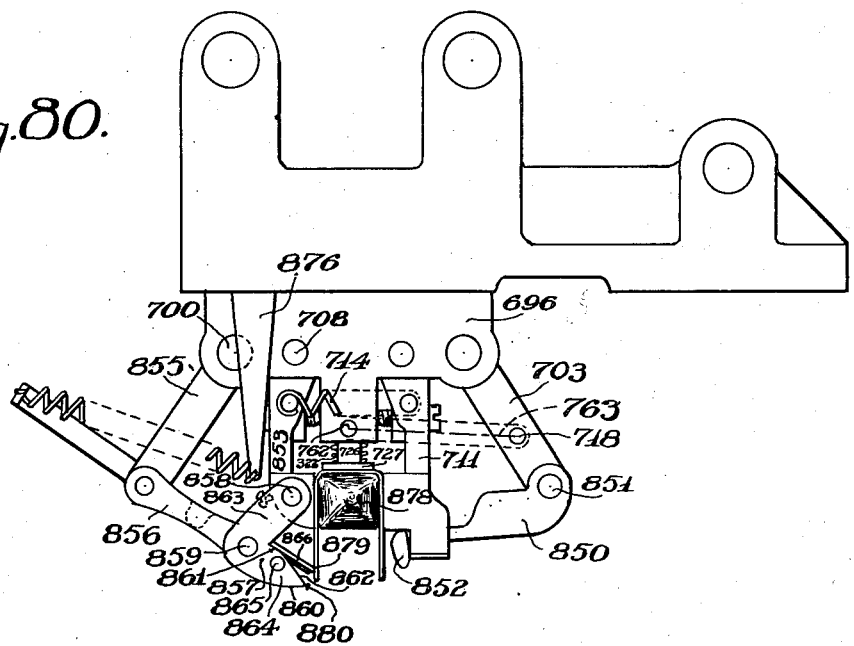

Figure 80 represents an end elevation of a modified form of folding cage embodying my invention, illustrated particularly as a cigar band folding cage, and showing the folding members closed sufficiently to enable the cigar to be clamped by the clamping jaws.

Figure 81:
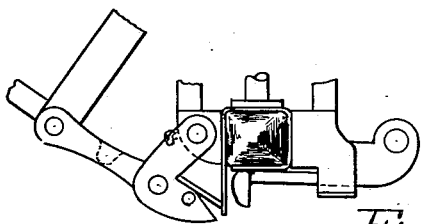
Figure 82:
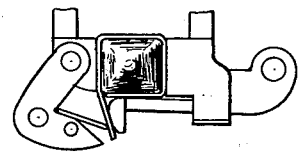

Figure 81 represents a fragmentary end elevational view of the clamping and folding elements of the folding cage shown in Figure 80, with the first folding jaw extended across the lower face of the cigar to fold one edge of the band against said lower face of the cigar. Figure 82 represents a view similar to that shown in Figure 81, illustrating the first stage of the forward stroke of the second folding member across the lower face of the cigar, showing particularly the clamping of the other edge of the band between the first folding member and the leading edge of the folding plate.

Figure 83:
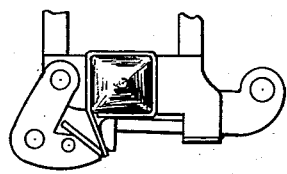

Figure 83 represents a fragmentary end elevational view similar to that shown in Figures 81 and 82, illustrating the second stage of the forward stroke of the second folding member across the lower face of the cigar, illustrating particularly the changed position of the folding plate in its clamping position against the edge of the band.

Figure 84:
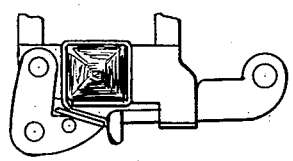

Figure 84 represents a fragmentary end elevational view similar to that shown in Figures 81, 82 and 83, illustrating the third stage of the forward stroke of the second folding member across the lower face of the cigar, showing particularly that portion of the stroke just prior to the freeing of the edge of the cigar band from the first folding jaw, as the edge of the cigar band comes into position against the lower face of the cigar.

Figure 85:
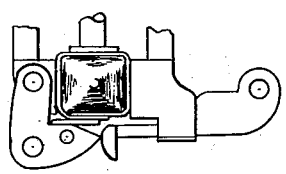

Figure 85 represents the fragmentary end elevational view similar to that shown in Figures 81, 82, 83 and 84, illustrating the fourth stage of the forward stroke of the second folding member across the lower face of the cigar, showing particularly the position of the edge of the cigar band after it has been impacted against the first folded edge of the cigar band, by the freed spring-pressed folding plate.

Figure 86:
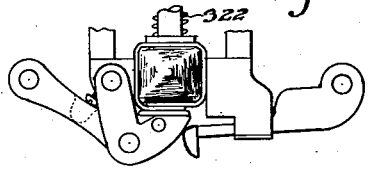

Figure 86 represents a fragmentary end elevational view similar to that shown in Figures 81, 82, 83, 84 and 85, illustrating the final stage of the forward stroke of the second folding member in its passage across the lower face of the cigar, showing particularly the method of impressing the second folded edge of the band against the first, and the means for controlling the same.

Figure 87:
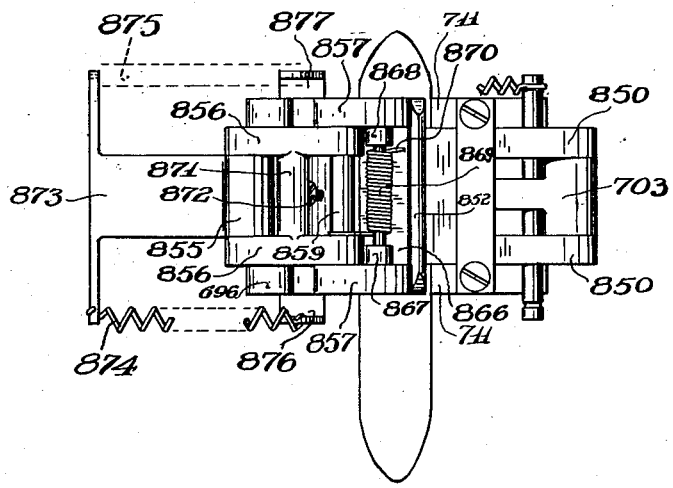

Figure 87 represents a plan view of the modified form of folding cage illustrated in Figure 80.

Figure 88:
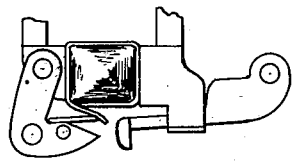

Figure 88 represents a fragmentary end elevational view of the clamping and folding elements of the modified form of folding cage illustrated in Figures 80 and 87; showing an alternative method of folding the free ends of the cigar band about the lower face of the cigar, and showing particularly the first stage of the forward stroke of the second folding member across the lower face of the cigar, after the first free edge of the band has been folded.

Figure 89:
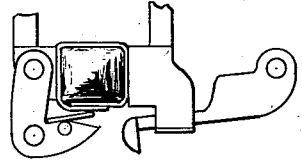

Figure 89 represents a fragmentary end elevational view similar to that shown in Figure 88, illustrating the second stage of the forward stroke of the second folding member across the lower face of the cigar, illustrating particularly the contact position of the folding plate against the second free edge of the cigar band as the latter is brought into position against the lower face of the cigar.

Figure 90:
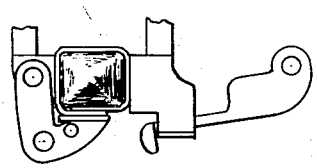

Figure 90 represents a fragmentary end elevational view similar to that shown in Figures 88 and 89, illustrating the last stage of the forward stroke of the second folding member across the lower face of the cigar, showing particularly the means of impressing the folded free ends of the cigar band against each other.

The machine of my present invention may be studied best by a separate consideration of each of several component parts or sections and then by a final consideration of the relation of each of these parts or sections to each other.

The machine is therefore sub-divided merely for purposes of study and consideration into the following parts or sections:

A. 1. Cigar feeding and lifting
    2. Web (Cellophane) feeding, cutting and controlling
      (a) Web feeding
      (b) Web cutting
      (c) Web controlling
      (d) Solvent application
    3. The turret and folding cages carried thereby:
      (a) In the receiving and folding position;
      (b) In the end folding or spinning position;
      (c) In the discharge position;
    4. End spinners, closers, or folders
    5 Turntable
    6. Heat-sealing means
    7. End-trimming shears
B. 8. Cigar banding mechanism
      (a) Transfer stop
      (b) Cigar lifting clamps
      (c) Cigar-band magazine and transfer
      (d) Band moistening
      (e) Band folding

*Cigar feeding and lifting*

The cigars are placed transversely upon a receiving table 40, having a pair of side rails or guides 53, and having a conveyer belt 42 disposed in operative relation thereto, with the upper span of said belt 42 being disposed generally in the upper plan of the table.

The conveyer belt 42 is supported upon the driving pulley 43 at the receiving end of the machine, which is suitably carried upon a shaft 44 (Figure 3), and the idler pulley 45 (Fig. 8) carried upon the shaft or spindle 46 at a point beyond the vertical central plane of the turret 280 (Fig. 8). The slack in the belt 42 is taken up by a suitable idler tensioning roll 48 bearing against the lower span of the belt;—said tensioning roll 48 being idly carried on the free end of the longer arm 49 of a rocker arm pivoted at 50, and through the shorter arm 51 of which a set screw 52 is extended. The end of the set screw bears against a stationary part of the frame, so that by screwing the set screw 52 inwardly, the tension on the belt can be increased, and vice versa.

A pair of parallel and transversely adjustable longitudinal guides 53 are adjustably secured to the table 40, by means of suitable bolts 54, the distance between the parallel guides 53 being adjusted to correspond generally to the length of the particular cigar worked upon, allowance being made for suitable working clearance.

The upper span of the belt 42 is set into the upper surface of the table 40, into a suitable groove or channel, with the upper surface of said upper span of the belt 42 being disposed above the plane of the table 40 to a sufficient extent so as to cause said belt to frictionally engage the cigars placed upon the table.

The intermittent motion of the belt 42 is derived from the cylinder cam 55, which is carried, along with all the other cams, upon the main drive or cam shaft 56 of the machine (Figs. 1, 2 and 3). A pivot 57a carries the cam follower lever 58 on the upper end of which is a suitable cam follower roller which extends into the cam groove 59 so as to follow said cam groove and thereby oscillate the pivot 57a and the lever arm 60 carried thereby. A ratchet stud 61 is adjustably mounted in a generally horizontal slot in the frame of the machine, so that its position relative to the mating shaft 70 may be varied. To the end of this stud 61 (seen in Fig. 1) the ratchet wheel 62 is fixedly secured, and also upon this stud 61 the pawl rocker arm 63 is idly mounted. The pawl rocker arm 63 carries a freely pivoted pawl 64 upon a pivot 65;—said pawl being disposed above and in operative relation to the ratchet wheel 62. An adjustable composite link 66 operatively connects the free end of the lever arm 60 to the pivot point 67 of the pawl rocker arm 63, so that with each oscillation of the pivot 57a, caused by the cam groove 59, the pawl 64 is caused to engage and move the next successive tooth of the ratchet wheel 62.

Upon the ratchet stud 61 any one of a series of change gears 68 are detachably mounted; the said series being of different sizes, to give different feed speeds. Thus for instance a series of gears having 26; 27; 28; 29; 30; 31; 32; 33; 34; 35; 36 teeth may be provided for detachable mounting upon the stud 61. The change gears while detachably mounted upon the stud 61 are keyed or fastened to the ratchet, so that they may be driven by the ratchet wheel 62. The purpose of these speed change gears is to obtain a final variable length of "Cellophane" web which will be described more in detail hereafter. Thus, for each additional tooth in the change gear 68, the length of the "Cellophane" sheet may be increased by $\frac{1}{5}$ of an inch.

To change the feed speed the stud 61 is loosened from the side frame member, by loosening the nut which secures the threaded end thereof in the horizontal slot in the frame. The position of the stud is then adjusted so that the change gear 68 will be in mesh with the gear 69 carried by the mating shaft 70.

The shaft 70 extends through the machine transversely thereof, and carries on the left end thereof the gear 71 (Fig. 3). The gear 71 is in turn in mesh with a pinion 72 carried upon the shaft 73a. A sprocket wheel 74 is also carried by the shaft 73a. An aligned sprocket wheel 75 is carried by the driving belt shaft 44, and the sprocket chain 76 passing over the sprocket wheels 74 and 75 transmits the intermittent rotary motion to the sprocket wheel 75 and hence to the belt driving pulley 43. By this means, the intermittent rotary motion, of predetermined amount, is transmitted from the ratchet wheel shaft 61 to the shaft 70, thence to the shaft 73a and finally to the shaft 44 which carries the belt driving pulley. The proportions and gear ratios in this chain are so arranged that regardless of the change gear 68 employed, the amount of the individual belt movements will be suitably in excess of the width or thickness of a cigar, so that the belt will not only feed the cigars, the width of a cigar each time, but, the belt will also produce the desired crowding of the cigars towards their ultimate destination, to wit, towards the cigar lifter 77 (see Fig. 8). By means of the composite or adjustable connecting rod or link 66 a compensation may be effected for the change of position of the ratchet stud 61, for the varying sizes of change gears 68. This adjustment also affords a final adjustment of the "Cellophane" feed. Thus the distance between adjacent teeth of the ratchet wheel 62 is made slightly greater than the amplitude of the oscillation of the pawl rocker arm 63, or vice versa, the amplitude of the pawl rocker arm oscillations is slightly less than the distance between successive teeth on the ratchet wheel 62. The connecting link 66 is adjustable by means of an intermediate screw-threaded portion 78, which has oppositely threaded screw portions at its opposed ends which are threaded into the terminal members 79 and 80 in the fashion of a screw turnbuckle having also suitable lock nuts 81.

The width of the belt 42 is considerably less than the length of the cigar, so that a suitable proportion of the cigar extends beyond and clear of the belt, while carried upon the latter in a position transversely thereof.

Beneath the turret 280 and generally in a vertical plane passing through the axis of the turret 280, a pair of lifting plungers 82 (one on either side of the belt 42) are slidably mounted in a corresponding pair of brackets 83 having the upper and lower bearings 84 and 85 in vertical alignment with each other, through which said lifting plungers 82 extend (see Figs. 3 and 8). The lifting plungers 82 carry the lifter heads 77 at the upper ends thereof which are adapted to engage the last cigar in the row being fed, which is held in position by the fixed stop 86, and which are adapted to raise said last cigar upwardly at the proper time. The lifting plungers 82 are connected through a corresponding pair of adjustable connecting links 87, to a corresponding pair of lever arms 88 carried on the two ends of the lever pivot 89, which extends transversely of the machine. The pivot lever 89 carries a cam follower lever 90 which in turn carries the follower roller 91 which rides in the cam groove 92 of the cylinder or drum cam 93.

When the conveyer belt 42 has stopped moving, the lifters 77 rise and carry upwardly the last cigar 94 into the open cage in the bottom receiving position shown particularly in Figure 8. The belt 42 then moves again when the lifters 77 are down, and thereby carries the next cigar against the fixed stop 86 into a position above and in operative alignment with the lifters 77. As the cigars 94 are carried up by the lifters 77, one after the other, they are lifted up, first, into contact with a cut piece of sheathing material ("Cellophane") 96, so that, as they are lifted further upwardly into the open folding cage, they carry with them the cut piece of sheathing material into the cage.

In order that the cigars might not crowd in beneath the lifter heads 77 when the lifter heads are in the ratchet position, due to the resilience of the cigars, each of the lifter heads 77 is provided with a downwardly depending skirt or guard member 77—a, which project down sufficiently to act as stops for the row of cigars, when the cigar lifters are up. The downwardly depending skirts or guards 77—a (see Figs. 8 and 8—a), are flush with the front edges of the cigar lifter heads 77, so that they will effectively prevent the cigars getting beneath said heads, while the latter are in their upper positions.

WEB FEEDING, CUTTING AND CONTROLLING

*Web feeding*

The sheathing material 96 ("Cellophane") is supplied in rolls 97 of suitable width;—a supply roll being suitably and idly supported upon a shaft 98 in the bracket 99 which in turn is carried by the frame member 100 (see Fig. 2). The web 96 issuing from the roll 97 passes upwardly over an idle roll 101, down over the tensioning roll or slack-removing roll 102, carried between a pair of lever arms 103, and then passes up over the idle roll 104 into and through the pair of opposed and co-acting feeding rolls 105 and 106 which are positively driven intermittently and to a suitable extent each time, so as intermittently to feed predetermined and uniform lengths of the web 96 issuing from the roll 97. The lever arms 103 are pivotally supported at 107. The roll 97 is carried by a pivot, the two ends of which are freely mounted in vertical channels in the brackets 99, so that said roll 97 may be lowered gradually as the web is unrolled therefrom. The roll 97 at all times rests on a bottom idle roll 108, which prevents the free unraveling of the roll 97, and which compensates for the irregularities of the roll 97, so that the same may pay off truly;—said roll 97 being merely wound on a card-board center which is not altogether "true" or axial.

The rolls 105 and 106 are disposed directly behind the gears 109 and 110 upon the shafts 111 and 112, said gears being in mesh with each other. The roll surfaces contact each other. The diameters of the rolls 105 and 106 are equal and are the same as the diameters of the pitch circles of the gears 109 and 110.

The shaft 112 also carries a bevel gear 113 which is in mesh with a bevel gear 114 carried by the shaft 115, which in turn is supported in bearing brackets 116 and 117. The shaft 115 carries the driven pinion 118, which is constantly in mesh with the gear 119 carried upon the shaft 73 which derives its intermittent rotary motion from the ratchet wheel 62 as described hereinabove in connection with the cigar feeding belt 42. By this means the sheathing web 96 is fed intermittently, and an amount determined by the gear ratio between the gear 119 and the pinion 118, and variable by the change gear 68.

A shaft 120 is also provided, carrying a bevel gear 121 in mesh with another bevel gear 122 carried by the shaft 115. A pinion 123 carried by the shaft 120 is in mesh with a gear 124 whereby the shaft 125 is also intermittently driven, in unison with the shaft 120. The shaft 125 carries a disc 126 which is adjustably secured thereto by means of a set-screw passing through the hub thereof, or by any other suitable means, which may be adjusted longitudinally upon the shaft so as to assume various positions. The shaft 120 in turn carries the upper disc 127 which contacts with the cylindrical periphery of the lower disc 126;—said disc 127 and said disc 126 revolving in opposite directions.

The lowermost portion of the disc 126 dips into a body of liquid solvent material contained within a reservoir 128. The solvent adhering to the periphery of the disc 126 is thereby applied to the upper disc 127, and by the disc 127, it is in turn applied to one of the edges of the "Cellophane"

web 96. The upper disc 127 is similarly adjustably secured to the shaft 120, so that it too may be adjusted longitudinally upon the shaft. By setting the two discs 126 and 127 to the desired position upon their respective shafts, the application of solvent or adhesive may be adjusted to any particular width of "Cellophane" passing through the machine at any particular time. A hand wheel 129 may be provided on the shaft 115 for permitting a manual feeding action for purposes of adjusting the "Cellophane" web to the various feeding actions of the machine, particularly while the machine is being adjusted or set up for a particular cigar.

Web cutting

The "Cellophane" web 96 which is intermittently fed to a predetermined extent by the rolls 105 and 106 (the extent being variable at the will of the operator for varying lengths of cigars, through the adjustment of the effective length of the link 66), passes over a resiliently supported lower clamping plate or member 133, which is set into a corresponding recess 134 in a suitable stationary frame-like block 135. The lower resilient clamping member 133 is urged upwardly by a pair of similar helical compression springs 136, which are housed mainly within corresponding vertical spring chambers 137 in the housing block 135 and partly within corresponding and registering chambers 138 in the clamping member 133.

A pair of limiting rods 139, extend through the housing block 135 in a vertical direction and have their upper ends suitably affixed to or anchored to the lower clamping member 133, and have their lower ends projecting below and beyond the housing block 135 and provided with terminal heads or stops 140, whereby the upward movement of the resiliently supported clamping member 133 may be limited to a predetermined elevation. The limit of upward movement of the resiliently supported lower clamping member 133 is so fixed that the upper and aligned plane surface 141 will be in the same horizontal plane in which the web 96 passes through and between the rolls 105 and 106, when said resiliently supported lower clamping member 133 is in its upper or elevated position.

To the far side or face of the housing block 135 (see Fig. 7) the lower stationary cutter blade or shearing blade 142 is stationarily secured with its generally horizontal cutting edge disposed a slight distance below the feeding plane of the web 96, which is indicated by the dot-and-dash line 143 in Figure 7. Thus, while the web 96 is moving, it passes over the cutting edge of the lower stationary blade 142 with an amount of clearance sufficient to permit a pair of lower clamping jaws (to be described in detail hereinafter) to pass between said web and said lower cutting edge for the purpose of securing a grip upon the free cut end of the "Cellophane" web.

The movable cutting and clamping means, which cooperate with the lower resiliently-supported clamping block 133 and the lower stationary shearing blade 142, are all carried by the horizontal shaft 144, which is journalled in the bearings 145 and 146. The cutter shaft 144 carries an arm or lever 147 which is in turn connected through a composite adjustable connecting rod or link 148, with an arm 149 (see Figs. 1 and 5) carried upon the horizontal shaft 150 which in turn carries the cam follower lever 151. The cam follower lever carries the cam follower 152 which rides in the cam groove 153 in the cylindrical surface of the cam 154. The cutter cam 154 thus carried upon the main cam shaft 56, causes an intermittent and timed oscillation of the arm or lever 147, and therefore causes a corresponding oscillatory rotation of the shaft 144.

To the end of the cutter shaft 144, the bifurcated hinge member 155 is rigidly or fixedly secured, carrying a pivot pin 156 generally at a right angle to the shaft 144. To the bifurcated pivot member 155, the upper or movable cutter arm 157 is pivotally secured by means of the pintle or pivot 156. To the movable cutter arm 157, the movable shearing blade 158 is secured so as to be carried thereby, in operative alignment with the stationary shearing blade 142. Thus, the movable cutting arm 157 and movable blade 158, while being positively deflected up and down about the axis of the shaft 144, are also free to be deflected about the pivot 156. A helical tension spring 159 is operatively interposed between the movable cutter arm 157 and some stationary frame portion of the machine, so as constantly to draw the movable blade 158 against the stationary blade 142.

While the cutting edge of the stationary blade 142 is straight, the cutting edge of the movable blade 158 is very slightly curved transversely to the plane passing through the axis of the shaft 144, so that the edge of the movable blade 158 contacts with the edge of the stationary blade 142, during the cutting operation, with a slight rolling effect and with the two cutting edges crossing each other at a very slight angle at all times during the cutting action.

To the very end of the shaft 144, directly beneath the bifurcated pivot member 155, the movable upper "Cellophane" clamping member 160 is pivotally secured and retained by a nut 161. Thus, the upper clamping member 160 is loosely or freely pivoted upon the shaft 144 and movable with respect thereto, while the bifurcated hinge or pivot member 155 is fixedly secured to said shaft 144. This permits relative angular displacement between the upper clamping member 160 and the cutter arms 157 and blade 158, in a plane at a right angle to the shaft 144. A lug 162, carried rigidly by the bifurcated pivot member 155, is adapted to abut against and engage the inclined surface 163, when the shaft 144 as well as the bifurcated pivot member 155 and a cutter arm 157 are rotatively deflected in the direction of the arrow 164 (see Figs. 5, 6 and 7). This engagement causes the upper web clamping member 160 to be similarly deflected in the direction of and into operative juxtaposition to the lower resiliently-supported clamping member 133, whenever the cutter arm 157 and cutter 158 are deflected downwardly for the cutting operation. A helical tension spring 165 operatively interposed between a suitable spring anchorage 166 on the cutter arm 157, and a suitable spring anchorage carried by the upper clamping member 160, tends to draw the upper web-clamping member 160 upwardly in a direction of the arrow 167 when the cutter arm 157 is again deflected upwardly into the inoperative position;—tending to cause the web-clamping member to follow the cutter in the upward or inoperative direction.

The lowermost position of the upper web-clamping member 160 is as shown in Figure 6, with the lower surface of said web-clamping member 160 disposed in the plane 143 in which the web is fed. In this position the lower or clamping surface of the upper web-clamping member 160 is spaced a slight distance above the upper-clamping surfaces 141 of the lower web-clamping member 133 and a corresponding distance above cutting edge of the lower stationary blade 142;—when said lower web-clamping member 133 is in its lower or deflected position shown in Figures 6 and 7.

To the shaft 144, or more particularly to the somewhat elongated hub member 168 of the bifurcated hinge member 155, a deflector arm 169 is rigidly secured by means of the bolts 170, which extend through the right angular portion 171 of said deflector arm 169. The deflector arm 169 thus moves in unison with the cutter arm 157 in both directions indicated by the arrows 164 and 167. The free end of the deflector arm 169 carries a bolt housing 172, generally at a right angle thereto;—said bolt housing 172 having a bearing aperture extending therethrough generally at a right angle to the arm 169 for the reception of a spring-pressed deflector bolt or finger 173. The deflector bolt or finger 173, slidably mounted within the bolt housing 172, is provided with an upper terminal or head-portion 174 to limit the downward movement of said bolt with respect to the housing 172 and lever 169, and is provided with a lower terminal button 175 which is adapted to exert the downward deflecting force upon the lower resiliently-supported web-clamping member 133 by contact or abutting engagement with the "Cellophane" web disposed directly above said web-clamping member 133. A helical compression spring 176 is operatively interposed between the contact button 175 and the housing 172 for tensioning the deflector bolt or finger 173 in a downward direction with force or pressure suitably in excess of the combined force of the pair of helical compression springs 136 which tend to urge the lower web-clamping member 133 in an upward direction. In the illustration shown in Fig. 6, the bolt housing 172 is shown partly broken away, so as to expose to view the enlarged recess or spring chamber into which the upper end of the helical compression spring 176 is inserted.

When the cutter arm 157 and deflector arm 169 are in their uppermost or inoperative position (shown in Figs. 1 and 5) the spring-pressed deflector bolt or deflector finger 173 is projected downwardly with respect to the deflector arm 167 to the limit of its movement. Thus, when the cutter arm 157 and deflector arm 169 are deflected downwardly in the direction of the arrow 164, the contact button 175 of the deflector finger 173 will be suitably in advance of the deflector arm 169 so that the deflector finger 173 will abut and contact with the web 96 and will depress the lower spring-supported web-clamping member 133 into its lowermost position shown in Figures 6 and 7, into operative alignment with the cutting edge of the lower blade 142, slightly before the upper cutting blade 158 reaches the web to be cut, so that when the upper cutting blade 158 reaches the web to be cut, the latter will be deflected downwardly and will be positioned upon and in contact with the cutting edge of the lower stationary blade 142, which, as pointed out hereinabove, is positioned suitably below the feeding plane 143 of the web 96. By this means, the lower web clamping member 133 as well as the web 96 are deflected downwardly a slight distance preliminary to the shearing or cutting operation by the advance action of the spring-pressed deflector finger 173. When the lower web-clamping member 133 has been deflected to its lower limit of movement, the continued downward deflection of the deflector arm 169 (along with the cutter arm 157) merely further compresses the spring 176. This also effects a temporary clamping of the "Cellophane" web to the upper clamping surface of the web clamping member 133 during the cutting operation.

To one end of the housing block 135, a clamp latch member 177 is pivotally secured by means of a suitable pivot screw 178 disposed in a horizontal position. The clamp latch 177 is provided with a laterally projecting keeper lug 179, which is adapted to ride over and engage a corresponding and coacting laterally projecting tongue 180 carried on the free end of the upper web-clamping member 160. The keeper lug 179 and the tongue 180 are provided with corresponding camming surfaces 181 and 182 respectively, so that as the upper web-clamping member 160 is deflected downwardly, the two camming surfaces 181 and 182 engage each other first causing the latch member to be deflected in the direction of the arrow 183 until the tongue 180 passes the keeper lug 179. The deflection of the latch member 177 is effected against the opposed deflecting force exerted by the helical tension spring 184, which is operatively interposed between said latch member 177 and some stationary point 185 on the machine. The instant the tongue 180 passes the keeper lug 179, in a downward direction, the latch member 177 is deflected back into its original position by the spring 184, thereby causing the keeper lug 179 to ride over the tongue 180 so as to lock the upper web-clamping member 160 in its lowermost position. This locking action takes place approximately the instant the cutter arm 157, the blade 158 and the upper web-clamping member 160 have reached their lowermost position.

When the cutter arm 157 and the deflector arm 169 start on their upward travel, into their inoperative positions, they leave behind the upper web-clamping member 160 by reason of this locking action;—the effect of the clamping member 160 being left behind being merely to tension the takeup spring 165 to a corresponding extent.

As the deflector arm 169 and the deflector finger 173 move upwardly on their return stroke in the direction of the arrow 167, (Fig. 6) the lower web-clamping member 133 is moved upwardly by the springs 136 so that firm clamping contact is retained on the "Cellophane" web, between the contact button 175 of the deflector finger 173 and the upper clamping surface of the lower web-clamping member 133, until said lower web-clamping member 133 presses the "Cellophane" web directly against the lower clamping surface of the upper locked web-clamping member 160;—so that the clamping action of the deflector finger 173 upon the "Cellophane" web is automatically replaced by the clamping action between the two web-clamping members 133 and 160 at the same instance.

Viewed from above, the outline or plane view of the upper web-clamping member 160 is such as to provide a suitable recess 186 for clearing the deflector button 175 of the deflector finger 173, and so as also to provide a pair of similar recesses 187 and 188 directly above and in operative alignment with the recesses 189 and 190 in the lower web-clamping member 133, for the reception or clearance of the pairs of web-clamping jaws referred to hereinabove and to be described in detail hereinafter. This outlining or contour of the upper web-clamping member 160 is best observed in Figures 5 and 6.

If desired, a plurality of spring-pressed deflector fingers 173 may be provided and carried by the deflector arm 161, so as to engage the lower web-clamping member 133 at a multiplicity of points simultaneously, for the purpose of deflecting the same downwardly against the force of its spring supports, and for the purpose of affording a multiplicity of gripping points or clamping points on the "Cellophane" web during the cutting operation.

The clamp-latch member 177 is also provided with a laterally projecting trip lug 191, which projects into the path of a corresponding lug 192, carried by one of the reciprocating clamping jaws to be described in detail hereinafter, whereby the clamp-latch 177 is again deflected in the direction of the arrow 183, against the tension of the spring 184, for the purpose of releasing or unlatching or unlocking the upper web-clamp member 160, the same instant that the clamping jaws take hold of the free end of the "Cellophane" web. When thus again unlatched or unlocked, the upper web-clamping member 160 swings upwardly in the direction of the arrow 167 under the force of the spring 165 until the inclined surface 163 of said web-clamping member 160 abuts the lug 162 in the extreme upper or inoperative position.

Web controlling

Upon the main shaft 56 of the machine a face cam 193 is provided, having a cam groove 194 of suitable contour in the face thereof, which is adapted to receive the follower roller 195, rotatably carried on the free end of a lateral projection 196, which latter is in turn carried rigidly by, or formed integrally with the rocker arm 197 at a point intemediate its two ends. The lower end of the rocker arm 197 is pivoted at 198 to a bracket 199 carried by the housing or frame of the machine. To the upper or free end of the rocker arm 197, an adjustable connecting link or connecting rod 200 is pivotally secured at 201. The adjustable connecting rod or link 200 is formed of the terminal portions 202 and 203 and the intermediate portion 204, which are screw-threaded together and locked by suitable lock nuts, so that their linear adjustment may be fixed. The terminal member 203 of the connecting link 200 is pivotally attached to a pivot bolt or pivot pin 205, which is adjustably mounted in the lower slotted end 206 of a rocker arm 207. The rocker arm 207 is pivoted at 208 upon the bracket 209 carried by the machine frame or housing;—the pivot shaft 208 extending through the relatively elongated hub 210 in said rocker arm. The upper arm 211 of the rocker arm 207 terminates in an upper pivot hub 212, to which the web controlling slide 213 is flexibly connected through the connecting link 214, one end of which is pivotally attached to the arm 211 by means of the pivot bolt 215, and the other end of which is pivotally attached to the pivot bracket 216 (affixed to the slide 213), by means of the pivot bolt 217. The slide 213 in turn carries pairs of juxtaposed and co-acting web controlling or gripping jaws which engage the free end of the web 96 just before the web is fed for the predetermined length, and which travel generally simultaneously and co-extensive with the feeding motion of the web 96, so as to lead the free end of the web under constant control and to prevent buckling and other distortion of the feed end of the web 96.

The slide 213 is in the form of a flat plate, which rests on the two sides 218 and 219 respectively, of the stationary slide table or slide bed. The slide 213 is guided laterally by means of keys or key blocks 220, which are affixed to the under side of the slide plate 213 by rivets or the like, and which slide within the parallel channels 221 of conforming contour and dimensions, thereby to give the slide 213 accurate lateral guidance. The vertical guidance is given to the slide plate 213 by the upper plane surfaces of the slide beds 218 and 219, and by the retaining strips 222, secured to the outer parallel edges of the slide beds 218 and 219, with their inner edges overhanging the outer edges of the slide plate 213 to a suitable extent and with the under surface of the overhanging portions of the retaining strips 222 spaced above the plane guiding surface of the beds 218 and 219, a distance equal to the thickness of the slide plate 213, plus working clearance. (See Figures 4, 5 and 10.)

The front end of the slide plate is bifurcated at 223, so as to form a pair of spaced lower stationary jaws 224 and 225 respectively, the front ends of which are slightly offset in an upward direction from the horizontal plane of the slide plate 213.

To the upper surface of the slide plate 213, and in longitudinal alignment with each of the lower stationary jaws 224 and 225, pivot blocks 226 and 227 are secured. To the pivot blocks 226 and 227 corresponding movable jaws 228 and 229 are pivotally secured at pivots 230. The free ends of the upper movable clamping jaws 228 and 229 are adapted to coact, respectively, with the corresponding lower stationary jaws 224 and 225, to effect a clamping or gripping engagement with respect to a thin web which may be placed between said upper and lower jaws;— the juxtaposed or effective surfaces of said jaws being substantially parallel to each other in their clamping position.

Corresponding leaf springs 231 and 232, are affixed to the pivot blocks 226 and 227, with their free ends resiliently engaging and depressing the pivotal upper jaw members 228 and 229 respectively, tending to close down the upper movable jaws with respect to the lower stationary jaws.

Each of the movable and pivotally mounted upper clamping jaw members 228 and 229 carries a corresponding oppositely and outwardly projecting cam follower lug 192, which are adapted to be acted upon by stationary cams at the rear end of the reciprocatory travel of the slide 213 and which are adapted to be acted upon by two-way switch cams at the forward end of the reciprocatory travel of the slide 213.

The pair of front switch cams 233 and 234 are pivoted to the stationary beds 218 and 219 respectively, at the pivots 235. The switch cam members 233 and 234 carry laterally and inwardly projecting cams 236 and 237 respectively, having corresponding upper cam surfaces 238 and corresponding lower cam surfaces 239, which are in operative alignment with the laterally outwardly projecting cam follower lugs 192 carried by the movable cam jaw members 228 and 229 respectively.

The slide 213 moves forwardly in the direction of the arrow 240, and as it approaches the forward limit of its movement in the direction of the arrow 240, the cam follower lugs 192 ride up on the upper inclined cam surfaces 238 of the cams 236 and 237 respectively, and over the upper horizontal surfaces 241 of said cams, thereby deflecting upwardly or elevating the upper movable clamping jaws 228 and 229 simultaneously against the tension of the springs 231 and 232, just before the slide 213 and the clamping jaws carried thereby reach their forward limit of movement.

The lower stationary jaws 224 and 225 are at an elevation slightly below the feeding line 143 of the web 96, while the upper jaws 228 and 229 are slightly above said level. When the pairs of coacting jaws 224 and 228, and 225 and 229, approach their forward limit of movement, the lower jaws will be below the free end of the web to be gripped, while the upper jaws will be above the same;—said pairs of coacting jaws entering the recesses 187 and 188 of the upper movable web-clamping member 160, and the recesses 189 and 190 in the lower web-clamping member 133.

As the slide 213 and the clamping jaws carried thereby reach their forward limit of travel, or very slightly in advance of said forward limit of travel, the trailing edges of the cam follower lugs 192 pass beyond the forwardmost edges of the upper horizontal cam surfaces 241 of the cam members 236 and 237, thereby releasing the upper movable clamping jaw members 228 and 229, which, when thus released, are instantly closed down, both by force of gravity, but more particularly by the springs 231 and 232, so that they instantly clamp down upon the web 96 and clamp the same between themselves and the coacting lower jaws 224 and 225 respectively.

During the entire forward travel of the slide 213 and the clamping jaws carried thereby, the web feeding mechanism, including the rolls 105 and 106, are stationary. Substantially simultaneously with the rearward movement of the slide 213 in the direction of the arrow 242, the web feeding mechanism, including the rolls 105 and 106, is again set into motion;—the slide 213 being actuated by the cam 193 through the rocker arm 207 and link 214, while the web feeding mechanism is actuated by the cam 55, through the ratchet 62, as described hereinabove.

The travel of the slide 213 is adjusted to the time of the feed rolls 105 and 106, first by the adjustment of the cam 193, and then by the adjustment of the coacting link 200, and the position of the pivot bolt 205 in the slot 243. Thus, the final adjustment of the length of the stroke of the slide 213 is effected through the positioning of the pivot bolt 205. By raising the pivot bolt 205 in the slot 243 the length of the stroke of the slide 213 is increased, while the lowering of the pivot bolt 205 in the slot 243 decreases the length of the stroke of the slide 213. Likewise, the lengthening of the connecting link 200 shifts the two limits of travel of the slide 213 forwardly towards the web-clamping members 133 and 160, while the shortening of the link 200 shifts the two limits of travel of the slide 213 in a rearward direction indicated by the arrow 242. By this means the free or leading end of the web 96 may be guided by the clamping jaws carried by the slide 213, in advance of the feeding motion, so that the web is neither subjected to any substantial tension by the clamping jaws, nor is the web permitted to buckle or distort.

At the rear end of the travel of the upper or movable clamping jaws 228 and 229, the pair of stationary cams 244 and 245, respectively, are provided;—adjustably secured to the beds 219 and 218, respectively, by means of screws 246 and 247, which extend through adjustment slots 248 and 249 in said stationary cam members. The stationary cam members 244 and 245 are provided with the upwardly and rearwardly inclined cam surfaces 250, which are in operative alignment with the cam follower lugs 192, carried by the movable clamping jaw members 228 and 229, so that when the slide 213 and the clamping jaws carried thereby have guided the "Cellophane" strip or web to the required length corresponding to the length of the cigar to be wrapped, and when said length of "Cellophane" web has been properly positioned with respect to the two ends of the cigar, the upper clamping jaws 228 and 229 will be automatically elevated, so as to release the grip of the clamping jaws from the "Cellophane" web. This cycle of operation of the jaws is repeated with each stroke of the slide 213, the upper clamping jaws being acted upon by the front switch cams and rear stationary cams, respectively. The rear stationary cams 244 and 245 are adjusted longitudinally, so as thereby to govern not only the exact length of the "Cellophane" web to be applied to the cigar, but so as also to govern the exact longitudinal positioning of the "Cellophane" web with respect to the cigar.

A pair of similar and opposed stationary guides 251 and 252 are secured to the beds 219 and 218 respectively, in spaced parallel relation to each other, with their front ends curved up as at 253, so as further to guide the "Cellophane" web and to restrict it substantially to a plane when in operative alignment with the cigar;—the spacing between said guides 251 and 252 being sufficient to permit the cigar to be passed upwardly between said guides as it is being fed into the wrapping mechanism, to be described hereinafter, during which upward movement the cigar carries with it the predetermined and cut piece of "Cellophane".

The front or forward limit of movement of travel of the slide 213 and the clamping jaws carried thereby is further and still more accurately adjusted, particularly so as to eliminate the slack or back-lash due to the reversal of the cam action, by means of an adjustment screw 254 threadedly extended through a corresponding boss 255 in the lever arm 211, with the free end of the adjustment bolt 254 contacting against a stationary point 256 of the frame or housing of the machine, so as to set an accurate limit of travel at the forward end, free of any irregularities or variations due to the cam action. The adjustment of the screw 254 may be locked by a lock nut 257.

To more accurately limit the backward movement of travel of the slide 213, a longitudinally apertured lug 800 is provided in the rear portion of the slide bed 218, having an adjustment screw 801 extending through said aperture and threadedly connected thereto, and adapted at its free end 802 to contact against an abutment block 803 fixedly secured to the rear portions of the slide 213. The screw 801 and screw bearing lug 800 are so disposed with relation to the block 808 borne on the slide 213 that adjustment may be made to permit the backward limit of slide travel to be extended from that sufficient to draw out the smallest length of web needed, to that sufficient to draw out the longest length of web expected to be needed to cover the longest cigars going through the machine.

The timing of the web feeding rolls 105 and 106 and the cutter shaft 144, and the web-cutting and web-clamping actions dependent upon said shaft, and the action of the slide 213 and web controlling clamping jaws carried thereby, is so adjusted that the cutting mechanism is inactive during the feeding movement of the feeding rolls 105 and 106 and of the controlling movement of the slide 213, and is rendered active the instant the feeding and controlling movements stop, and vice versa.

THE TURRET, AND FOLDING CAGES CARRIED THEREBY

*In the receiving and folding position*

Directly above and in vertical alignment with the cigar lifter 77, a horizontal turret shaft 258 is provided, extending transversely through the upper frame structure of the machine and suitably journalled therein;—said shaft being parallel to the lifter member 77 and hence generally parallel to the cigar.

One end of the turret shaft 258 extends suitably beyond the stationary frame of the machine and the free projecting end thereof carries a pinion 259 keyed thereto.

In the lower portion of the frame a horizontal counter shaft 260 is provided at a right angle to the main shaft 56, with its axis preferably aligned in the plane of the axis of the main shaft 56. The counter shaft 260 is permanently geared to the main shaft 56 by means of the bevel gears 261 and 262 carried by the main shaft and counter shaft, respectively, as seen particularly in Figure 1. The counter shaft is supported and journalled at two points, one in the main frame of the machine and one in the auxiliary bearing pedestal 263.

To the counter shaft 260 the driving detent wheel 264 is secured, having a suitable number of teeth over a portion of its periphery, less than one-fourth, and with the remainder of the periphery in the form of a cylindrical surface. Above, and in operative alignment with the detent wheel 264, the escapement wheel 265 is provided upon another shaft 266. The escapement wheel 265 is provided with four circumferential equidistant concavely cylindrical locking surfaces 267, which, when in operative juxtaposition to the cylindrical locking surface 268 of the lower detent wheel, will coact therewith and interlock therewith, to prevent rotation of the escapement wheel 265. Intermediate each of the locking surfaces 267, a number of gear teeth 269 are provided, corresponding to the gear teeth 270 on the detent wheel 264. Thus, the continuous rotation of the detent wheel 264 will impart an intermittent rotary motion to the escapement wheel 265;—the escapement wheel 265 remaining stationary through the greater part of each revolution of the detent wheel 264, and the escapement wheel 265 being turned through one complete revolution, in four intermittent stages, by four complete revolutions of the detent wheel 264 and the counter shaft 260.

Upon the counter shaft 266 a drive pinion 271 is provided, which in turn is in mesh with idle gear 272, carried upon any suitable shaft or stud or pivot 273, and said idle gear 272 in turn transmits its intermittent rotary motion through a train of idle gears 274, 275 and 276, to the driven pinion 259 carried by the turret shaft 258;—each of said idle gears being in turn suitably pivoted upon corresponding shafts or studs 277, 278 and 279, respectively. By this means an intermittent rotary motion of 90 degrees is imparted to the turret shaft 258 at predetermined intervals, during which intervals the turret shaft is stationary.

In order more accurately to index the turret shaft 258 and the turret 280 carried thereby, an index head 281 is also provided on the turret shaft 258, having four peripherally equidistant notches or depressions 282 in the outer periphery thereof, each of which is adapted to receive, in turn, the spring pressed index aligning finger or plunger 283. The index aligning finger or plunger 283 is suitably mounted in the guide blocks 284 and 285, which are attached to the inner wall of the housing or frame of the machine;—and said finger is urged by the helical compression spring 286. As the turret shaft is rotated 90 degrees, through the detent and escapement wheels 264 and 265, and the train of intermediate gears, the spring-pressed index aligning finger 283 engages a corresponding notch 282, and causes a more accurate indexing of the turret shaft and turret head, and prevents any looseness or back lash or other inaccuracy due to the momentum of the turret.

The turret 280 is composed of a generally rectangular head 287, which is keyed to the turret shaft 258, and the four plane and right angular sides of which are disposed in horizontal and vertical positions, respectively, in each of the index positions of the turret shaft 258. To each face of the generally rectangular turret head 287, a folding mechanism, hereinafter referred to as a folding cage 288, is secured, preferably in a detachable manner. Each folding cage 288 includes a pivot block 289, one of which is detachably, though rigidly, secured to each plane face of the turret head 287, and each of which in turn houses a certain cigar ejector member and which also supports a corresponding series of pivots on which the movable cigar clamping and web folding and wrapping members are pivotally mounted.

The central portion 290 of the pivot block 289, is of greater radial depth than the two outer portions 291 and 292 of said pivot block;—said two outer portions being bifurcated so as to provide opposed parallel pivot bearing members 293 and 294, respectively. The opposite ends of each pivot block 289, carry similar and opposed transverse pivots 295 and 296, extending across the bifurcated members 293 and 294. Upon each of the two opposed outer pivots 295 and 296, a pair of similar and spaced parallel levers 297 and 298 are fixedly mounted. Corresponding pivot pins 299 and 300 extend through the free ends of the pair of levers 297 and the pair of levers 298, respectively, and extend beyond the same, to give pivotal support to corresponding pairs of bifurcated ends 301 and 302, of the folding members 303 and 304 respectively, (see Figures 8 and 15).

A pair of opposed and inner pivot pins 305 and 306 are also provided in and transversely of each pivot block 289, and upon said pivot pins 305 and 306, corresponding cigar clamping arms or levers 307 and 308, respectively, are pivotally mounted.

Each of the cigar clamping arms or levers 307 and 308 is provided with a generally plane cigar clamping surface 309, which, when in an operative position, are generally parallel to each other and spaced from each other the thickness of a cigar. Each cigar clamping arm or lever 307 and 308 carries a pair of opposed and laterally and rigidly projecting lugs 310, which embraces the web folding members 303 and 304, on the outside, and to the radially outermost ends of which a guide or retainer strip 311 is secured by means of screws 312. The retainer strips 311 extend across and over the folding members 303 and 304 and serve to confine the free ends of said folding members between said retainer strips 311 and the corresponding guiding ledges 313 on the cigar clamping members. Thus, the free ends of the web folding members 303 and 304 are slidably mounted (somewhat loosely) in the radially outermost portions of the cigar clamping levers 307 and 308. The web folding members 303 and 304 are provided with the somewhat enlarged jaws 314 and 315 which engage the lugs 310 and the retainer strip 311 of the corresponding cigar clamping levers 307 and 308, when the web folding members are retracted or separated from each other the limit of their outward movement, thereby to carry with them the cigar clamping levers 307 and 308, respectively. Thus, the relationship between the cigar clamping levers 307 and 308 and the corresponding web folding members 303 and 304 is such that while the cigar clamping members are in their closed position, in clamping engagement with the opposed sides of the cigar, the web folding members 303 and 304 may move transversely across and with respect to the cigar clamping members 307 and 308, and hence transversely across and with respect to the radially outermost side of the cigar. This freedom of limited movement of the cigar folding members 303 and 304 with respect to the cigar clamping members 307 and 308, makes it possible for the folding members 303 and 304 to fold the opposed longitudinal edge portions of the "Cellophane" web upon the radially outermost side of the cigar, in overlapping relation to each other, as will be described more in detail hereinafter. When however, the folding operation has been completed, and the folding members 303 and 304 are retracted in opposite directions, to the limit of their opposed movements, they not only retract themselves, but also retract the cigar clamping members 307 and 308, thereby causing the same to release the cigar from their clamping action between the clamping surfaces 313 thereof.

Within the central portion 290, of each of the four pivot blocks 289 carried by the turret head 287, a pair of plungers 316 are slidably mounted, as indicated particularly in Figure 16;—the central portions 290 being provided with corresponding radial bearing openings 317 and the inner and enlarged openings 318 for the reception of the limiting or retaining heads 319 carried by said plungers 316. The enlarged openings 318 also extend into the turret head 287. To the outer and free ends of the plungers 316 a cigar ejector plate 320 is rigidly secured, disposed generally parallel to the axis of the turret shaft 258. A pair of generally radial spring chambers 321 are also provided through the central portion 290 of the pivot block 289, and into the turret head 287, as seen particularly in Figure 16. Helical compression springs 322 are disposed within said spring chambers 321, operatively interposed between the bottoms of said chambers and the plate 320, thereby exerting a constant outward radial force upon said plate 320 at two points. Radially extending spring guide rods 323 may be rigidly carried by the plate 320, for guiding the free or outer ends of the helical compression springs 322 and for maintaining the same in alignment with the rest of the spring inside the spring chambers.

When the cage 288 is closed, as shown at the top and left side of Figure 8, and also as shown in Figure 14, the spring pressed plate 320 serves to press the cigar in an outward radial direction against the radially innermost surfaces of the web folding members 303 and 304. When the cage is open, as shown in the right position in Figure 8, the spring pressed plate 320 serves to eject the cigar from the cage. When the cage is open in the receiving position, shown at the bottom of Figure 8, and also indicated in Figures 10, 11, the spring pressed plate 320 serves to oppose the upward lifting movement of the cigar 94 under the action of the cigar lifter 77, with the effect of firmly clamping the "Cellophane" web between the radially innermost surface of the cigar and the face of the spring-pressed plate 320.

In order to permit the opening and closing of the cages 288 and to permit the folding movements of the folding members thereof, under a single-directional positive force, each movable member of the cage is spring tensioned in an inward direction, so that the only external forces that need be applied to the cage to effect a complete cycle of operations thereof, are those forces which tend to open the cage or which tend to give outward movement to the web folding members 303 and 304 thereof.

Thus, spring anchorages 324 and 325, in the form of laterally projecting pins, are provided on the levers 297 and 298, respectively, and a corresponding spring anchorage 326 is provided on each side of the central portion 290 of the pivot block 289. Helical tension springs 327 and 328 are operatively interposed between the common spring anchorage pin 326 and the spring anchorage pins 324 and 325, respectively. The helical tension springs 329 are operatively interposed between spring anchorage pins 330 and 331, carried by the cigar clamping members 307 and 308 respectively, tending to draw these two members towards each other into clamping engagement with the cigar.

Helical tension springs 332 are also operatively interposed between spring anchorages 333 carried by the levers 297 and 298, and the spring anchorage pins 334, extended across the two bifurcated portions 301 and 302 of the web folding members 303 and 304. These springs 332 serve to oppose the spring pressed plate 320, and to keep the web folding members 303 and 304 tensioned inwardly in a generally radial direction.

In order to limit the inward movement of the web clamping members 307 and 308, and in order to center the same, an adjustment screw 335 is, extended through each clamping member 307 and 308 with its inner end abutting the side wall of the central portion 290 of the pivot member 289. By adjusting these screws 335 and by locking them in the adjusted positions by suitable locking nuts, the inward movement of these clamping members is limited, so as to permit a clamping of the cigar, but so as not to permit a complete closing of these members much beyond the dimensions of the cigar.

The operation of the cages 288, in both of their operating positions, to wit, their lowermost or receiving and folding positions shown at the bottom of Figure 8 and their ejecting positions shown on the right side of Figure 8, is effected by a pair of cage-operating levers 336 and 337, respectively, which operate the cage in its bottom or receiving and folding position, and the cage folding levers 338 and 339, which operate the cage in the ejecting or final position shown on the right side of Figure 8. Both the cage-operating levers 336 and 338 operate one side of the cage, when the same are in the receiving and ejecting positions respectively, while the cage-operating levers 337 and 339 operate the other side of each cage, when the same are in the receiving and ejecting positions, respectively.

The cage-actuating levers 336 and 337 and the cage-actuating levers 338 and 339 are carried by corresponding shafts 340, 341, 342 and 343 respectively, which extend transversely of the machine, as seen particularly in Figures 1, 2, 8 and 15, and which are journalled at their two ends in two opposed and generally parallel frame members of the machine. The cage-actuating or operating levers 336 and 338 are situated on the left side of the turret 280 and cages 288, as will be seen particularly in Figures 2 and 15, while the cage-actuating or operating levers 337 and 339 are located on the other side of the turret 280 and cages 288.

Accordingly, each cage is provided with a pair of opposed cage-operating arms 344 and 345, respectively;—the arm 344 being carried and affixed to the one end of the pivot shaft 296 of the cage, while an arm 345 is carried by and affixed to the opposite end of the pivot shaft 295, of each cage, on the other side of the cage. The arm 344 of each of the four cages of the turret is in operative alignment with the free ends of the levers 336 and 338, and said arm 344 is adapted to be acted upon by said levers 336 and 338 in the receiving and ejecting positions of the turret respectively. Similarly, the arm 345, of the four cages 288, respectively, is in operative alignment with the levers 337 and 339, and is adapted to be acted upon by said levers, in the receiving and ejecting positions of the turret, respectively.

The actual engagement between the free ends of the levers 336, 337, 338 and 339, and the arms 344 and 345, respectively, takes place through an adjustable contact screw 346 which is threaded through the contact ends of each of the arms 344 and 345, and the setting of which is fixed by a suitable lock nut 347.

When the turret 280 is rotating, the actuating levers, 336, 337, 338 and 339 are in the retracted position indicated in dotted line, Figure 8, while when the turret 280 is stationary, said actuating levers are deflected towards their respective arms 344 and 345 in the direction of the arrows 348. As they are thus deflected, in the direction of the arrows 348, each time the turret 280 comes to rest, they engage the ends of the contact screws 346 of the arms 344 and 345, in the two operating positions of the turret, to wit, the lower position and the right position shown in Figure 8, and thereby deflect said arms 344 and 345 in directions opposite to the direction of the deflection of the levers;—thereby causing the corresponding rotation of the pivot shafts 295 and 296, and a consequent outward deflection of the web-folding levers 298 and 297 of the corresponding cages, in opposite directions, that is, away from each other.

When the web-folding levers 298 and 297 have been deflected outwardly or away from each other, through a certain part of their total deflection or movement, they carry with them the cigar-clamping arms or members 308 and 307, respectively. Thus, through a portion of the total deflectional movements, of the levers 298 and 297, the cigar-clamping members 308 and 307 are not affected, while through the outwardmost portion of the deflectional movements of said levers 298 and 297, said cigar-clamping members 308 and 307 are similarly affected.

The outward deflectional movements of both of levers 298 and 297 and cigar-clamping members 308 and 307 takes place against the force of the helical tension springs 327, 328 and 329 respectively, which tend to close the cages at all times.

The cage-actuating motions are derived from two cylinder cams 349 and 350, respectively, which are carried by the main or cam shaft 56, as will be seen particularly from Figures 1 and 3. The cam 349 actuates the lever 336, while the cam 350 actuates the levers 337, 338 and 339. The cam groove 351 of the cam 349, is illustrated in Figure 25—b, while the cam groove 352 of the cam 350 is illustrated in Figure 25—e.

The transmission of the cam action of the cam groove 351 to the shaft 340 and lever 336, is effected through a cam follower lever 353, carried by the shaft 354, the free end of which carries the cam follower roller 355, which rides in the cam groove 351. The shaft 354 extends transversely through the machine and is journalled in the two opposite parallel frame members thereof. To the outer end of the shaft 354, a lever 356 is secured. To the outer end of the shaft 340, a corresponding lever 357 is secured. The free ends of the levers 356 and 357 are interconnected by a connecting rod 358, of an adjustable character similar to the adjustable connecting rod 78 and 148, the opposite ends of which are pivotally secured to the free ends of said arms or levers 356 and 357 respectively. By this means the cam action of the cam groove 351 is transmitted to the lever 336.

A cam follower lever or arm 359, is provided in operative juxtaposition to the cam 350, carried by the shaft 360 which extends transversely through the machine and is suitably journalled in corresponding bearing openings in the two opposite and generally parallel frame members of the machine. The free end of the cam follower arm 359 carries a cam follower roller 361, which rides in the cam groove 352. An arm 362 is secured to the outer or right end of the shaft 360, while a corresponding lever 363 is secured to the outer end of the shaft 341 which carries the lever 337. An adjustable connecting rod 364 connects the free ends of the levers 362 and 363, thereby to transmit the cam action of the cam groove 352 to the shaft 341 and cage actuating lever 337.

By means of the foregoing lever trains, the cam movement of the cam grooves 351 and 352 are transmitted directly to the cam actuating levers 336 and 337, respectively.

The cage-actuating levers 338 and 339 derive their actuating motion from the shaft 341, and then from the cam groove 352.

The cage-actuating lever 338 derives its motion from the shaft 341 through the medium of a pair of similar toothed gear sectors 365 and 366 carried by and affixed to the shafts 341 and 342 respectively. These gear sectors are in mesh with each other and hence transmit the deflecting motions of the shaft 341 to the shaft 342 and hence to the lever 338 carried by said latter shaft.

The transmission of the deflecting motions of the shaft 341 and lever 337, to the shaft 343 and lever 339, is effected through a lever 367 affixed to the shaft 341 and a lever 368 affixed to a shaft 369, and the gear sectors 370 and 371, which mesh with each other and which are carried by the shafts 369 and 343. A connecting rod or link 372 operatively interconnects the levers 367 and 368, thereby transmitting the motions of the shaft 341 to the shaft 369 and hence to the shaft 343. The shaft 369, in addition to transmitting the motion to the shaft 343, also serves an additional purpose which will be described more in detail hereinafter, to wit, the support and actuation of a deflecting lever 373, which will be described hereinafter in connection with the cigar turntable.

*The turret and cages in the receiving and folding positions*

In the receiving and folding position, to wit, at the bottom, the cages are acted upon by the levers 336 and 337, which derive their motions from the cams shown in Figures 25—b and 25—e, respectively. These two cams are so formed as will be seen in Figures 25—b and 25—e, that over a certain portion of the travel of the cams, to wit, the portion indicated by the numeral 374, the levers are in their entirely retracted positions, indicated in dotted lines in Figure 8 and Figure 10. As the cams continue to revolve, the portions indicated by the numeral 375 cause a similar and uniform deflection of the levers 336 and 337 in an upward direction, causing the cage to open. The upper or "deflected" positions of the levers 336 and 337 are shown in solid lines, while the lower or initial positions thereof are indicated in dotted lines in Figures 8 and 10. The cams 351 and 352 are so timed upon the shaft 66, with respect to the turret actuating wheels 264 and 265, that the portions of the cams 351 and 352, designated by the numeral 374, will correspond to that period of the cycle of the turret 280, when the turret is in motion, and the remainder portions of the cams 351 and 352, including the rising portions indicated by the numeral 375, correspond to the stationary periods of the turret 280.

After both cams 351 and 352 have risen to the point 376, the cam remains constant for a suitable portion of its travel, indicated by the numeral 376, during which period the cigar is lifted into the cage by the cigar-lifter 77, which is actuated in timed relation to the cams 351 and 352, by means of the cam 93 and the cam groove 92 carried thereby.

When the cigar 94 has been lifted into the cage in the lowermost position of the turret, which has been held open by the portions 376 of the cams 351 and 352, then both cams 351 and 352 recede slightly over the portions indicated by the numeral 377, which recession is just sufficient to permit the cigar-clamping members 307 and 308 to clamp the cigar 94 from the two opposite sides thereof. At this moment, the cigar-lifter 77 recedes in a downward direction, and at the same time, the cams 351 and 352 recede slightly further to permit the closing in of the web-folding members 304 and 303 respectively, thereby completely enclosing the cigar, just as the cigar-lifter 77 moves down from the lowermost cage.

The action of the levers 336 and 337 and the resultant stages of the lower cage 288, corresponding to the portion 376 of the cams 351 and 352, is illustrated in Figure 10. That stage or portion of the cycle of the cage operation which corresponds to the slight recession in the cams 351 and 352 indicated by the numeral 377, is illustrated in Figure 11. Beyond the point 377 of cams 351 and 352, said cams become slightly dissimilar. Thus, the cam 351 recedes slightly less to the point 378, while the cam 352 recedes slightly more to the point 379. (See Figures 25—b and 25—e). This slight difference in the partial recession of the cams 351 and 352 and hence the corresponding slight difference in the recession of the levers 336 and 337, causes the web-folding member 303 to pass completely across the radially outermost face of the cigar, while the other web-folding member 304 remains just clear of the cigar as indicated in Figure 12. This causes one of the edges of the "Cellophane" web to be folded over the radially outermost side of the cigar.

At this point, the actions of the cams 351 and 352 are reversed for a slight movement, indicated by the portions 380 and 381 respectively, in Figs. 25—b and 25—e. This causes the web folding members 303 and 304 both to travel across the radially outermost face of the cigar in the opposite direction indicated by the showing in Figure 13. This causes the folding of the opposite longitudinal edge portion of the "Cellophane" web as shown in Figure 13, thereby completely enfolding the cigar within the "Cellophane" web, with the two longitudinal edge portions of said web overlapping each other.

The cams 351 and 352 then assume a similar or uniform position indicated by the numeral 382, in both Figures 25—b and 25—e. While in this position, the web folding members 303 and 304 are centered with respect to the cigar, as indicated in Figure 14. The next movement of both cams 351 and 352 is similar, and is indicated by the portion designated by the numerals 383 in both Figures 25—b and 25—e. This causes both cage actuating levers 336 and 337 to recede entirely and clear of the turret into the positions shown in dotted lines in Figures 8 and 10. The cams 351 and 352 then become constant over the portions indicated by the numeral 374, during which period the turret is revolved into the next stage. As the turret is revolved into the next stage, ninety degrees (90°) removed, the completely enfolded cigar as shown in Figure 14, is carried to an idle stage shown on the left side of Figure 8. While the cage on the left side of the turret is in this idle position, the cigar receiving and folding operations of the next cage are performed in the lower position and a cigar ejecting operation is performed in the right hand position;—while in the top position an end closing or end spinning operation is performed.

*Turret and cage in the end folding or spinning position*

In operative juxtaposition to the uppermost stage of the cages 288, a pair of end closing devices are provided, either for closing "Cellophane" wrapping at the two ends thereof, by spinning or by folding or tucking.

One modification of my end closing devices is shown particularly in Figure 2;—said modification comprising spinning devices disposed in axial alignment with the cigar in the uppermost stage of the turret.

A laterally extending horizontal bracket 385, is secured to the left side of the machine frame, shown particularly in Figure 2, in general alignment with the upper stage of the turret, while to the right side of the machine frame, a corresponding horizontal and laterally projecting bracket 386 is secured. Journal blocks 387 and 388 are slidably mounted upon the brackets 385 and 386, adapted for a limited sliding movement with respect to said brackets in a direction generally parallel to the axis of the cigar in the upper stage of the turret. The lowermost surface of each slide 387 and 388, is toothed transversely, so as to form a rack 389, which is in mesh with a correspondingly toothed sector 390, carried by the shafts 391 and 392 respectively. The brackets 385 and 386 are cut out in the centre so as to permit the gear sectors 390 to project upwardly through the bracket into meshing engagement with the rack 389.

Each of the slides 387 and 388 rotatably support the corresponding hollow tubular spindles 393, each of the pair of opposed hollow tubular spindles 393 is in axial alignment with the cigar in the spinning or upper position, the inner ends of each spindle carries a spinning head 394, while the outer end of each spindle carries a collar 395, whereby the spindles 393 are fixed against axial movement with respect to their corresponding journal slides 387 and 388, within which said spindles are journalled.

To the spinning head 394, four spinning jaws 396 are pivotally secured at the pivots 397;—opposite pairs of spinning jaws on each spinning head being drawn together towards the axis, by helical tension springs 398. Each of the spinning jaws 396 carries an inwardly projecting finger or lug 400, which is adapted to ride upon the spreading cone 399 at all times. The spreading cone 399 is carried by a rod 401, which extends through the hollow centre of each of the spindles 393, and which is fixed against axial movement by means of the retaining collar 402 carried by the adjustable stationary bracket 403, but which is rotatable. Thus, as the spinning head, carried by the spindles 393 and the slides 387 and 388 are moved inwardly towards the cigar, the jaws 396 are permitted to converge towards each other, while when the reverse movement takes place, the jaws are spread apart by the spreading cone 399.

A portion of the outer cylindrical surface of each spindle 393, to wit, the portion intermediate the two journal portions of the slides 387 and 388, is suitably toothed, and through these teeth, said spindles are constantly rotated by a corresponding pair of gears 404, carried by the counter shaft 405;—which latter is suitably journalled in bearing pedestals 406. The counter-shaft 405 also carries a pinion 407, which in turn is in mesh with and is driven by a gear 408 carried by a second counter-shaft 409 journalled in the bearing pedestals 410. A sprocket wheel 411 is also carried by the second counter-shaft 409, and a sprocket chain 412 operatively interconnects the sprocket wheel 411 with the corresponding sprocket wheel 413, operatively carried by the shaft 260 which is constantly driven from the main shaft 56 through the pair of bevel gears 261 and 262. By this means, a continuous and constant rotary motion is imparted to the spinning head or spinner while the machine is in operation. As the spinners slide in and out for the successive spinning operations, the elongated toothed portions 414 of the spindle 393, slide to and fro beneath the gears 404, though in constant operative mesh therewith.

The alternate inward and outward sliding movements of the spinners is effected by or derived from a face cam 415, carried by the main shaft 56. The outline of this spinner cam is shown in Figure 25—g.

A cam follower lever 416 is pivoted at its bottom at 417, (see Fig. 2—a) and carries at a point intermediate of its top and bottom ends, a cam follower roller 418, which projects into the cam groove 419 in the face of the cam 415. The upper end of the cam follower lever 416 carries two pivots 420 and 421, respectively. The pivot 420 is connected through a train of levers and connecting links to the pivot shaft 391, while the pivot 421 is connected through another train of levers and connecting links to the shaft 292, whereby the same cam and cam follower lever 416, imparts similar but opposed movements to the spinners.

Thus, the pivot 420 is connected through an adjustable link or connecting rod 422, to an arm or lever 423, carried by the shaft 208 (see Fig. 3) on the left side of the machine;—said shaft 208 being journalled at its two ends in the bearings 424 and 425. The arm or lever 423 is keyed or otherwise locked to the shaft 208, so that said shaft will be oscillated thereby, (the lever hub 210 carrying the arms 206 and 211, is loosely mounted upon the shaft 208, so that the shaft merely serves as a pivot therefor). To the opposite end of the shaft 208, the arm 426 is secured, and the adjustable connecting link or connecting rod 427 operatively interconnects the free end of the arm 426, with the arm 428 carried by the shaft 391. By this means, the action of the cam groove 419 is transmitted to the shaft 391 and hence to the left spinner.

The right pivot 421 of the cam follower lever or arm 416, is operatively connected through an adjustable connecting link or connecting rod 429 to an arm 430 affixed to a shaft 431, carried by the bearings 432 and 433. To the other end of the shaft 431 (see Fig. 1) the arm 434 is secured. An adjustable connecting link or connecting rod 435 operatively interconnects the free end of the arm 434 with an arm 436, carried by the shaft 392. By this means, the action of the cam groove 419 is transmitted to the shaft 392 and hence to the right spinner.

The cam 415 is so adjusted angularly upon the main shaft 56, with respect to the turret actuating wheel 264 and 265 (see Fig. 3), that the pair of opposed spinners will be moved inwardly towards each other into operative engagement with the open ends of the "Cellophane" wrapping, each time the turret comes to rest;—thereby to engage said open ends of the "Cellophane" wrapping and to spin the same into closed condition. Thus, as the rotating spinner arms 396 move inwardly from the two ends, they also gradually close up, so that open ends of the "Cellophane" wrapping, which project beyond the ends of the cigar, are engaged and gradually twisted and closed. When this has been accomplished the spinners are retracted again just before the turret makes another quarter-turn which carries the cigar with the closed ends of the wrapping, to the next stage where the cigar is ejected from the cage. This is shown on the right side of Figure 8.

*Turret cage in discharge position*

As each cage comes into the final discharge position shown on the right side of Figure 8, the pair of cage actuating levers 338 and 339 act upon the cage completely to open the same, thereby permitting the spring-pressed ejector plate 320 to eject the cigar 94 into a turntable 440, which is carried by the shaft 278 which is driven by the train of gears 272 and 274, and 275 (see Fig. 3) and which hence is intermittently rotated a quarter of a turn at a time, the same as the turret shaft 258.

*Turntable*

The turntable 440 is illustrated particularly in

Figures 8, 17, 17—a, 18, 23 and 24. The turntable shaft 278 is parallel to the turret shaft 258 and is disposed in the same horizontal plane. Upon the turntable shaft, a pair of fixed jaw members 441 and 442 are fixedly secured, in suitably spaced relation to each other as seen particularly in Figure 17. Each of the fixed jaw members is provided with four equidistant fixed jaws 443, the gripping surfaces of which are parallel to the axis of the shaft 278 and tangent to a cylinder about said axis, having a diameter substantially equal to the average thickness or width of a cigar. The gripping surfaces or jaws 443 of the fixed jaw members 441 and 442 are in alignment with each other.

Upon the shaft 278, intermediate the fixed jaw members 441 and 442, pairs of movable jaw members 444 and 445, and 446 and 447 are loosely mounted. The opposed pairs of movable jaw members 444 and 445 are rigidly carried by or formed integrally with a common hub 448, while the movable jaws 446 and 447 are similarly rigidly carried by, or are formed integrally with, the common hub 449. The hubs 448 and 449 are each approximately one-half of the axial distance between the fixed jaw members 441 and 442, while the movable jaw members 444, 445, 446 and 447 extend the full axial width or distance between the fixed jaw members 441 and 442, as will be seen particularly from Figure 17.

The gripping surfaces 450 of the movable jaws 444, 445, 446 and 447 are also arranged parallel to the axis of the shaft 278, which rotatably supports them, and are arranged tangent to a cylinder about said axis having a diameter approximately the average thickness or width of a cigar, more or less. A helical tension spring 451 is operatively interposed between the fixed jaw member 441 and the movable jaw 447, thereby to tend to deflect said movable jaw member 447 as well as the opposite jaw member 446, towards their respective fixed jaws carried by the members 441 and 442. A similar helical tension spring 452 is operatively interposed between the fixed jaw member 442 and the movable jaw 445, thereby to tend to deflect said movable jaw 445 and opposite movable jaw 444 in the direction of the fixed jaw carried by the members 441 and 442, with which said movable jaws are adapted to coact. The operative interposition of the springs 451 and 452 may be effected through spring anchorage pins 453 and 454 carried by the members 441 and 442 respectively, and by extending the opposite ends of the springs 451 and 452 through corresponding openings in the movable jaws 447 and 445 respectively, and passing a suitable retaining pin 455 through the terminal eyelet of the spring, as indicated particularly in Figure 17—a.

Stop pins 456 and 457 are provided in the members 442 and 441 respectively, to limit the deflection of the movable jaws 444 and 445 and the movable jaws 446 and 447, under the action of the springs 451 and 452, with respect to their corresponding fixed jaws carried by the members 441 and 442.

One of the movable jaws of each connected pair of movable jaws is provided with an abutment, such as the abutments 458 and 459, shown in Figure 17—a, which are adapted to about and engage a movable jaw or other connected pair, when deflected to a suitable extent. Thus, the abutments 458 and 459 are so arranged that when any one of the four movable jaws is deflected in the direction of the arrow 460, with respect to the fixed jaws carried by the members 441 and 442, the movable jaw thus deflected will in turn engage the other pair of connected movable jaws so as to deflect them likewise, although to a lesser extent, because the second pair of connected movable jaws is not engaged until the first pair directly acted upon have been deflected a certain amount.

Beneath the movable jaws of the turntable, a deflector arm 461 is loosely mounted upon the shaft 342 which carries the cage actuating lever 338 (see Fig. 24 and Fig. 8). The deflector arm 461 is provided with a lug 462 on one side thereof, preferably formed integrally therewith, through which a contact screw 463 is threadedly extended, being fixed in any adjusted position by the lock nut 464. The contact screw 463 is an operative alignment with a laterally projecting lug or abutment 465 carried on one side of the cage actuating lever 338 and preferably formed integrally therewith, so that when the cage actuating lever 338 is deflected in the direction of the arrow 466, into its inoperative position with respect to the cage, the abutment or lug 465 engages the end of the contact screw 463 and deflects or carries with it, also in the direction of the arrow 466, the pivotally mounted deflector arm 461, against the tension of the helical tension spring 467 which is operatively interposed between a spring anchorage 468, carried by the arm 461 and a stationary spring anchorage 469 carried by the stationary bracket 470.

Thus, as the cage actuating lever 338 is deflected towards the cage in the direction of the arrow 471, thereby to open said cage to permit the ejection of the cigar therefrom, the deflector arm 461 is deflected in the same direction, (arrow 471), by the force of the spring 467; while the re-setting of the cage actuating lever 338 in the direction of the arrow 466 likewise resets the deflecting arm 461 in the direction of the arrow 466, by reason of the transmission of the motion through the lug 465 and contact screw 463.

To the upper bifurcated end 472, of the deflector lever 461, a pawl or finger 473 is pivotally secured by means of the pivot pin 474. A helical tension spring 475 is operatively interposed between the spring anchorage pin 476 carried by the pawl 473 and the spring anchorage pin 477 projecting laterally from the deflector arm 461, thereby to exert a constant deflectional force upon the pawl 473, tending to deflect the same in the direction of the arrow 478, with respect to the deflector arm 461.

A limiting screw 479 is threadedly extended through the pawl 473 with its free end adapted to abut against the shoulder 480 on the arm 461, thereby to limit the deflection of the pawl 473 with respect to the arm 461 in the direction of the arrow 478, under the action of the spring 475. The limiting screw 479 is adapted for adjustment and is also provided with a suitable lock nut 481 whereby the adjustment may be locked.

The operative end 482 of the pawl 473, is in alignment with the movable jaw of the turntable, in the lowermost or bottom position, as will be seen particularly from Figure 24. The relationship between the deflector arm 461 and the pawl 473 carried thereby, and the movable jaws of the turntable is such that as the cage actuating lever 338 is deflected in the direction of the arrow 471, to open the cage for the ejecting operation, the arm 461 and the pawl 473 are also deflected in the direction of the arrow 471 by the spring 467, whereby the operative end 482 of the pawl 473 engages the lowermost movable jaw of the turntable and deflects the same in the direction of the arrow 460. This deflection of the lowermost movable jaw causes a corresponding deflection of the movable jaw which is on the left side of the turntable, so that the said movable jaw (jaw 446 in Figures 17—a and 8) is deflected away from its corresponding fixed jaws so as to permit the free insertion of the cigar between the said jaws, by the ejector plate 320 of the cage in the ejecting position;—which cage has been opened substantially simultaneously with the deflection of the movable jaws of the turntable into the open or receiving position. When the cage actuating lever 338 and deflector arm 461 are deflected into their inoperative positions as shown in the solid lines in Figure 24, the springs 451 and 452 within the turntable close the movable jaws with respect to the fixed jaws, thereby clamping the cigar between said jaws. After the cigar has thus been clamped, the turntable as well as the turret are again rotated 90°, thereby bringing the next cage of the turret into juxtaposition to the next set of jaws of the turntable, for the transfer of the next cigar from the turret to the turntable. This cycle is thus repeated with each quarter-turn of the turret and turntable.

In order to limit the deflection of the arm 461 in the direction of the arrow 471, a suitable limiting screw 483 is also carried by the arm 461, by means of a lug 484 projecting from one side of said arm 461 through which lug said screw 483 is threaded. The limiting screw 483 is adapted to abut or contact with some stationary part of the machine, as for instance the web-feeding slide bed 218.

As will be seen from Figure 24, as the pawl 473 deflects the lowermost movable jaw of the turntable, as shown in the dotted lines in said Figure 24, the end 482 of said pawl 473 passes the end of the movable jaw being acted upon, and upon the return stroke of the deflector arm 461, the pawl 473 is deflected downwardly with respect to the arm 461 which carries said pawl.

While the turntable 440 is receiving a cigar in its left side, as shown particularly in Figure 8, a cigar is ejected from the top of the turntable by the ejector arm 373 carried by the shaft 369. As has been explained hereinabove, the movable jaw directly acted upon by the deflector pawl 473 (as well as the opposite movable jaw integral therewith) is deflected to a greater extent than the other pair of connected movable jaws. It is for this reason that while the generally horizontal movable jaws are deflected merely sufficiently to permit the insertion of the cigar as shown in Figure 8, the generally upright pair of connected movable jaws are deflected to a greater extent, so that the uppermost movable jaw will entirely clear the horizontal surface 485 at the top of the turntable, which is in horizontal alignment with the surface 486 of the heating table or unit 487;—thereby to permit the cigar 94 to be slid out from the turntable by the arm 373 in the direction of the arrow 488.

The cigars are thus pushed out one at a time with each quarter-turn of the turret and the turntable, in the direction of the arrow 488.

Heat-sealing means

By reason of the 90° turn imparted to the cigars by the turntable, 440, the cigars are deposited on the heater 487 with the overlapping edges of the "Cellophane" down against the face of the heater. The heater contains any suitable heating element, such as the helical resistance wires 489, and by reason of the heat thus applied to the overlapping edges of the "Cellophane" wrapping, while the cigars are moved intermittently in the direction of the arrow 488, said overlapping edges of the "Cellophane" webbing are sealed to each other by welding or melting;—said sealing being enhanced by the sealing liquid which has been theretofore applied to one of the overlapping edges.

End-trimming shears

As the cigars pass beyond the heater 487, they pass on to the table 490. At a suitable point beneath the table 490, and projecting upwardly therethrough, end trimming shears are provided, which are actuated in timed relation to the intermittent movement of the cigars over the table 490, by the cam 154 which also actuates the web cutter arm 157 which initially shears off the successive individual pieces of "Cellophane".

Thus to the left end of the cam acting shaft 150, the arm 491 is secured (see Fig. 3). An adjustable connecting rod 492 operatively connects the arm 491 with a corresponding arm 493 carried by the shaft 494. The shaft 494 is suitably journaled in bearings 495 and 496 and extends transversely across and beneath table 490. The shaft 494 is provided with a key way or key channel extending over a suitable portion of its length, for the reception of a pair of keys.

A stationary cutter supporting bar 497 is also extended across the table and beneath the same, generally parallel to the shaft 494 and spaced at a suitable distance therefrom as seen particularly in Figs. 17 and 18. The stationary cutter supporting bar 497 is provided with a pair of horizontally elongated slots 498, through which the bolts 499 are extended. A pair of similar stationary cutters (500) are secured to the stationary cutter supporting bar 497, by means of said pair of bolts 499;—said bolts 499 being threaded into corresponding threaded openings 501 in said stationary cutter (500). By reason of the horizontal elongation of the openings or slots 498 in the stationary cutter supporting bar 497, through which the bolts 499 extend, the positions of said pair of stationary cutters 500 may be adjusted longitudinally with respect to each other and with respect to the table 490, so as to permit the adjustment of the cutter to the ends of the cigar, or to the length of the cigar.

Each of the stationary cutters carries a hub 502 which surrounds the shaft 494 co-axially with respect thereto and with a suitable clearance for the reception of an intermediate tubular body. To the hub 502 the stationary blade 503 is rigidly secured by means of screws or other fastening means 504. The cutting edge portions 505 of the stationary blades 503, project through a pair of similar openings 506 in the table 490, and project above said table to a suitable extent.

A pair of tubular pivot members 507 are provided having an internal bore 508 corresponding to the diameter of the shaft 494 and adapted to fit over the same with a sliding fit. Each of said pivot members 507 carries the internal key 509 which is adapted to ride in the corresponding key way in the shaft 494 (not shown), thereby to carry or to lock the tubular pivot members 507 to the shaft 494 against rotation with respect thereto, while permitting a longitudinal sliding movement or displacement of said tubular pivot members with respect to said shaft. Each of the tubular pivot members 507 include an axially offset lug 510, through which a pivot receiving opening or aperture is extended. Each of the pivot members 507 includes a hub or collar portion 512 preferably knurled exteriorly as shown in Figure 17. On the other side of the pivot lug 510, a tubular portion 513 is provided on each of the tubular pivot members 507, which has an external diameter adapted to fit within the inner diameter of the hub 502 of the stationary cutter 500, and the axial length of which is substantially equal to the axial width of said hub 502, with a slight excess (a few thousandths of an inch). Beyond the tubular portion 513, the tubular members 507 extend in the form of an externally reduced diameter portion 514, which is threaded exteriorly so as to receive the internally threaded nut 515, which is also preferably knurled on its outer cylindrical surface.

The movable blade 516 is secured to the transverse portion or connecting portion of a yoke 517, by means of screws, rivets, or other suitable fastening means 518. The two parallel sides or legs 519 of the yoke 517 are adapted to straddle the pivot lug 510 of the tubular pivot member 507, said pivot lug 510 having its opposite parallel sides 520 spaced apart at a distance substantially the same as the distance between the inner surfaces of the parallel sides or legs 519 of the yoke 517. A pivot pin 521 is extended through the holes 522 in the sides or legs 519 of the yoke 517 and through the opening 511 in the pivot lug 510 of the tubular pivot member 507. This produces a pivotal mounting of the blade 516 upon the tubular pivot member 507 about a pivotal axis at a right angle to the axis of the cutter shaft 494, but not intersecting the same, but spaced therefrom a suitable distance. A spring anchorage pin 523 is extended through the ends of the legs or sides of the yoke 517, for anchoring a helical tension spring 524, one end of which is secured to each of the spring anchorage pins 523 of each of the movable blade yokes 517 as is indicated in Figure 17.

The assembly of the two end-trimming shears is shown particularly in Figure 17. Thus, in each instance, the stationary blade 503 is outside and the movable blade 516 is inside and in contact with the stationary blade. By reason of the pivotal mounting of the movable blades about the pivots 521, and by reason of the tension of the spring 524, the cutting edges of the movable blades are maintained constantly in spring-pressed contact with the cutting edge of the stationary blades. Thus, as the arm 493 is oscillated periodically, the movable blades are oscillated or deflected in an upward direction in shearing relation to the stationary blades 503, thereby to trim the excess "Cellophane" from the spun or closed ends.

From this point on, the cigars are moved on and may be disposed in any suitable container as they leave the table.

In order to hold the cigars pressed closely to the table, particularly the heating unit 487, a spring-pressed plate 525 is provided;— pivotally mounted at 526 upon an arm 527, which in turn is pivotally mounted at 528, so as to ride loosely on the shaft 369. The arm 527 is urged downwardly by a helical tension spring 529 operatively interposed between any suitable stationary spring anchorage 530 and a spring anchorage 531 extended radially from the arm 527. The plate 525 carries a rigid or integral arm 532, the free end of which is acted upon by a helical tension spring 533 operatively interposed between the spring anchorage 534 on the arm 527 and a corresponding spring anchorage 535 carried by the arm 532. This spring tends to deflect the plate 525 downwardly with respect to the arm 527. A limiting screw 536 extends through the arm 532, with its contact end adapted to abut a shoulder 537 on the arm 527, thereby to limit the downward deflection of the plate 525 with respect to the arm 527. By this means, the plate 525 is pressed down upon the series of cigars as they are moved intermittently along the heater 487 and table 490. By reason of the resilient support, any slight irregularities in the thickness of the cigars is appropriately compensated for by the plate 525.

*Alternative forms of end-closing members*

In Figure 26, a modified form of end-closing device is illustrated, whereby the open ends of the "Cellophane" wrapping are not closed by spinning but by folding or tucking. In this modified embodiment, two pairs of jaws 540 and 541, respectively, are pivotally secured directly to slides 542, which are similar to the slides 387 and 388 shown in Figure 2, and which are similarly adapted to be moved to and fro through the rack 389 and the gear sector 390 and the actuating mechanism which actuates the same. The jaws 540 and 541 do not therefore revolve but are merely moved in and out towards and away from the ends of the cigar. The jaws are pivoted upon pivots 543 and are similarly drawn together by helical tension springs 544 and are spread apart by the conical spreader 545 acting upon the fingers or lugs 546. The active ends of the jaws 540 and 541 are shaped as shown in Figure 27, so that the free ends of the "Cellophane" wrapping will be folded in as indicated in the centre of Figure 28. When the "Cellophane" has thus been tucked or folded, by the jaws 540 and 541, a pair of crimping jaws 547 and 548 are brought together by the arms 549 and 550, respectively. These crimping jaws 547 and 548 are shaped as shown in Figure 29, and are brought together in timed relation to the reaction or the withdrawal of the jaws 540 and 541, so that the folded though incompletely closed ends of the wrapping, as shown particularly in Figure 28, are completely folded and closed, and crimped with the result shown in Figure 30.

The arms 549 and 550 are pivotally mounted on any suitable pivots or shafts 551 and 552, respectively, and are suitably actuated by connecting rods pivotally connected to their opposed ends 553 and 554 and controlled by suitable cams upon the main shaft 56 (not shown).

If desired, the crimped ends may also be further folded inwardly against the cigar by providing suitable camming surfaces 555 carried in auxiliary turntable members 556, so that as the cigar is ejected from the cage into the turntable, the flat crimped "Cellophane" ends 557 may be further folded in against the body of the cigar, along the contour of the camming surface 555.

If desired, also, the twisted "Cellophane" ends 558 (see Figure 17) may also be crimped subsequent to trimming, by providing a pair of opposed stationary anvil members 559 in operative alignment with said trimmed ends, at a suitable point upon the table 490, beyond the end-trimming shears, and by providing a suitably oscillated movable crimper 560 in operative alignment with each anvil 559, as shown particularly in Figures 32 and 33. The movable crimpers 560 may be carried by corresponding arms 561 carried by a shaft 562 journalled in pedestals 563. An arm 564 affixed to the shaft 562 may then be operatively connected with the cutter shaft 494 through an arm 565 affixed to said cutter shaft and the connecting link 566. By this means, the end crimper 560 may be brought down into operative relation to the anvil 559, as shown in Figure 33, with each shearing stroke.

Cigar banding mechanism

If it is desired to place a cigar band on the cigar preliminary to its wrapping in the external sheathing of "Cellophane", the banding mechanism shown in right side elevation in Figure 34 is positioned in advance of the wrapping mechanism shown in Figure 1. The banding mechanism shown in Figure 34 may be formed as a separate unit to be attached to or merely placed in operative alignment with the folding unit shown in Figure 1, or the two may be built directly on the same frame structure. Thus, the longitudinal frame members may be merely extended and the main shaft 56 also extended as indicated in Figure 34. The conveyer belt 42 is also extended forwardly, so as to serve as a continuous conveyer means through both the banding mechanism and then through the wrapping mechanism. Thus, the driving pulley 43, carried by the shaft 44 shown in Figures 1 and 3 respectively, is now placed upon a shaft 570, similarly mounted on an extension of the corresponding frame members or table, and the shaft 570 is then driven by means of a sprocket chain 571 and the sprocket wheels 572 and 573 affixed to the shafts 44 and 570 respectively.

By this means, the same conveyer belt 42 will receive the cigars at 574, and will carry the same through both the banding mechanism as well as the wrapping mechanism, with sufficient interruption to permit the removal of each cigar therefrom at the banding mechanism for a period sufficient to apply the band.

Transfer stop

The cigars carried along the belt 42 are first brought up against a movable stop 575, which projects from beneath and through the table, as shown particularly in Figures 34, 35 and 37. The transfer stop 575 is a flat inverted U-shaped member of flat sheet metal, which straddles the belt 42 as shown particularly in Figure 35, and the two legs of which are attached rigidly to a corresponding pair of arms 576 carried by and affixed to a common transverse shaft 577 which extends transversely through the machine and is journalled in a pair of suitable bearing pedestals or brackets 578, on opposite sides of the machine. The transfer stop 575 rises approximately to a height corresponding to the thickness of a cigar, so that it will form a full and sufficient abutment for the same.

The shaft 577 carries at one end thereof an arm 579, by means of which it is oscillated or partially rotated to and fro. The arm 579 is in turn operatively connected through a link 580 to an arm 581, which is fixedly carried by a shaft 582 extending transversely through the machine and suitably journalled in the opposite side frame members thereof. The shaft 582 carries the cam follower arm 583 which in turn carries the cam follower roller 584 which runs in the cam groove 585 of the cylinder or drum cam 586 carried by the main shaft 56 or an extension thereof. The development of the cam groove 585 is shown particularly in Fig. 57—b.

While the cam groove 585 is at its left dwell, designated by the numerals 587, the transfer stop 575 is in a position shown in Figures 37, 38 and 43. While the cam 587 is at its right dwell indicated by the numerals 588, with respect to the cam follower roll and cam follower arm, the transfer stop is in the forward position shown in Figures 39, 40, 41 and 42. The movement from the rear to the front position is effected by the rise 589, while the movement of the stop from the forward to the rear position is effected by the rise 590.

By reason of the action of the transfer stop, in pushing back the row of cigars being fed to it by the conveyer belt, there is a tendency to derange the feeding of the cigars to the cigar lifting clamps of the banding mechanism, particularly when there are but comparatively few cigars on the conveyer belt in advance of the transfer stop. Thus, for instance, when the last of a row of cigars approaches the transfer stop, or when but a very few cigars remain on the conveyer belt in advance of the transfer stop, the movement of the transfer stop, in pushing back the cigars will tend to impart enough momentum to the cigars in the direction opposite to the movement of the conveyer belt so as to roll them back or push them back upon the belt to such an extent, that the subsequent feeding movement of the belt will not be sufficient to bring the next cigar into full alignment with the cigar lifting clamps.

I therefore also provide intermittently acting braking means, in the nature of a frictional detent, as shown particularly in Figures 37—a, 37—b, 37—c, whereby the tendency of the transfer stop throwing the last cigar or the last few cigars too far back, is overcome. Thus, I provide two similar curved leaf-springs 770, one on each side of the belt 42, and in close proximity thereto. Each spring 770, is rigidly attached at one end thereof to the bed of the table 40 a suitable distance below the top surface thereof, so that in its lower, disengaged position, the peak of the curved spring will lie below the plane of the belt 42. The free, curved end of the leaf-spring 770 extends into the channel 771 in which a leg of the transfer stop 575 oscillates to and fro, intermittently, and the free, curved end of the spring projects downwardly a distance sufficient to be engaged by the top edge 772 of the transfer stop-carrying arm 576 when the stop approaches its forward position. Thus, as the stop approaches its forward position, and before the stop engages the cigar 94, the stop-carrying arm engages the lower curved surface of the leaf-spring 770, and thereby forces the leaf-spring upwardly, and causes it to force the cigar 94 against the ceiling of the retaining plate 773. This creates a resistance to the ejecting force of the transfer stop 575 when the latter completes its forward stroke. The retaining-plate 773 extends transversely across and above the conveyer belt 42 and the cigar guides 53, and is rigidly secured by means of the supporting legs 774 to the table 40.

The action of the leaf-spring 771 is to dissipate any momentum effect of the transfer stop without however preventing any positive action on the part of the transfer stop, and also without longitudinally displacing the cigar, the action being merely a frictional braking action.

The return of the transfer stop 57 to its rearward position releases the leaf-spring 770, and permits the cigar 94 to be replaced onto the surface of the belt 42, for further feeding movement.

Cigar lifting clamps

On each side of the conveyer belt 42, and also projecting upwardly through the table, a pair of similar and opposite cigar lifting clamps 591 and 592 are provided (see particularly Figures 55 and 56). Each of the cigar lifting clamps 591 and 592 is formed of a lower jaw 593 carried rigidly and fixedly upon the front end of one of a pair of similar lift slide rods 594 which are slidably mounted in corresponding stationary slide guide brackets 595, each of said pair of lift slide rods 594 is pivotally attached at its lower end 614 to the upper end of a connecting link 615, the lower end of which is pivotally connected at 616 to the free end of the arm 596 carried by the transverse shaft 597, extending transversely through the machine. The shaft 597 carries a cam follower arm 598, which in turn carries a cam follower roller 599 which rides in the cam groove 600 of the cylinder or drum cam 601. The development of the cam groove 600 is shown in Figure 57—e. While the cam groove 600 is in its right dwell, as designated by the numerals 602, the cigar-lifter clamp is in its lowermost position as illustrated in Figures 37, 42, 43 and 55. While the cam groove is in its left dwell as designated by the numerals 603, the cigar lifter clamp is in its uppermost position as illustrated in Figures 38, 39, 40 and 41; and while the cam groove 600 is on the rise designated by the numerals 604, the cigar lifter clamp is rising, as illustrated in Figure 56.

Each of the cigar-lifting clamps is composed generally of a lower jaw 593; an upper jaw 605, mounted on a slide rod 606 extending vertically through and slidably mounted in a slide bearing 607 formed integrally with or attached rigidly to the outer side of the lower jaw member 593. The slide rods 606, while slidably mounted in the bearing members 607, are keyed thereto, against relative rotation. The upper jaw slide rods 606 and their corresponding slide bearings 607 are spaced sufficiently apart to permit the passage therebetween of the longest cigar expected to be fed into the machine.

Each upper jaw member 605 is constantly urged into a downward or closed position with respect to the lower jaw 593 by means of a compression spring 608 positioned between the lowest surface 609 of the lower jaw 593 and a spring retaining head 610 attached to the lower end of the upper jaw slide rod 606. The upper slide bearing 611 of each slide guide bracket 595 carries an outwardly extending vertically apertured lug 612 positioned immediately beneath the spring retaining head 610 of the upper clamp slide rod 606. An adjustment screw 613 extends through the aperture of the lug 612 to contact with the spring retaining head 610 of the upper jaw slide rod 606 as the cigar-lifting clamp comes into its lowermost position as illustrated in Figure 55; thereby to limit the downward travel of the upper jaw slide rod 606, so that, as the slide rods 594 continue in their downward travel, carrying with them the lower jaws 593, the upper jaws 605 remain in a stationary position, thereby to open the cigar-lifting clamp, to release the cigar 94 which has been banded, and to receive the next cigar to be banded.

By reason of the travel of the belt 42, the cigars are carried forward, so that as one cigar is carried away from the banding mechanism towards the wrapping mechanism, the next cigar is carried into its place for a banding operation.

The stop 575 is so timed with relation to the vertical movement of the cigar lifting clamps 591 and 592, that just before the cigar lifting clamps start on their upward travel, to raise one cigar, the stop will be in the rear position shown in Figures 37, 38 and 43, thereby to serve as a stop for the row of cigars in advance thereof being urged towards said stop by the frictional engagement of the belt upon the cigars, thereby accurately to position the first of the row of cigars in advance of the stop, in proper alignment with the cigar-lifting clamps. After one cigar has been lifted up into the band-folding cage, as shown in Figures 39, 40, 41, the stop 575 is deflected forwardly, thereby to retain the row of unbanded cigars sufficiently in advance of the cigar-lifting clamps, so that when the cigar-lifting clamps come down with the banded cigar, the latter will be positioned behind the stop, that is, on the opposite side of the stop towards the wrapping mechanism, as shown in Figure 42.

By this means, each cigar is transferred from in front of the stop to behind the stop and the row of unbanded cigars urged by the moving conveyer belt, will be brought into alignment with the cigar-lifting clamps, one at a time, during the successive cycles of the machine. While the stop 575 is stationary in either one of its two extreme positions, it retains the cigars against movement in accurate spaced relation to the cigar-lifting clamps;—the over travel of the conveyer belt merely resulting in a corresponding amount of slippage of the same with respect to the cigars. By this means, also, the feeding of the cigars is controlled entirely by the stop 575, which gives an accurate intermittent feed in timed relation to the cigar-lifting clamps irrespective of the movement of the belt 42, without however, affecting the subsequent feeding of cigars into the wrapping mechanism by the same belt.

Cigar band magazine and transfer

Off to one side, on the left of the cigar lifter mechanism, the cigar band magazine 615 is provided, in transverse alignment with the cigar lifter. The cigar band magazine comprises a plate 616, having a hub 617, whereby it is fixedly secured to the shaft 618, journalled in the bearing pedestals 619 and 620. To the plate 616 a pair of opposite parallel vertical U-shaped channel members 621 and 622 are secured, which are spaced apart from each other, and which have channels suitable for the reception of the particular size and shape cigar band 623. A vertical stack of cigar bands 623 is thus mounted in the guide channels 621 and 622. The bottom of the magazine is formed by a pair of pivotally mounted and movable dogs 624 and 625, respectively, which are carried by shafts 626 and 627 respectively, journalled in corresponding bearing apertures in the plate 616. The two shafts 626 and 627 are interconnected by opposite arms 628 and 629 respectively, and the intermediate link 630 interconnecting the same;—whereby the pair of opposite dogs 624 and 625 are caused to move in unison with each other in opposite directions, so that both will move outwardly or inwardly together, as the case may be.

To the left of the magazine 615, and in transverse alignment therewith, a suctional transfer mechanism 631 is provided, including the stationary suction box 632, in one end of which the hollow suctional transfer shafts 633 and 634 are rotatably and slidably mounted, being adapted to slide inwardly and outwardly, as indicated in Figures 53 and 54, and being also adapted to rotate. The pair of hollow suctional transfer shafts 633 and 634 extend horizontally and parallel to each other, towards the magazine 615. The suctional hollow transfer shafts 633 and 634 extend through, and are slidably and rotatably mounted in a pair of spaced parallel stationary bearing blocks 635 and 636 respectively, which give accurate bearing support to said shafts. A pair of similar gears 637 and 638 are slidably keyed to the shafts 633 and 634 respectively (see Figure 46) so that the shafts may slide through the gears which are confined between the bearing blocks 635 and 636 respectively, and yet impart their rotary motion to the shafts 633 and 634 respectively. The gears 637 and 638 are in mesh with each other, thereby to give simultaneous, equal and opposite rotation to the shafts 633 and 634.

A counter shaft 639 is also journalled in the bearing blocks 635 and 636, parallel to the shafts 633 and 634, and carries a gear sector or segment 640, in mesh with the gear 638, so that the rotary oscillations of the shaft 639 will cause corresponding opposite rotations of the shafts 633 and 634. One end of the shaft 639 carries an arm 641, which is connected through an adjustable connecting link 642 with an arm 643 carried by the shaft 644. The shaft 644 carries the cam follower 645, which in turn carries the cam follower roller 646 which rides in the cam groove 647 of the drum cam 648, illustrated in Figures 34 and 57—a;— whereby the shafts 633 and 634 are each rotated ninety degrees, in opposite directions, once with the rise of the cam, and then in the reverse direction with the fall of the cam.

The other end of the shaft 639 carries a cam arm 649, which is adapted to engage the cam follower lug 650 projecting from the arm 651, carried by the shaft 626 which carries one of the magazine dogs 624. The cam arm 649 and the arm 651 are so positioned upon their respective supporting shafts and with respect to each other, that when the magazine is in its lower or operative position as shown in Figures 44, 45, 45—a, 47, 49, 50 and 51, the rotation of the shaft 639 will also cause a rotation of the shaft 626, and hence also the shaft 627, and will cause a deflection of the dogs 624 and 625 which hold the stack of cigar bands 623.

Each of the suctional transfer shafts 633 and 634 carries a similar jaw head 652 and 653 respectively, from which the suction jaws 654 and 655 project horizontally. The suction jaws 654 and 655 are generally rectangular blocks, preferably formed integrally with their respective heads 652 and 653, and are so arranged that one of the corner edges 656 of each of said jaw blocks will lie in the axis of rotation of the respective shafts 633 and 634, with the two adjacent plane right-angular sides 657 and 658 being disposed radially with respect to said axis, as will be seen from Figures 47 to 52 inclusive. A suction passageway extends through each of the heads 652 and 653, and opens in about the center of the face 657 of each of the suctional jaws 654 and 655. The heads 652 and 653 are so positioned upon the shafts 633 and 634 respectively, that the faces 657 will be in the horizontal position for the brief interval when the cam groove 647 of the cam 648 is at its left dwell 659 (see Figure 57—a) and so that said faces 657 containing the suction aperture will be vertically disposed while the cam groove 647 is at its right dwell, indicated by the numeral 660.

The magazine 615 is deflected upwardly and downwardly and maintained in its upper and lower positions alternately (see Figures 48 to 52 inclusive) in timed relation to the rotation of the suctional jaws 654 and 655, by the cam groove 585 of the drum cam 586, which also operates the transfer stop 575, as described hereinabove. Thus, to the left end of the shaft 582, an arm 661 is secured (shown in dotted lines in Figure 34), which is operatively connected to an arm 662 carried by the shaft 618 which carries the magazine, through an adjustable connecting link 663. The chronological relationship between the rotational movements of the suctional jaws 654 and 655, and the deflectional movements of the magazine 615 are illustrated by the successive series of somewhat diagrammatic views shown in Figures 48 to 52 inclusive.

Thus, the magazine 615 is first in an upper or inoperative position shown in Figure 48, while the suctional jaws are vertically disposed also in an inoperative position. The magazine is then deflected downwardly into a horizontal position shown in Figure 49, by the right dwell 588 of the cam groove 585 (see Figure 57—b). Shortly after the magazine has been brought down to its lower horizontal operative position shown in Figure 49, against the stationary center-support 664, (which is adapted to give central support to the stack of cigar bands) the suctional jaws are deflected outwardly to their horizontal positions by opposite ninety degree rotational movements of the respective suctional transfer shafts 633 and 634, into the position shown in Figure 50;—in which horizontal position the suctional faces 657 are brought into contacting engagement with the two ends of the back or reverse side of the lowermost cigar band.

As the suctional jaws 654 and 655 are deflected outwardly into their horizontal positions, the magazine dogs 624 and 625 are also deflected outwardly at the same rate, by means of the cam arm 649 and cam follower arm 651 (see Figures 45—a and 46), so that the suctional jaws 654 and 655 will clear the dogs 624 and 625, and so that when the suctional jaws 654 and 655 are in their horizontal engaging positions, the dogs 624 and 625 will be clear of the stack of cigar bands, so that the lowermost cigar band which is thus suctionally gripped and engaged by the suctional jaws 654 and 655, may be removed from the bottom of the stack. After the suctional engagement has been effected, the suctional jaws 654 and 655 are again deflected downwardly into their vertical positions shown in Figure 51, carrying with them the suctionally gripped ends of the cigar band 623, which are thus folded down at a right angle;—the dogs 624 and 625 at the same time closing in beneath the remaining stack of cigar bands, thereby to give bottom support to said stack when the magazine is subsequently raised up, as shown in Figure 52, said raising of the magazine following by a suitable interval, the vertical positioning of the suctional jaws, as will be observed from the relationship of the cams 585 and 647 in Figures 57—b and 57—a, respectively.

By this means, a single cigar band is removed from the bottom of the magazine during each cycle of the machine and is bent around the suctional jaws in a position shown in Figures 52 and 37.

The suctional transfer shafts 633 and 634, are engaged by a common yoke 665, through which said shafts extend and in which said shafts are rotatably mounted but keyed or otherwise locked as by the collars 805, against sliding movement, relative to said yoke. A similar trunnion 666 projects laterally and horizontally from each side of the yoke 665;—said trunnion 666 giving pivotal support to similar links 667 on opposite sides of the yoke, which are in turn pivotally connected at points 668 to similar arms 669 carried by a common shaft 670 journalled in a pair of similar downwardly depending bearing brackets 671 carried by the slide housing or frame member 672. To the center of the shaft 670, an arm 673 is secured; the lower end of which is operatively connected through an adjustable connecting link 674, to an arm 675 carried by a shaft 676. The shaft 676 in turn carries another arm 677 which is operatively connected through a connecting link 678, to a cam follower arm 679 pivotally mounted at 680 in operative relation to the face cam 681 carried by the main shaft 56. The cam follower arm 679 carries a cam follower roll 682 projecting laterally into the cam groove 683 in the face of said cam 681. By this means, the suctional transfer shafts 633 and 634 will be slid or moved axially to and fro between the cigar band magazine and the line of the cigar lifter, so that immediately after a cigar band has been engaged by the suctional jaws 654 and 655 and bent down, and after the cigar band magazine has been raised up, the cigar band will be slid forward into alignment with the cigar. These two positions are shown in Figures 53 and 54 respectively. The cigar band will thus be held in position to be engaged by the cigar as it is raised upwardly. When the cigar band has been removed from the suctional jaws by the cigar passing up through and between said jaws, said jaws are retracted again into alignment with the cigar band magazine where they again suctionally engage a cigar band.

The suction box 632 carries suitable packing around the suctional transfer shafts 633 and 634, which nevertheless permit sliding and rotational movements of said shafts. The suction box 632 is connected by means of any suitable hose connection 684 with a source of suction, such as a vacuum pump or the like which maintains a constant vacuum in said suctional shafts and hence maintains a constant vacuum at the suction apertures 685 in the faces 657 of the suction jaws 654 and 655.

To more accurately define the backward and forward limit of travel of the suctional transfer shafts 633 and 634, adjustment blocks 806 and 807 are affixed, by any suitable means to the rear and forward faces respectively of the yoke 665. The block 806 is adapted to contact, at the predetermined end of the backward movement of the shafts 633 and 634 against a suitable stationary projection 808 above the face of the slide frame member 672. The block 807 similarly is adapted to abut, at the predetermined end of the forward movement of said shafts 633 and 634, against a suitable stationary point preferably on the face of the bearing block 635. By this means, the movement of the suctional transfer shafts, and hence, their reception and positioning of the cigar bands may be accurately defined so that no variation may occur between the position of a cigar band about one cigar, and the position of the band about the next cigar to be banded.

*Application of cigar band to cigar*

The cams are so shaped and timed with respect to each other, that the cigar band will be brought into operative alignment with the cigar, just as a cigar is ready to be lifted upwardly, as shown in Figure 37.

When the shafts 633 and 634 have been moved to their extreme right position, where the band comes into operative alignment with the cigar, first, a band-moistening operation is effected on one end of the face of the cigar, which moistened end is then overlapped by the opposite gummed end of the reverse side of the band, so that when the band is finally folded about the cigar, the two overlapping ends may be adhesively secured to each other.

*Band moistening*

This band-moistening operation is effected by a moistening tank 686, which is carried by the shaft 687 journalled in the bearings 688. The tank 686 carries water, and a wick tube 689 projects from the bottom thereof at a suitable angle;—said wick tube carrying a suitable fibrous wick 690. The other end of the shaft 687 carries an arm 691 which in turn carries a cam follower roller 692 which is in alignment with a suitably inclined cam surface 693 carried on the top of the yoke 665. Thus, when the yoke 665, carrying the suctional shafts 633 and 634 comes into its extreme right limiting position, the inclined cam surface 693 engages the roller 692 and raises the arm 691, thereby to deflect the moistener tank or water tank 686 in the direction of the cigar band, so that the wick 690 thereof will come into contact with one end of the cigar band as indicated in Figures 37 and 38, and in Figures 53 and 54. This moistener stays in contact with the band until the band has been raised upwardly by the cigar and thus effects a wiping action on the end of the band which is contacted, thereby insuring a thorough and complete moistening of said end. When the transfer shafts 633 and 634 and the successive jaws 654 and 655 recede again towards the magazine, the moistener 686 is also deflected away from its operative position into its inoperative position shown in Figure 39. The tank 686 may carry any suitable liquid solvent depending upon the adhesive used, though in the ordinary mucilage, the solvent would be water. So too, not only solvent, but adhesive might be dispensed through the wick 690.

*Folding band around cigar*

As the band is brought into vertical alignment with the cigar lifter, by the pair of spaced parallel suction jaws 654 and 655, a cigar is lifted upwardly by the lifting clamps described and is lifted into a band-folding cage 694 (Figs. 37 to 43 inclusive) carried by the transverse frame member 695, which bridges the conveyer table as shown particularly in Figures 36 and 35, where the band is folded about the cigar.

The band-folding cage 694 is similar in principle to the "Cellophane" wrapping or folding cages 288 hereinabove described and particularly illustrated in Figures 8 to 16 inclusive, except that it remains stationary while the four "Cellophane" wrapping or folding cages 288 rotate intermittently upon a turret shaft. Thus, the band-folding cage 694 also includes a pivot block 696, similar to the pivot blocks 289 of the cages 288. Thus, the pivot block 696 includes a central portion 697, similar to the portions 290 of the pivot blocks 689. In the opposite ends 698 and 699 of the pivot block, similar and opposed transverse pivots 700 and 701 are rotatably mounted or journalled, extending across said outer portions 698 and 699, which are bifurcated to receive levers or arms therebetween. Upon the two opposed outer pivots 700 and 701, similar opposed band-folding levers or arms 702 and 703, respectively, are fixedly secured. Corresponding pivot pins 704 and 705 extend through the lower free ends of said arms or levers 702 and 703 respectively, and give pivotal support to corresponding folding members 706 and 707 respectively (see Figure 37).

A pair of opposed inner pivot pins 708 and 709 are also provided in, and extend transversely through the pivot block 696, and upon said pivot pins corresponding cigar-clamping arms or levers 710 and 711 are pivotally secured.

Suitable spring anchorage pins or projections 712 and 713, are provided on the cigar clamping arms 710 and 711, respectively, and a helical tension spring 714 operatively interposed between the spring anchorages 712 and 713, serves to draw said two cigar-clamping members or arms 710 and 711 towards each other at all times.

Spring anchorage pins or projections 715 and 716 are provided on the band-folding members 706 and 707, and corresponding spring anchorage members or projections 760 and 761 are provided at the base portions of the band-folding levers or arms 702 and 703 respectively, operatively to engage therebetween helical tension springs 719 and 720 respectively. The helical tension springs 719 and 720 serve constantly to exert an inward deflectional force upon the band-folding members 706 and 707, about the pivots 704 and 705 respectively. Spring anchorage members 717 and 718 are provided on the arms 702 and 703 respectively, and an intermediate spring anchorage 762 is provided on the central portion 697 of the pivot block 696; operatively to engage a helical tension spring 721 between said central anchorage pin 762 and said anchorage pin 717 and also to engage a helical tension spring 763 between said anchorage pin 718 and said central anchorage pin 762. The springs 721 and 763 serve constantly to draw the arms 702 and 703 toward each other. The band-folding members 706 and 707 are provided with terminal jaws 722 and 723 respectively, which engage the lugs 724 and 725, respectively, on the clamping arms 710 and 711, when the band-folding members 706 and 707 are retracted in opposite directions, farthest from each other, beyond a suitable point, so as to carry with them the clamping arms 710 and 711.

A spring-pressed plunger 726 is slidably mounted in the block 696, urged downwardly by any suitable helical compression spring housed within the block 696, in a manner similar to that shown in Figure 16. The spring-pressed plunger carries the press-plate or rejector plate 727.

To the pivots 700 and 701, corresponding arms 728 and 729 are secured; all these arms may be formed integrally with the arms 702 and 703 respectively. Adjustable contact screws 730 and 731, are extended through the free ends of the levers or arms 728 and 729, in opposite directions, and are adapted to be acted upon by the actuating levers 732 and 733 respectively, which are pivoted at 734 and 735 respectively.

To the outer ends of the pivots 734 and 735, the arms 736 and 737 are secured, and these are in turn operatively connected to corresponding arms 738 and 739, respectively, carried by the pivot shafts 740 and 741 respectively, by means of the adjustable connecting rods or links 742 and 743, respectively, as shown particularly in Figure 34. The pivot shafts 740 and 741 carry the cam follower arms 744 and 745, which in turn carry the follower rollers 746 and 747, respectively, which ride in the cam grooves 748 and 749, respectively, of the drum cams 750 and 751, respectively, which are in turn carried by the main shaft 56 (see Figure 34). The layout of the cam grooves 748 and 749 is illustrated in Figures 57—c and 57—d respectively, and the action of these coacting pairs of cams 748 and 749 is somewhat similar to the action of the cams 351 and 352 shown in Figure 1 and Figures 25—b and 25—c. Thus, over the dwell portions 752, the band folding cage is fully open, being maintained open by the actuating arms or levers 732 and 733 respectively, against the force of the springs tending to close the cage. Both cams then rise in opposite directions as at 753, the cam 748 going into a dwell 754 after a short rise, while the cam 749 rises further to a much higher dwell 755. This causes the clamping levers 710 and 711 to come together into clamping engagement with the cigar and the band, and causes one of the folding members to come merely to the edge of the cigar, while the other folding member passes completely across the cigar. Then both folding members pass together in the same direction across the face of the cigar in the opposite direction, by the rise 756, thereby to fold over the second free end of the band. Then, both sides go back through a rise 757 to the original dwell 748. This completes the folding of the band.

In lieu of the form of the "Cellophane" roll-feed assembly shown in Figure 2, I may provide an alternative form of the same, as illustrated in Figures 58 and 59. Thus, I may provide a similar pair of brackets 99 mounted on the frame member 100 which projects laterally from the base of the machine. Suitably positioned in the brackets 99, are the stationary saddles 810 to support the shaft 98 of the "Cellophane" roll 97; there being sufficient room between the opposed ends of the shaft 98 and the brackets 99 to permit a small amount of play therein.

An idle shaft 811 extends transversely across the face of the feed roll 97, and is rotatably supported at its two ends by lever arms 812; said lever arms 812 being pivotally attached at their lower ends to a point 813 in the frame member 100.

Adjustable sleeves 814 are mounted on the idle roll 811 and are adapted to be affixed thereto by means of the setscrews 816 at any position desired by the operator. A flange 815 perpendicular to the axis of the sleeve 814, projects from the outer opposed edge of each of the two opposed sleeves, and is adapted to serve as a limiting stop to define the transverse position of the "Cellophane" feed roll generally at the point from which the "Cellophane" strip 96 is fed. A tension spring 817 is affixed at one end to a point near the free end of the lever arm 812, and at the other end to a suitable stationary point 818 of the frame of the machine; and is adapted to urge the sleeves 814 against the "Cellophane" feed roll at a point approximating that in which the "Cellophane" strip 96 is fed from the roll.

The "Cellophane" strip 96 is thereby guided, or limited against transverse slippage as it leaves the feed roll. The "Cellophane" strip or web, issuing from the feed roll in this manner, passes upwardly over an idle roll 819, and under an adjacent idle roll 820. The idle roll 819 has a surface of sufficiently high coefficient of friction to tend to prevent slippage of the "Cellophane", and being positioned sufficiently close to the idle roll 820 so that there will be a clamping of the web strip 96 as it passes therebetween.

To limit any tendency of the "Cellophane" web to distort, due to the action of the solvent fed to it by the disc 127, I provide a plate or table 821 positioned parallel to and immediately beneath the plane of travel of the web 96 as it passes from the idle roll 820 to the feed rolls 105 and 106. An idle roll 822 extends across the upper face of the table 821, and is adapted to rotatably clamp the web 96 therebetween.

By this means, the web is placed under constant control from the moment before it leaves the feed roll until it enters the feeding rolls 105 and 106.

In addition to the slide mechanism shown in Figures 4, 4—d and 5, and further to define the forward limit of travel of the cut "Cellophane" strip as it is brought into position above the cigar prior to its entrance into the folding cages, I may provide a pair of limiting stops 825, each affixed to an upper jaw 228 and 229 of the slide 213 as illustrated in Figures 60 and 61. This limiting stop is preferably cut out of one piece of sheet metal, and has an upper plane face 826 adapted to rest on the upper face of the upper jaw, and a vertical plane face extending transversely across the space between said two pairs of jaws, and extending downwardly sufficiently to assure its constant projection across the mouth of the jaws when the latter are open, as at the end of the rearward travel of the slide. In this manner, any inertia carried by the relatively frictionless cut "Cellophane" strip as the latter is urged forward by the slide, is overcome by the stops 825, so that the "Cellophane" strip will not overfeed by sliding over the lower jaw without a defining limit of travel.

In lieu of the form of folding cage shown in Figure 8, I may provide another form of the same, as illustrated in Figure 62. Herein the leading edges 830 and 831 of the folding jaws 301 and 302 are rounded; and there is but one helical tension spring between a folding jaw and a spring anchorage, namely the helical tension spring 332 between the folding jaw 302 and a spring anchorage 333.

Herein also, I provide the helical tension spring 328 between the lever 298 and the spring retaining pin 326, with greater strength than the helical tension spring 327 between the lever 297 and the spring retaining pin 326.

By this means, allowance is made for irregularities in the shape of the cigar, such that the first longitudinal edge of the web to be folded over the lower surface of the cigar, will be urged over these possible irregularities, without undue "force" of the cigar.

Thus, as will be seen in Figures 63, 64 and 65, the first folding jaw 301 does not press against the lower face of the cigar but merely urges the first longitudinal edge of sheathing generally across the lower face of the cigar, and in the general direction of that portion of the second longitudinal edge of sheathing which is to be folded. Abnormal irregularities in the shape of the lower face of the cigar, which would bring the cigar to contact with the leading edge of the folding jaw 301 would merely cause the cigar to cam upward on the rounded surface of the leading edge, and tend to force the cigar against the spring-pressed pusher 320.

At the end of the stroke of the first folding jaw 301, the second folding jaw 302 is urged forward, operatively to slidably clamp the second longitudinal edge of sheathing between the leading edges of the folding jaws 301 and 302. The second edge of the sheathing thus is forced to conform to the rounded surface of the leading edge of the folding jaw 302, and thereby to form a cam surface for the leading edge of the first longitudinal edge of sheathing. As the folding jaw 302 continues its travel forward, forcing the coacting jaw 301 in a rearward direction, and slidably carrying the second longitudinal edge of sheathing with them, the first longitudinal edge cams over the upper surface of the second edge, and is forced into a flush position against the lower surface of the cigar by means of the upward tension of the helical tension spring 332, as is seen particularly in Figure 65. Any abnormalities in the shape of the longitudinal edge of the "Cellophane," is thereby also overcome, for the space between the rounded leading edge of the folding jaws is sufficient to enable a certain amount of play therein of the abnormal longitudinal edge, without affecting the tendency of said edge to cam over the upper surface of the opposed longitudinal edge of sheathing.

In lieu of the form of end-spinning device shown in Figure 2, I may provide the form of end-spinning device shown in Figure 66.

In this form of end-spinning device, instead of the spreading cone 399, and the spindle 401 (as shown in Figure 2) I provide a spindle 835 affixed at one end by means of the flanged collar 402 to the stationary bracket 403, and having at its other end a rounded spreader head 836 and a stationary collar 837 affixed to said spreader a short distance behind said spreader head, said stationary collar 837 having a diameter greater than that of the spreader head, and substantially equal to the diameter of the base of the spreader cone 399 shown in Figure 2.

Intermediate the collar 837 and the spreader head 836, I provide a slidable sleeve 838 having an internal diameter equal to or very slightly larger than the diameter of the spindle 835, and having an external diameter substantially equal to the diameter of the stationary collar 837; said sleeve being of a width less than the distance between said spreader head and said stationary collar. Formed integrally with said sleeve, and extending longitudinally therefrom, is a flanged portion 839, adapted constantly to telescope over a portion of the spreader head; said flange having an internal diameter equal to the external diameter of the spreader head, and an external diameter equal to the external diameter of the sleeve 838; and having a width nearly equal to the length of the spreader head so that when the sleeve is in its forward position (as seen in Figure 70) the flange will encase all but the tip of the spreader head. The slidable sleeve and the flange extending therefrom, together comprise the slidable spreader sleeve. The external forward edge of the slidable spreader sleeve is rounded so as to form a camming surface, and the external surface of the spreader head is so shaped that, when the slidable spreader sleeve is in its rearward position (as seen in Figure 66), there is a relatively continuous rounded camming surface between the tip of the spreader head and the outside periphery of the sleeve.

The jaws 396 and the jaw-controlling fingers 400 are substantially the same as those shown in Figure 2, as is also the means for urging the jaws forward towards the cigar and for retracting the jaws from the cigar.

As the segment 390 carries the rack 389 away from the cigar, the jaw controlling fingers 400 contact the surface of the spreader head 836, and begin to ride over the same, thereby opening the jaws. As the rack 389 continues its rearward travel, the fingers 400 contact the leading external edge of the slidable spreader sleeve 838, and ride over the same on to the periphery of the sleeve, until the fingers have reached the rear or base portion of the sleeve. The sleeve is limited against rearward travel by the stationary collar 837. In the position herein defined, in which the fingers are resting on the base portion of the periphery of the sleeve, the jaws are open to their fullest extent, and are retracted to the limit of their longitudinal movement.

As the segment 390 reverses its travel and urges the rack 389 in a forward direction, the jaw-controlling fingers, urged towards each other by the helical tension springs 398 (see Figure 2), grip the slidable spreader sleeve and carry the same forward with them to the limit of the forward stroke of the sleeve, namely, where the sleeve abuts the base portion of the spreader head (see Figure 70).

Further forward travel of the rack 389 causes the jaw controlling fingers 400 to uncover the spreader sleeve 838, thereby to permit the helical tension spring 398 (see Figure 2) to cause the jaws instantly to approach a closed position, and to grip therebetween the strip of sheathing overhanging from the cigar. Complete closure of the jaws is prevented, however, by the tip of the spreader head;—the fingers uncovering the slidable sleeve contacting said tip.

The constantly spinning motion of the jaws operates to fold the overhanging strip of sheathing about the tip of the cigar, prior to any direct spinning of the end. Further forward travel of the jaws completes the spinning action and serves to spin the portion of the sheathing immediately adjacent the tip of the cigar, thereby to seal the spun end.

Retraction of the rack 389 causes the jaws to complete the spinning of the entire end of sheathing and to release the same as shown in Figures 66 and 67.

In lieu of the intermittently acting braking means shown in Figures 37—a, 37—b and 37—c, I may provide a cigar-displacing means to place the leading cigar on the conveyer belt out of reach of the transfer stop 575, as shown in Figures 73, 74, 75 and 76.

Thus, I may provide a surface cam plate 840 on the front face of each lifter; said cam plate tapering to a zero thickness at a point at or near the top surface 841 of the lower jaw 592. The cam plate 840 extends downwardly through the table, and is of sufficient height so as not to be uncovered when the cigar lifter is at the top of its stroke. The camming surface 842 tapers outwardly from the forward edge of the lower jaw to a point 843 slightly forward of the extreme forward stroke of the transverse stop 575 so that any object resting on said cam surface will be out of reach of said transfer stop. A vertical dwell 844 extends from said point 843 to the base of the cam plate. The movement of the transverse stop is so timed that the stop 575 will not move forward until the cam plate 840 has urged the leading cigar 845 out of reach of the transverse stop.

A cigar retaining plate 846 extends across the conveyer belt and slightly above the upper surfaces of the row of cigars being fed to the lifter clamps, and is attached to a stationary portion of the machine by any suitable means. This retaining plate serves to retain the cigar initially affected by the cam plate 840 against undue displacement as the lower lifter jaw and the attached cam plate are lifted.

When the lower lifter jaw 592 (and the accompanying cam plate) is lowered, the tapered cam on the cam plate 840 recedes from the leading cigar 845. The leading cigar is still retained away from interference with the banded cigar 847, by means of the forward position of the transverse stop (see Fig. 75).

A retaining plate 848 extends across the conveyer belt 42 and slightly above the upper surface of a banded cigar, and is affixed to some stationary portion of the machine by any suitable means. This retainer plate 848 serves to limit any tendency of a banded cigar to roll forward as the transfer stop 575 urges the banded cigar out of the lifter clamp and onto the belt.

In lieu of the cigar-band moistening means illustrated in Figures 35, 36, 37, 53, and 54, I may provide a means, such as that shown in Figures 77, 78 and 79.

Thus, I may provide a stationary liquid reservoir 885 to be placed in any convenient portion of the machine, and preferably above the band to be moistened. Located generally beneath the reservoir, and preferably affixed to the transverse frame member 886 which supports the rotatable shaft 687, and the rotatable control shafts 734 and 735 (see Fig. 36) is a valve member 887, having an inlet 888, an outlet 889, and a valve control plunger 890; said inlet 888 being connected with the reservoir outlet 891 by any suitable means such as the tubing 892 and the pet-cock 893. The valve-plunger 890 is intermittently depressed by the adjustable contact pin, or screw, 904, carried by the lever arm 902 attached to the intermittently rotatable shaft 687. This rotatable shaft is intermittently rotated by means of the contact of the cam follower roller 692 with the movable yoke 665, said follower roller 692 being attached to the arm 691 affixed to said shaft 687, as defined hereinbefore, with reference to the band moistening means illustrated in Figures 53 and 54. By means of this intermittent depression of the valve plunger 890, a drop of water at a time is liberated through the outlet 889 of the valve 887.

A rotary pump 894 is operatively connected to the successive jaws 632 by means of suitable tubing 895; said successive jaws 632 being operatively connected with the successive tubes 633 and 634 which lead to the band mechanism, as hereinbefore defined.

An electric motor 896 is operatively connected to said rotary pump 894 by means of a suitable universal 897, thereby to operate said pump. In lieu of the electric motor 896, suitable gearing (not shown) may be interposed between said pump and the main cam shaft 56 of the machine.

The exhaust from said rotary pump is led by means of the conduit 898 to an exhaust opening 899, and to an atomizer chamber 900. The exhaust opening 899 is of smaller area than the cross-sectional area of the outlet 901 of the rotary pump, thereby to present a sufficient amount of resistance to the full quantity of ejected gas to cause a certain smaller quantity of ejected gas to tend to escape through the atomizer.

The opening of the atomizer chamber 900 is a short distance from and directed towards the position of the side of the band to be moistened, when said band is immediately beneath the band folding cage. The atomizing chamber 900, the valve outlet tube 889, and the terminal portion of the air conduit 898 are rigidly affixed to the valve 887, or to any other suitable stationary portion of the machine.

In this manner, a positive spray of liquid is intermittently directed against the side of the band to be moistened. In this manner also, the necessity for delicate positioning of a moistener pad against the band to be moistened, is eliminated: the spray operating to moisten the band when the atomizing chamber is positioned at an indeterminable distance from said band.

In lieu of the forms of folding cage illustrated hereinabove, particularly the one illustrated as the banding mechanism, I may provide the form shown in Figures 80 and 87. Thus, I may provide a folding cage having a pivot block 696, cigar clamping arm 711, cigar pusher 727, cigar pusher rod 726, helical compression spring 322, to urge said pusher in a downward direction, and a band-folding lever 703, similar to the equivalent portions of the banding mechanism shown in Figure 37. A rearwardly bifurcated folding member 850 is pivoted at the two bifurcated ends thereof to the folding lever 703 by means of the pivot pin 851, and extends beneath the clamping jaw 711, terminating in the rounded folding jaw 852.

A clamping jaw 853 is pivotally secured to the pivot block 696 at 708; the lower rearward face of the free end of said clamping jaw being rounded. A helical tension spring 714 attached to and interposed between the two clamping jaws urges the latter toward each other. A helical tension spring 763 interposed between a spring retaining pin 762 on the pivot block, and a spring-retaining pin 718 on the folding lever 703, urges the folding member 850 attached to the latter towards the cigar to be banded.

A folding lever 855 is pivotally secured to the pivot block 696 at 700, and is pivotally secured at the opposite sides of its free end to a pair of similar arms 856.

Two generally L-shaped folding arms 857 are pivotally attached to the opposed ends of the clamping jaw 853 at 858, and are pivotally attached at their respective vertices to the free ends of the pair of arms 856 by means of the pivot pin 859 extending therethrough; said L-shaped folding arm comprising the "leg" portion 863 and the "foot" portion 864. In this manner, the two L-shaped folding arms are maintained in constantly parallel relation to each other. The lower portion 860 of the "foot" of the L-shaped folding arm is generally arcuate, and preferably curved about the pivot pin 858 as a center. The upper face 861 of the "foot" 864 is generally tangential to a circle generated about the pivot pin 858, and is of sufficient width to couch a folding plate in a manner to be described hereinafter. The tip of the "foot" of the L-shaped folding member is chamfered so as to give a plane surface 862 extending from the leading edge of the plane surface 861 to the arcuate lower face 860 of the "foot"; said plane surface 862 forming an obtuse angle with the surface 861.

A pivot pin 865 extends through and between the two parallel L-shaped lever arms 857 immediately beneath the juncture of the two plane surfaces 861 and 862.

A folding plate 866 having a pair of longitudinally disposed, centrally apertured lugs 867 and 868 extending from the lower face thereof, is rotatably mounted on the pivot pin 865 by means of the apertured lugs, so that the lower plane face of the folding plate may rest alternately on the plane surface 861 and on the plane surface 862 of the "foot" 864, as desired; the longitudinally outer faces of the lugs abutting against the inner faces of the L-shaped folding arms 857. A helical torsion spring 869 is mounted on the pivot pin 865 between said lugs 867; and has one end thereof anchored on the pivot pin 859 at the vertex of the L-shaped folding member. The other end 870 of the helical torsion spring 869 presses against that portion of the lower face of the folding plate 866 nearest the plane surface 862, so as to urge the folding plane away from said plane surface 862 and into couched position on the plane surface 861 of the "foot" 864.

The distance from the axis of the pivot pin 865 to the outer longitudinal edge of the folding plate 866 is generally equal to the distance from said axis of the pivot pin 865 to the intersection of the plane surface 862 with the arcuate lower face 860 of the "foot" 864, so that when the plate 866 rests on the plane surface 862, the outer longitudinal edge 879 of said plate 866 will be generally contiguous to said line of intersection 880 between the plane 862 and the arcuate face 860. The upper portion of the longitudinal edge 879, hereinafter referred to as the leading edge of the folding plate, is rounded; and the line of intersection 880 between the plane 862 and the lower face 860 of the "foot" 864 is rounded, for a purpose hereinafter to be defined.

A cross bar 871 extends between, and is preferably formed integrally with, the arms 856; and is adapted to abut against an adjustable stop 872 on the curved lower face of the clamping arm 853, so as to limit the extent of the forward stroke of the folding member 857.

A T-shaped spring retaining arm 873 extends outwardly from the folding lever 855, in a direction away from the clamping arm 853. The two ends of the cross-bar of the T-shaped member are apertured to form suitable anchorages for helical tension springs 874 and 875 respectively. Similar spring anchorages 876 and 877 are fixed to suitable stationary portions of the folding cage, at similar points intermediate said cross-bar and said clamping member 853, and are adapted to serve as anchorages for the other ends of the helical tension springs 874 and 875, respectively.

By this means, the folding arm 857, carrying the spring-urged folding plate 866, is constantly urged in a direction about the pivot pin 858, towards the cigar to be banded; the banding stroke being forward and upward. The means for retracting the folding member are similar to those shown for the banding mechanism illustrated in Figure 37. In operation, the spring-urged folding jaw 852 traverses the lower face of the cigar 878, carrying with it the first free end of the band, and pressing it against the lower face of the cigar. The folding lever 855 is then released (by means similar to those shown in Figure 37), enabling the spring-urged folding arm 857 to begin its forward stroke, as seen particularly in Figure 82. Here the leading edge 879 of the folding plate 866 contacts with the second free end of the band, and urges it against the rounded folding jaw 852. As the forward stroke of the folding arm 857 continues, the contact plate 866 rotates about the pivot pin 865, against the torsion of the spring 869, until said plate abuts against the plane surfaces 862 (as seen in Figure 83). By this means, the second free end of the band is stretched taut, and is gripped firmly between tthe folding jaw 852, and the spring-urged contact plate 866.

Further forward motion of the folding arm 857, forces the folding jaw 852 to retract, and brings the second free end of the band into contiguity with the first free end. This brings the elements of the folding mechanism into positions shown in Figure 84, in which the leading edge 879 pressing against the gripped free end of the band, is at the point of uncovering the leading rounded edge of the folding jaw 852.

Further forward motion of the folding arm 857 brings the edge 880 into abutting relation with the folding jaw 852, substituting its pressure there-against for that of the spring-urged folding plate 866; releasing the latter, and enabling it to swing about the pivot pin 865 to impact the second free end of the band against the first. Any further motion of the folding arm 857 increases the pressure of the ends of the band against each other, and forces the cigar in an upward direction against the pressure of the spring-urged pusher plate. The limiting stop 872 is so adjusted that the forward limit of the stroke of the folding arm 857 may be defined at any point after the initial impact of the second free end of the band against the first, said limiting stop 872 acting against the rigid cross-member 871 to prevent further forward motion of the levers 856.

If desired, the timing of the motion of the folding jaw 852 in relation to the motion of the folding arm 857, may be so adjusted that there will be no contacting between said folding jaw and said folding arm, thereby to produce a different folding effect;—as seen particularly in Figures 88, 89 and 90.

In this alternate operation, the leading edge 879 of the folding plate 866 remains in its spring-urged position, as the folding arm 857 is urged forward, carrying with it the second free end of the band, until said free end of the band contacts with the first free end of the band. In this manner, (see Fig. 89) the leading edge 879 is the first part of the folding plate 866 to press the second free end of the band against the first. Further forward motion of the folding arm 857 causes the folding plate 866 to spread across the lower face of the band in a forward direction, thereby "ironing" the ends of the band together, against the action of the helical torsion spring 869 until the elements are in the positions indicated in Figure 90. Further pressure may be applied, as illustrated in Figure 86.

By the means shown in each of the alternative operations hereinabove defined, a closer instant adhesion is produced between the moistened end of one band and the glued end of the other.

I am aware that my invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I hereby claim as new and desire to secure by Letters Patent, is:—

1. In a wrapping machine, a perambulatory folding cage adapted intermittently to move into a successive series of operative positions, said folding cage including an opposite pair of side clamping members and an opposite pair of web folding members movable with respect to each other and being spring-urged towards each other, and cam controlled levers supported in non-perambulatory relation to said folding cage, corresponding to the several positions thereof, for variously actuating said cage against the tension of the springs thereof in the different positions of said cage.

2. In a wrapping machine, a folding cage including pairs of opposite article-clamping members and web folding members, being spring-urged towards each other and towards the article and towards the web, cam controlled levers which actuate said web folding members, and means intermediate said web folding members and said article-clamping members causing the former operatively to engage the latter whereby the latter members borrow motion from the former members through a portion of the travel of the same.

3. In a wrapping machine, an intermittently movable perambulatory conveyer including a plurality of spaced folding cages adapted successively to move into successive series of operative positions, each of said cages, including opposite pairs of side clamping members and opposite pairs of web folding members movable with respect to each other and being spring-urged towards each other, and cam controlled levers supported in non-perambulatory relation to said folding cages, corresponding to and in operative juxtaposition to the several operative positions thereof, for variously actuating said cages against the tension of the springs thereof in the successive positions of the cages.

4. In a wrapping machine, an intermittently movable conveyer including a plurality of spaced folding cages, including pairs of opposite article-clamping members and web folding members, being spring-urged towards each other and towards the article and towards the web, cam controlled levers which actuate said web folding members, and means intermediate said web folding members and said article-clamping members causing the former operatively to engage the latter whereby the latter members borrow motion from the former members through a portion of the travel of the same.

5. In a wrapping machine, an intermittently rotatable turret, including a plurality of angularly spaced perambulatory folding cages adapted successively to move into a successive series of operative positions, each of said folding cages including an opposite pair of side clamping members and an opposite pair of web folding members movable with respect to each other and being spring-urged towards each other, and cam controlled levers supported in non-perambulatory relation to said folding cages, corresponding to and in operative juxtaposition to the several operative positions thereof, for variously actuating said cage against the tension of the springs thereof in the different operative positions of the cages.

6. In a wrapping machine, an intermittently rotating turret, including a plurality of angularly spaced folding cages, each of said folding cages including pairs of opposite article-clamping members and web folding members, being spring-urged towards each other and towards the article and towards the web, cam controlled levers which actuate said web folding members, and means intermediate said web folding members and said article-clamping members causing the former operatively to engage the latter whereby the latter members borrow motion from the former members through a portion of the travel of the same.

7. In a wrapping machine, an intermittently movable conveyer including a plurality of spaced perambulatory folding cages adapted successively to move into a successive series of operative positions, each of said cages including opposite pairs of side clamping members and opposite pairs of web folding members movable with respect to each other, cam controlled levers carried independently of and in non-perambulatory relation to said conveyer and in operative juxtaposition to the several operative positions of the cages thereof, adapted to actuate said web folding members, and means for retracting said cam controlled actuating means while the conveyer is in motion so as to clear the cages.

8. In a wrapping machine, an intermittently rotatable turret, including a plurality of angularly spaced perambulatory folding cages, each of said folding cages being adapted successively to move into a successive series of operative positions each of said cages including an opposite pair of side clamping members and an opposite pair of web folding members movable with respect to each other and being spring-urged towards each other, cam controlled levers supported in non-perambulatory relation to said folding cages, corresponding to and in operative juxtaposition to several positions thereof, for variously actuating said cage against the tension of the springs thereof, and means for retracting said cam controlled actuating means while the conveyer is in motion so as to clear the cages.

9. In a wrapping machine, an intermittently rotating turret, including a plurality of angularly spaced folding cages, each of said folding cages including an opposite pair of side clamping members and an opposite pair of web folding members movable with respect to each other and being spring-urged towards each other, cam controlled levers actuating said cage against the tension of the springs thereof, and means for retracting said cam controlled actuating means while the conveyer is in motion so as to clear the cages.

10. In a wrapping machine, an intermittently movable conveyer including a plurality of spaced folding cages, including opposite pairs of side clamping members and opposite pairs of web folding members movable with respect to each other, cam controlled levers which actuate said web folding members, and means for retracting said cam controlled actuating means while the conveyer is in motion so as to clear the cages.

WILLIAM REYNOLDS.